US012755598B2

(12) United States Patent
Forutanpour et al.

(10) Patent No.: US 12,755,598 B2
(45) Date of Patent: Oct. 6, 2026

(54) SYSTEMS AND METHODS FOR VENDING AND/OR PURCHASING MOBILE PHONES AND OTHER ELECTRONIC DEVICES

(71) Applicant: ecoATM, LLC, San Diego, CA (US)

(72) Inventors: Babak Forutanpour, San Diego, CA (US); Joemari Enriquez, San Diego, CA (US); Jeffrey Ploetner, San Diego, CA (US); David Mersten, San Diego, CA (US)

(73) Assignee: ecoATM, LLC, San Diego, CA (US)

( * ) Notice: Subject to any disclaimer, the term of this patent is extended or adjusted under 35 U.S.C. 154(b) by 0 days.

(21) Appl. No.: 19/183,739

(22) Filed: Apr. 18, 2025

(65) Prior Publication Data

US 2025/0371925 A1 Dec. 4, 2025

Related U.S. Application Data

(63) Continuation of application No. 17/645,039, filed on Dec. 17, 2021, now Pat. No. 12,322,259, which is a
(Continued)

(51) Int. Cl.
*G07F 7/06* (2006.01)
*G06Q 20/18* (2012.01)
(Continued)

(52) U.S. Cl.
CPC ............... *G07F 7/06* (2013.01); *G06Q 20/18* (2013.01); *G07F 7/005* (2013.01); *G07F 9/001* (2020.05);
(Continued)

(58) Field of Classification Search
CPC ............. G06Q 20/18; G06Q 20/40145; G06Q 20/4016; H04M 2250/64; H04M 1/0287
See application file for complete search history.

(56) References Cited

U.S. PATENT DOCUMENTS 1,327,315 A 1/1920 Davies
1,730,015 A 10/1929 Rooke
(Continued)

FOREIGN PATENT DOCUMENTS

CA 2760863 11/2010
CA 3039716 9/2011
(Continued)

OTHER PUBLICATIONS

2006 Florida Statutes Title XXXIII, Chapter 538, Sections 538.03 and 538.04, 7 pages.
(Continued)

*Primary Examiner* — Thien M Le
*Assistant Examiner* — Asifa Habib
(74) *Attorney, Agent, or Firm* — Ashurst Perkins Coie US LLP

(57) ABSTRACT

A consumer-operated kiosk can include an inspection area configured to receive a first device from a user. The kiosk can include an imaging device configured to image the first device when the first device is positioned within the inspection area. In some embodiments, the kiosk includes a vending apparatus configured to store a plurality of second electronic devices for purchase. The kiosk can include one or more release mechanisms configured to directly release any one of the second electronic devices from the vending apparatus. The kiosk includes one or more processors operably connected to the inspection area, the imaging device, the vending apparatus, and the one or more release mechanisms. The one or more processors can be configured to cause the imaging device to capture one or more images of the first electronic device, facilitate purchase of the first electronic device based at least in part on the one or more captured images of the first electronic device, receive a request to vend a selected phone from among the phones in
(Continued)

the vending apparatus, and/or cause the one or more release mechanisms to release the selected phone directly from the vending apparatus into a vending bay of the kiosk.

20 Claims, 34 Drawing Sheets

Related U.S. Application Data continuation-in-part of application No. 16/719,699, filed on Dec. 18, 2019, now Pat. No. 11,989,710.

(60) Provisional application No. 63/127,148, filed on Dec. 17, 2020, provisional application No. 62/782,947, filed on Dec. 20, 2018, provisional application No. 62/782,302, filed on Dec. 19, 2018.

(51) Int. Cl.

| | |
|---|---|
| ***G07F 7/00*** | (2006.01) |
| ***G07F 9/00*** | (2006.01) |
| ***G07F 11/00*** | (2006.01) |
| ***G07F 11/16*** | (2006.01) |
| ***G07F 11/26*** | (2006.01) |
| ***H04M 1/72409*** | (2021.01) |

(52) U.S. Cl.

CPC .......... *G07F 11/005* (2013.01); *G07F 11/163* (2020.05); *G07F 11/26* (2013.01); *H04M 1/72409* (2021.01); *H04M 2250/64* (2013.01)

(56) References Cited

U.S. PATENT DOCUMENTS 2,817,725 A 12/1957 Rochfort
3,808,439 A 4/1974 Renius
4,248,334 A 2/1981 Hanley et al.
4,272,757 A 6/1981 McLaughlin et al.
4,519,522 A 5/1985 McElwee
4,593,820 A 6/1986 Antonie
4,715,709 A 12/1987 Sekine et al.
4,821,118 A 4/1989 Lafreniere
4,845,636 A 7/1989 Walker
4,870,357 A 9/1989 Young et al.
4,878,736 A 11/1989 Hekker et al.
4,893,789 A 1/1990 Novorsky
4,927,051 A 5/1990 Falk et al.
4,951,308 A 8/1990 Bishop et al.
5,025,344 A 6/1991 Maly et al.
5,027,074 A 6/1991 Haferstat
5,077,462 A 12/1991 Newell et al.
5,091,773 A 2/1992 Fouche et al.
5,105,149 A 4/1992 Tokura
5,159,560 A 10/1992 Newell et al.
5,216,502 A 6/1993 Katz
5,280,170 A 1/1994 Baldwin
5,319,459 A 6/1994 Mochizuki et al.
5,339,096 A 8/1994 Beaufort et al.
5,413,454 A 5/1995 Movesian
5,419,438 A 5/1995 Squyres et al.
5,436,554 A 7/1995 Decker
5,482,140 A 1/1996 Moore
5,533,645 A * 7/1996 Wittern, Jr. ............. G07F 11/62 312/139.2
5,570,920 A 11/1996 Crisman et al.
5,572,444 A 11/1996 Lentz et al.
5,610,710 A 3/1997 Canfield et al.
5,711,530 A * 1/1998 Lewis ................. G07F 17/3253 273/448
5,717,780 A 2/1998 Mitsumune et al.
5,747,784 A 5/1998 Walter et al.
5,748,084 A 5/1998 Isikoff
5,775,806 A 7/1998 Allred
5,839,058 A 11/1998 Phillips et al.
5,868,236 A 2/1999 Rademacher
5,871,371 A 2/1999 Rothenberger et al.
5,920,338 A 7/1999 Katz
5,937,396 A 8/1999 Konya
5,949,901 A 9/1999 Nichani et al.
5,965,858 A 10/1999 Suzuki et al.
5,966,654 A 10/1999 Croughwell et al.
5,987,159 A 11/1999 Nichani
5,988,431 A 11/1999 Roe
5,988,971 A 11/1999 Fossey et al.
6,029,851 A 2/2000 Jenkins et al.
6,041,229 A 3/2000 Turner
6,055,512 A 4/2000 Dean et al.
6,100,986 A 8/2000 Rydningen
6,170,702 B1 1/2001 Zettler et al.
6,181,805 B1 1/2001 Koike et al.
6,216,890 B1 4/2001 Rathmer
6,228,008 B1 5/2001 Pollington et al.
6,234,812 B1 5/2001 Ivers et al.
6,259,827 B1 7/2001 Nichani
6,264,104 B1 7/2001 Jenkins et al.
6,283,475 B1 * 9/2001 Stubben .................... A63F 9/30 273/447
6,323,782 B1 11/2001 Stephens et al.
6,330,354 B1 12/2001 Companion et al.
6,330,958 B1 12/2001 Ruskin et al.
6,393,095 B1 5/2002 Robinson
6,412,654 B1 7/2002 Cleeve
6,462,644 B1 10/2002 Howell et al.
6,529,837 B1 3/2003 Kang
6,535,637 B1 3/2003 Wootton et al.
6,573,886 B1 6/2003 Lehtinen et al.
6,575,363 B1 6/2003 Leason et al.
6,587,581 B1 7/2003 Matsuyama et al.
6,595,684 B1 7/2003 Casagrande et al.
6,597,552 B1 7/2003 Griepentrog et al.
6,606,154 B1 8/2003 Oda
6,633,377 B1 10/2003 Weiss et al.
6,667,800 B1 12/2003 Larsson et al.
6,679,499 B2 * 1/2004 Jeon ........................ G07F 17/32 273/448
6,687,679 B1 2/2004 Van Luchene
6,741,731 B1 5/2004 Yamamoto et al.
6,748,296 B2 6/2004 Banerjee et al.
6,754,637 B1 6/2004 Stenz
6,758,370 B2 7/2004 Cooke et al.
6,758,394 B2 7/2004 Maskatiya et al.
6,795,201 B2 9/2004 Rangarajan et al.
6,798,528 B1 9/2004 Hartman
6,822,422 B2 11/2004 Sagawa
6,842,596 B2 1/2005 Morii et al.
6,847,393 B2 1/2005 Ashe
6,854,656 B2 2/2005 Matsumori
6,874,932 B2 4/2005 Devitt et al.
6,882,269 B2 4/2005 Moreno
6,886,744 B2 5/2005 Ichihara et al.
6,947,941 B1 9/2005 Koon
D512,964 S 12/2005 Kissinger et al.
6,983,067 B2 1/2006 Cox
7,001,038 B2 2/2006 Bock et al.
7,027,031 B2 4/2006 Kawasaki et al.
7,039,609 B2 5/2006 Aoki
7,062,454 B1 6/2006 Giannini et al.
7,066,767 B2 6/2006 Liao
7,069,236 B1 6/2006 Tsunenari
7,076,449 B2 7/2006 Tsunenari et al.
7,086,592 B2 8/2006 Wagner et al.
7,109,293 B2 9/2006 Hwang et al.
7,142,335 B2 11/2006 Tesavis
7,153,086 B2 12/2006 Kauppila et al.
7,158,170 B2 1/2007 Gustavsson
7,164,518 B2 1/2007 Yang
7,166,856 B2 1/2007 Cho et al.
7,178,720 B1 2/2007 Strubbe et al.
7,200,497 B2 4/2007 Wang et al.
7,201,125 B2 4/2007 Evans
7,205,529 B2 4/2007 Andersen et al.
7,213,754 B2 5/2007 Eglen et al.
7,213,766 B2 5/2007 Ryan et al.

(56) References Cited

U.S. PATENT DOCUMENTS 7,234,609 B2 6/2007 DeLazzer et al.
7,251,458 B2 7/2007 O'Connell
7,268,345 B2 9/2007 Schultz
7,334,729 B2 2/2008 Brewington
7,343,319 B1 3/2008 Jen
7,348,884 B2 3/2008 Higham
7,388,977 B2 6/2008 Wang et al.
7,398,921 B2 7/2008 Zito, Jr.
7,407,392 B1 8/2008 Cooke et al.
7,408,674 B2 8/2008 Moro et al.
7,431,158 B2 10/2008 Yamada et al.
7,455,226 B1 11/2008 Hammond et al.
7,520,666 B2 4/2009 Pevzner et al.
7,529,687 B1 5/2009 Phan
7,567,344 B2 7/2009 LeBlanc et al.
7,577,496 B2 8/2009 Walker et al.
7,584,269 B2 9/2009 Moore et al.
7,588,165 B2 9/2009 Prichard et al.
7,635,131 B2 * 12/2009 Fukazawa ................. A63F 9/24
273/447
7,642,687 B2 1/2010 Kageyama et al.
7,646,193 B2 1/2010 Suzuki et al.
7,649,450 B2 1/2010 Campion et al.
7,702,108 B2 4/2010 Amon et al.
7,735,125 B1 6/2010 Alvarez et al.
7,761,331 B2 7/2010 Low et al.
7,783,379 B2 8/2010 Beane et al.
7,848,833 B2 12/2010 Li
7,881,965 B2 2/2011 Bowles et al.
7,890,373 B2 2/2011 Junger
D640,199 S 6/2011 Wilson
8,010,402 B1 8/2011 Sharma et al.
8,019,588 B1 9/2011 Wohlberg et al.
8,025,229 B2 9/2011 Hammond et al.
8,031,930 B2 10/2011 Wang et al.
8,107,243 B2 1/2012 Guccione et al.
8,112,325 B2 2/2012 Foy et al.
8,142,199 B1 3/2012 Almouli
8,156,008 B2 4/2012 Bae et al.
8,195,511 B2 6/2012 Bowles et al.
8,200,533 B2 6/2012 Librizzi et al.
8,200,736 B2 6/2012 Shi
8,215,546 B2 7/2012 Lin et al.
8,234,185 B2 7/2012 Davis
8,239,262 B2 8/2012 Bowles et al.
8,254,883 B2 8/2012 Uchida
8,266,008 B1 9/2012 Siegel et al.
8,340,815 B2 12/2012 Peters et al.
8,369,987 B2 2/2013 Claessen
8,401,914 B1 3/2013 Kim
8,417,234 B2 4/2013 Sanding et al.
8,418,226 B2 4/2013 Gardner
8,423,404 B2 4/2013 Bowles et al.
8,429,021 B2 4/2013 Kraft et al.
8,463,646 B2 6/2013 Bowles
8,482,413 B2 7/2013 Douglas
8,536,472 B2 9/2013 Wu et al.
8,543,358 B2 9/2013 Trabona
8,566,183 B1 10/2013 Bonar et al.
8,606,633 B2 12/2013 Tarbert et al.
8,712,893 B1 4/2014 Brandmaier et al.
8,718,717 B2 5/2014 Vaknin et al.
8,743,215 B1 6/2014 Lee
8,755,783 B2 6/2014 Brahami et al.
8,781,622 B2 * 7/2014 Mockus .................. H04W 4/02
700/232
8,806,280 B2 8/2014 Stephenson
8,823,794 B2 9/2014 Suzuki et al.
8,824,136 B1 9/2014 Interian et al.
8,922,643 B2 12/2014 Ji et al.
9,010,627 B1 4/2015 Prasad et al.
9,043,026 B2 5/2015 Lien et al.
9,075,781 B2 7/2015 Matthews
9,081,477 B2 * 7/2015 Kang .................. G06F 3/04815
9,124,056 B1 9/2015 Lewis, Jr.
9,147,063 B1 9/2015 Florissi
9,153,089 B1 * 10/2015 Hewett ................ G06Q 10/087
9,189,911 B2 11/2015 Kavli et al.
9,195,979 B2 11/2015 Geller
9,256,863 B2 2/2016 Chayon et al.
9,283,672 B1 3/2016 Matthews
9,317,989 B2 4/2016 Grow et al.
9,355,515 B2 5/2016 Brahami et al.
9,367,436 B2 6/2016 Matthews
9,367,982 B2 6/2016 Chayun et al.
9,378,606 B2 6/2016 Chayun et al.
9,390,442 B2 7/2016 Lyle
9,469,037 B2 10/2016 Matthews
9,497,563 B2 11/2016 Hornung et al.
9,549,316 B2 1/2017 Ben-Harosh et al.
9,578,133 B2 2/2017 Matthews
9,582,101 B2 2/2017 Chang et al.
9,595,238 B2 3/2017 Won
9,621,947 B1 4/2017 Oztaskent
9,641,997 B2 5/2017 Vratskides
9,668,298 B1 5/2017 Pearl et al.
9,697,548 B1 7/2017 Jaff et al.
9,704,142 B2 7/2017 Ahn
9,718,196 B2 8/2017 Matthews
9,792,597 B1 10/2017 Abbott
9,818,160 B2 11/2017 Bowles et al.
9,858,178 B2 1/2018 Matthews
9,866,664 B2 1/2018 Sinha et al.
9,881,284 B2 1/2018 Bowles et al.
9,885,672 B2 2/2018 Forutanpour et al.
9,904,911 B2 2/2018 Bowles et al.
9,911,102 B2 3/2018 Bowles
9,934,644 B2 4/2018 Chayun et al.
9,936,331 B2 4/2018 Matthews
9,972,046 B2 * 5/2018 Ackerman ......... G06Q 30/0641
10,032,140 B2 7/2018 Bowles et al.
10,043,339 B2 8/2018 Walker et al.
10,044,843 B2 8/2018 Sinha et al.
10,055,798 B2 8/2018 Bowles et al.
10,127,647 B2 11/2018 Forutanpour et al.
10,157,379 B2 12/2018 Singh
10,157,427 B2 12/2018 Bowles et al.
10,261,611 B2 4/2019 Matthews
10,264,426 B2 4/2019 Matthews
10,269,110 B2 4/2019 Forutanpour et al.
10,275,813 B2 4/2019 Fu
10,304,057 B1 * 5/2019 Powell ................. G06Q 20/322
10,325,440 B2 6/2019 Abdelmalak et al.
10,339,509 B2 7/2019 Bordeleau et al.
10,401,411 B2 9/2019 Snook et al.
10,417,615 B2 9/2019 Bowles et al.
10,438,174 B2 10/2019 Bowles et al.
10,445,708 B2 10/2019 Hunt et al.
10,452,527 B2 10/2019 Matthews
10,475,002 B2 11/2019 Silva et al.
10,496,963 B2 12/2019 Silva et al.
10,528,992 B2 1/2020 Yost
10,529,008 B1 1/2020 Pritchard
10,565,629 B2 2/2020 Hartman
10,572,946 B2 2/2020 Bowles et al.
10,600,095 B2 * 3/2020 Ackerman ......... G06Q 30/0603
10,671,367 B2 6/2020 Matthews
10,679,279 B2 6/2020 Ward
10,726,542 B2 7/2020 Nguyen
10,740,891 B1 8/2020 Chen et al.
10,755,401 B2 8/2020 Bian et al.
10,803,527 B1 10/2020 Zankat et al.
10,810,732 B2 10/2020 Dwivedi et al.
10,824,942 B1 11/2020 Bhotika et al.
10,825,082 B2 11/2020 Librizzi et al.
10,834,555 B2 11/2020 Matthews
10,839,651 B2 * 11/2020 Smart ................. G07F 17/3297
10,846,672 B2 11/2020 Dion et al.
10,853,873 B2 12/2020 Bowles et al.
10,860,122 B2 12/2020 Matthews
10,860,990 B2 12/2020 Bowles et al.
10,891,669 B2 1/2021 Glickman et al.
10,909,673 B2 2/2021 Forutanpour et al.
10,965,862 B2 3/2021 Weir et al.

(56) References Cited

U.S. PATENT DOCUMENTS

| | | | | |
|---|---|---|---|---|
| 10,970,786 | B1 | 4/2021 | Matheson et al. | |
| 10,977,700 | B2 | 4/2021 | Bordeleau et al. | |
| 10,991,093 | B2 | 4/2021 | Do et al. | |
| 11,004,126 | B1 * | 5/2021 | Jacobs, II | G06Q 10/101 |
| 11,010,841 | B2 | 5/2021 | Bowles et al. | |
| 11,014,093 | B1 | 5/2021 | Drexler | |
| 11,024,111 | B2 | 6/2021 | Abdelmalak et al. | |
| 11,069,141 | B2 | 7/2021 | Wurmfeld et al. | |
| 11,079,753 | B1 | 8/2021 | Roy | |
| 11,080,662 | B2 | 8/2021 | Bowles et al. | |
| 11,080,672 | B2 | 8/2021 | Bowles | |
| 11,107,046 | B2 | 8/2021 | Bowles | |
| 11,122,034 | B2 | 9/2021 | Cicchitto | |
| 11,126,973 | B2 | 9/2021 | Silva et al. | |
| 11,164,000 | B2 * | 11/2021 | Lee | G06V 20/20 |
| 11,232,412 | B2 | 1/2022 | Hunt et al. | |
| 11,249,769 | B2 | 2/2022 | Li et al. | |
| 11,257,057 | B1 | 2/2022 | Asmi et al. | |
| 11,288,789 | B1 | 3/2022 | Chen et al. | |
| 11,302,038 | B2 | 4/2022 | Muendel et al. | |
| 11,315,093 | B2 | 4/2022 | Bowles | |
| 11,321,768 | B2 | 5/2022 | Beauchamp | |
| 11,328,562 | B2 * | 5/2022 | Smart | G07F 17/3209 |
| 11,341,471 | B2 | 5/2022 | Dion et al. | |
| 11,361,599 | B2 | 6/2022 | Herman et al. | |
| 11,379,886 | B1 | 7/2022 | Fields et al. | |
| 11,386,740 | B2 | 7/2022 | Shah | |
| 11,417,068 | B1 | 8/2022 | Burris et al. | |
| 11,436,570 | B2 | 9/2022 | Bowles et al. | |
| 11,443,289 | B2 | 9/2022 | Bowles et al. | |
| 11,462,868 | B2 | 10/2022 | Forutanpour et al. | |
| 11,481,754 | B2 | 10/2022 | Priebatsch | |
| 11,482,067 | B2 | 10/2022 | Forutanpour et al. | |
| 11,526,932 | B2 | 12/2022 | Bowles et al. | |
| 11,574,182 | B2 | 2/2023 | Matthews | |
| 11,580,627 | B2 | 2/2023 | Johnson et al. | |
| 11,599,796 | B2 | 3/2023 | Boa et al. | |
| 11,623,823 | B1 * | 4/2023 | Hoshino | B41J 3/4078 700/233 |
| 11,631,096 | B2 | 4/2023 | Schubert et al. | |
| 11,657,631 | B2 | 5/2023 | Sagnoas | |
| 11,687,900 | B2 | 6/2023 | Dion et al. | |
| 11,688,149 | B1 | 6/2023 | Mascarin et al. | |
| 11,688,222 | B2 | 6/2023 | Dion et al. | |
| 11,720,871 | B2 | 8/2023 | Dion et al. | |
| 11,734,654 | B2 | 8/2023 | Silva et al. | |
| 11,790,327 | B2 | 10/2023 | Bowles et al. | |
| 11,790,328 | B2 | 10/2023 | Forutanpour et al. | |
| 11,798,250 | B2 | 10/2023 | Forutanpour et al. | |
| 11,803,954 | B2 | 10/2023 | Forutanpour et al. | |
| 11,836,867 | B2 * | 12/2023 | Sadalgi | G06T 11/10 |
| 11,843,206 | B2 | 12/2023 | Forutanpour et al. | |
| D1,010,271 | S | 1/2024 | Hammes et al. | |
| 11,900,553 | B2 | 2/2024 | Ha | |
| 11,907,915 | B2 | 2/2024 | Bowles et al. | |
| 11,922,467 | B2 | 3/2024 | Forutanpour et al. | |
| 11,935,138 | B2 | 3/2024 | Bowles et al. | |
| 11,989,701 | B2 | 5/2024 | Hunt et al. | |
| 11,989,710 | B2 | 5/2024 | Forutanpour et al. | |
| 12,008,520 | B2 | 6/2024 | Bowles | |
| 12,033,454 | B2 | 7/2024 | Forutanpour et al. | |
| 12,045,973 | B2 | 7/2024 | Johnson et al. | |
| 12,182,773 | B2 | 12/2024 | Bowles | |
| 12,198,108 | B2 | 1/2025 | Bowles | |
| 12,205,081 | B2 | 1/2025 | Bowles et al. | |
| 12,217,221 | B2 | 2/2025 | Silva et al. | |
| 12,223,684 | B2 | 2/2025 | Silva et al. | |
| 12,271,929 | B2 | 4/2025 | Forutanpour et al. | |
| 12,300,059 | B2 | 5/2025 | Forutanpour et al. | |
| 12,321,965 | B2 | 6/2025 | Forutanpour et al. | |
| 12,322,259 | B2 | 6/2025 | Forutanpour et al. | |
| 2001/0025883 | A1 | 10/2001 | Ichihara et al. | |
| 2001/0035425 | A1 | 11/2001 | Rocco et al. | |
| 2001/0039531 | A1 | 11/2001 | Aoki | |
| 2002/0014577 | A1 | 2/2002 | Ulrich et al. | |
| 2002/0035515 | A1 | 3/2002 | Moreno | |
| 2002/0046122 | A1 | 4/2002 | Barber | |
| 2002/0067184 | A1 | 6/2002 | Smith et al. | |
| 2002/0087413 | A1 | 7/2002 | Mahaffy et al. | |
| 2002/0112177 | A1 | 8/2002 | Voltmer | |
| 2002/0129170 | A1 | 9/2002 | Moore et al. | |
| 2002/0147656 | A1 | 10/2002 | Tam | |
| 2002/0157033 | A1 | 10/2002 | Cox | |
| 2002/0162966 | A1 | 11/2002 | Yoder | |
| 2002/0186878 | A1 | 12/2002 | Hoon et al. | |
| 2003/0006277 | A1 | 1/2003 | Maskatiya et al. | |
| 2003/0018897 | A1 | 1/2003 | Bellis, Jr. et al. | |
| 2003/0025476 | A1 | 2/2003 | Trela | |
| 2003/0036866 | A1 | 2/2003 | Nair et al. | |
| 2003/0061150 | A1 | 3/2003 | Kocher et al. | |
| 2003/0063527 | A1 | 4/2003 | Ostwald | |
| 2003/0083983 | A1 | 5/2003 | Fisher | |
| 2003/0100707 | A1 | 5/2003 | Hwang et al. | |
| 2003/0146898 | A1 | 8/2003 | Kawasaki et al. | |
| 2003/0158789 | A1 | 8/2003 | Miura et al. | |
| 2003/0170529 | A1 | 9/2003 | Sagawa | |
| 2003/0179371 | A1 | 9/2003 | Rangarajan et al. | |
| 2003/0191675 | A1 | 10/2003 | Murashita | |
| 2003/0197782 | A1 | 10/2003 | Ashe | |
| 2003/0204289 | A1 | 10/2003 | Banerjee et al. | |
| 2004/0012825 | A1 | 1/2004 | Tesavis | |
| 2004/0039639 | A1 | 2/2004 | Walker | |
| 2004/0088231 | A1 | 5/2004 | Davis | |
| 2004/0114153 | A1 | 6/2004 | Andersen et al. | |
| 2004/0141320 | A1 | 7/2004 | Bock et al. | |
| 2004/0150815 | A1 | 8/2004 | Sones et al. | |
| 2004/0156557 | A1 | 8/2004 | Van Der Weij | |
| 2004/0184651 | A1 | 9/2004 | Nordbryhn | |
| 2004/0186744 | A1 | 9/2004 | Lux | |
| 2004/0189812 | A1 | 9/2004 | Gustavsson | |
| 2004/0200902 | A1 | 10/2004 | Ishioroshi | |
| 2004/0205015 | A1 | 10/2004 | DeLaCruz | |
| 2004/0235513 | A1 | 11/2004 | O'Connell | |
| 2004/0242216 | A1 | 12/2004 | Boutsikakis | |
| 2004/0243478 | A1 | 12/2004 | Walker et al. | |
| 2004/0262521 | A1 | 12/2004 | Devitt et al. | |
| 2005/0022699 | A1 | 2/2005 | Goza | |
| 2005/0027622 | A1 | 2/2005 | Walker et al. | |
| 2005/0035311 | A1 | 2/2005 | Asakawa et al. | |
| 2005/0043897 | A1 | 2/2005 | Meyer | |
| 2005/0088379 | A1 | 4/2005 | Tsuchida | |
| 2005/0109841 | A1 | 5/2005 | Ryan et al. | |
| 2005/0128551 | A1 | 6/2005 | Yang | |
| 2005/0135917 | A1 | 6/2005 | Kauppila et al. | |
| 2005/0137942 | A1 | 6/2005 | LaFluer | |
| 2005/0139661 | A1 | 6/2005 | Eglen et al. | |
| 2005/0143149 | A1 | 6/2005 | Becker et al. | |
| 2005/0167620 | A1 | 8/2005 | Cho et al. | |
| 2005/0187657 | A1 | 8/2005 | Hashimoto et al. | |
| 2005/0216120 | A1 | 9/2005 | Rosenberg et al. | |
| 2005/0222690 | A1 | 10/2005 | Wang et al. | |
| 2005/0231595 | A1 | 10/2005 | Wang et al. | |
| 2005/0240958 | A1 | 10/2005 | Nguyen et al. | |
| 2006/0022827 | A1 | 2/2006 | Highham | |
| 2006/0038114 | A9 | 2/2006 | Cofer et al. | |
| 2006/0047573 | A1 | 3/2006 | Mitchell et al. | |
| 2006/0074756 | A1 | 4/2006 | Boykin | |
| 2006/0085158 | A1 | 4/2006 | Cakiner | |
| 2006/0129411 | A1 | 6/2006 | Bhatti et al. | |
| 2006/0167580 | A1 | 7/2006 | Whittier | |
| 2006/0184379 | A1 | 8/2006 | Tan et al. | |
| 2006/0195384 | A1 | 8/2006 | Bauer et al. | |
| 2006/0215027 | A1 | 9/2006 | Nonoyama et al. | |
| 2006/0217152 | A1 | 9/2006 | Fok et al. | |
| 2006/0219776 | A1 | 10/2006 | Finn | |
| 2006/0229108 | A1 | 10/2006 | Cehelnik | |
| 2006/0230013 | A1 | 10/2006 | Hrle | |
| 2006/0235747 | A1 | 10/2006 | Hammond et al. | |
| 2006/0255940 | A1 | 11/2006 | White et al. | |
| 2006/0258008 | A1 | 11/2006 | Holler et al. | |
| 2006/0261931 | A1 | 11/2006 | Cheng et al. | |
| 2006/0271431 | A1 | 11/2006 | Wehr et al. | |
| 2006/0279307 | A1 | 12/2006 | Wang et al. | |
| 2006/0280356 | A1 | 12/2006 | Yamagashi | |

(56) References Cited

U.S. PATENT DOCUMENTS

2006/0287929 A1 12/2006 Bae et al.
2007/0012665 A1 1/2007 Nelson
2007/0013124 A1 1/2007 Graef et al.
2007/0013139 A1 1/2007 Kumagai
2007/0032098 A1 2/2007 Bowles et al.
2007/0050083 A1 3/2007 Signorelli
2007/0057815 A1 3/2007 Foy et al.
2007/0129906 A1 6/2007 Stoecker et al.
2007/0133844 A1 6/2007 Waehner et al.
2007/0140310 A1 6/2007 Rolton et al.
2007/0150403 A1 6/2007 Mock et al.
2007/0205751 A1 9/2007 Suzuki et al.
2007/0258085 A1 11/2007 Robbins
2007/0263099 A1 11/2007 Motta et al.
2007/0269099 A1 11/2007 Nishino et al.
2007/0271194 A1* 11/2007 Walker .................. G06Q 30/02 705/80
2007/0276911 A1 11/2007 Bhumkar
2007/0281734 A1 12/2007 Mizrachi
2007/0282999 A1 12/2007 Tu et al.
2008/0004828 A1 1/2008 Mizrachi
2008/0027581 A1 1/2008 Saether et al.
2008/0033596 A1 2/2008 Fausak et al.
2008/0071627 A1 3/2008 Junger
2008/0088833 A1 4/2008 Yokota et al.
2008/0097770 A1 4/2008 Low et al.
2008/0109746 A1 5/2008 Mayer
2008/0111989 A1 5/2008 Dufour et al.
2008/0133432 A1 6/2008 Ramseyer
2008/0149720 A1 6/2008 Colville
2008/0167578 A1 7/2008 Bryer et al.
2008/0177598 A1 7/2008 Davie
2008/0207198 A1 8/2008 Juric
2008/0228582 A1 9/2008 Fordyce
2008/0228629 A1 9/2008 Gotthelf et al.
2008/0231113 A1 9/2008 Guccione et al.
2008/0255901 A1 10/2008 Carroll et al.
2008/0256008 A1 10/2008 Kwok
2008/0260235 A1 10/2008 Cai et al.
2008/0277467 A1 11/2008 Carlson
2008/0281691 A1 11/2008 Pearson et al.
2008/0296374 A1 12/2008 Gonen et al.
2008/0303915 A1 12/2008 Omi
2008/0306701 A1 12/2008 Zhong et al.
2009/0051907 A1 2/2009 Li et al.
2009/0078775 A1 3/2009 Giebel et al.
2009/0079388 A1 3/2009 Reddy
2009/0095047 A1 4/2009 Patel et al.
2009/0108015 A1* 4/2009 Kreamer ................. G07F 17/40 705/17
2009/0114716 A1 5/2009 Ramachandran
2009/0132813 A1 5/2009 Schibuk
2009/0145727 A1 6/2009 Johns
2009/0156199 A1 6/2009 Steenstra et al.
2009/0160668 A1 6/2009 Crowley et al.
2009/0177319 A1 7/2009 Garibaldi et al.
2009/0184865 A1 7/2009 Valo et al.
2009/0187491 A1 7/2009 Bull et al.
2009/0190142 A1 7/2009 Taylor et al.
2009/0191931 A1* 7/2009 Peck ................... G07F 17/3202 463/7
2009/0207743 A1 8/2009 Huq et al.
2009/0244285 A1 10/2009 Chathukutty
2009/0247133 A1 10/2009 Holmen et al.
2009/0248883 A1 10/2009 Suryanarayana et al.
2009/0251815 A1 10/2009 Wang et al.
2009/0262341 A1 10/2009 Konopa et al.
2009/0265035 A1 10/2009 Jenkinson et al.
2009/0299543 A1 12/2009 Cox et al.
2009/0312009 A1 12/2009 Fishel
2009/0321511 A1 12/2009 Browne
2009/0322706 A1 12/2009 Austin
2010/0005004 A1 1/2010 Hudak et al.
2010/0051695 A1 3/2010 Yepez et al.
2010/0063894 A1 3/2010 Lundy
2010/0088192 A1 4/2010 Bowles et al.
2010/0110174 A1 5/2010 Leconte
2010/0115887 A1 5/2010 Schroeder et al.
2010/0147953 A1 6/2010 Barkan
2010/0157280 A1 6/2010 Kusevic et al.
2010/0161397 A1 6/2010 Gauthier et al.
2010/0162359 A1 6/2010 Casey et al.
2010/0169231 A1 7/2010 Bowles et al.
2010/0174596 A1 7/2010 Gilman
2010/0185506 A1 7/2010 Wolff
2010/0219234 A1 9/2010 Forbes
2010/0228676 A1 9/2010 Librizzi et al.
2010/0235198 A1 9/2010 Fini et al.
2010/0237854 A1 9/2010 Kumhyr et al.
2010/0260271 A1 10/2010 Kapoor
2010/0262481 A1 10/2010 Baker et al.
2010/0268792 A1* 10/2010 Butler .................... G06Q 30/02 715/810
2010/0312639 A1 12/2010 Mastronardi
2011/0035322 A1 2/2011 Lively
2011/0043628 A1 2/2011 Yun
2011/0047022 A1 2/2011 Walker
2011/0050164 A1 3/2011 Partovi et al.
2011/0055322 A1 3/2011 Gregersen
2011/0060641 A1 3/2011 Grossman et al.
2011/0066514 A1 3/2011 Maraz
2011/0067520 A1 3/2011 Ihrke et al.
2011/0082734 A1 4/2011 Zhang et al.
2011/0099264 A1 4/2011 Chapin et al.
2011/0113479 A1 5/2011 Ganem
2011/0173576 A1 7/2011 Murphy et al.
2011/0191861 A1 8/2011 Spears
2011/0235853 A1 9/2011 Bowles et al.
2011/0295417 A1* 12/2011 Smith, III ............... G07F 9/002 700/235
2011/0296339 A1* 12/2011 Kang .................... G06F 3/0482 715/781
2011/0296508 A1 12/2011 Os et al.
2011/0313840 A1 12/2011 Mason et al.
2012/0004761 A1 1/2012 Madruga
2012/0016518 A1* 1/2012 Saario ..................... G07F 9/001 700/232
2012/0022965 A1 1/2012 Seergy
2012/0026582 A1 2/2012 Okabe et al.
2012/0029985 A1 2/2012 Wilson et al.
2012/0030097 A1 2/2012 Hagan et al.
2012/0030399 A1 2/2012 Ben-Harosh
2012/0054113 A1 3/2012 Jayaraman et al.
2012/0063501 A1 3/2012 Aguren
2012/0078413 A1 3/2012 Baker
2012/0095875 A1 4/2012 Guthrie
2012/0116928 A1 5/2012 Gventer
2012/0116929 A1 5/2012 Gventer
2012/0117001 A1 5/2012 Gventer et al.
2012/0127307 A1 5/2012 Hassenzahl
2012/0146956 A1 6/2012 Jenkinson
2012/0191562 A1 7/2012 Bowles et al.
2012/0209783 A1 8/2012 Smith et al.
2012/0235812 A1 9/2012 Mello et al.
2012/0246083 A1 9/2012 Bowles
2012/0249779 A1 10/2012 Ji et al.
2012/0254046 A1 10/2012 Librizzi et al.
2012/0263394 A1 10/2012 Fujiwara et al.
2012/0280934 A1 11/2012 Ha
2012/0294490 A1 11/2012 Bowles et al.
2012/0301009 A1 11/2012 Dabic
2012/0303431 A1 11/2012 Phillips et al.
2013/0006713 A1 1/2013 Haake
2013/0034305 A1 2/2013 Jahanshahi et al.
2013/0041508 A1 2/2013 Hu et al.
2013/0046611 A1 2/2013 Bowles et al.
2013/0046699 A1 2/2013 Bowles et al.
2013/0073376 A1 3/2013 Heath
2013/0112440 A1 5/2013 Alsaif et al.
2013/0124426 A1 5/2013 Bowles et al.
2013/0126741 A1 5/2013 Srivastava et al.
2013/0137376 A1 5/2013 Fitzgerald et al.
2013/0138528 A1 5/2013 McAlhaney
2013/0144797 A1 6/2013 Bowles et al.

(56) References Cited

U.S. PATENT DOCUMENTS

2013/0155061 A1 6/2013 Jahanshahi et al.
2013/0157641 A1 6/2013 Brahami et al.
2013/0159119 A1 6/2013 Henderson et al.
2013/0169413 A1 7/2013 Schuessler
2013/0173430 A1 7/2013 Benjamin
2013/0173434 A1 7/2013 Hartman
2013/0181935 A1 7/2013 Mckenzie et al.
2013/0191236 A1 7/2013 Bowles
2013/0198089 A1 8/2013 Bowles
2013/0198144 A1 8/2013 Bowles
2013/0200912 A1 8/2013 Panagas
2013/0226679 A1 8/2013 Bowles
2013/0246211 A1 9/2013 Sullivan
2013/0246212 A1 9/2013 Sullivan
2013/0246285 A1 9/2013 Chayun et al.
2013/0253700 A1 9/2013 Carson et al.
2013/0275314 A1 10/2013 Bowles
2013/0284805 A1 10/2013 Kraft et al.
2013/0290146 A1 10/2013 West et al.
2013/0297388 A1 11/2013 Kyle, Jr. et al.
2014/0006451 A1 1/2014 Mullis et al.
2014/0012643 A1 1/2014 Behrisch
2014/0028449 A1 1/2014 Sigal et al.
2014/0038556 A1 2/2014 DeSousa
2014/0046748 A1 2/2014 Nagarajan
2014/0046845 A1 2/2014 Dogin et al.
2014/0052329 A1 2/2014 Amirpour
2014/0052463 A1 2/2014 Cashman et al.
2014/0067710 A1 3/2014 Gventer et al.
2014/0080550 A1 3/2014 Ino et al.
2014/0136351 A1 5/2014 Lennon
2014/0143161 A1 5/2014 Ahn
2014/0147004 A1 5/2014 Uchida
2014/0149201 A1 5/2014 Abbott
2014/0150100 A1 5/2014 Gupta et al.
2014/0156883 A1 6/2014 Bowles
2014/0178029 A1* 6/2014 Raheman ................. H04N 5/91 386/224
2014/0214505 A1 7/2014 Shuster-Arechiga et al.
2014/0235258 A1 8/2014 Wang et al.
2014/0244315 A1 8/2014 Cahill et al.
2014/0249668 A1 9/2014 Kavli et al.
2014/0267691 A1* 9/2014 Humphrey .............. G06T 7/001 348/125
2014/0273245 A1 9/2014 Ochranek et al.
2014/0278244 A1 9/2014 Humphrey et al.
2014/0295819 A1 10/2014 Chayun et al.
2014/0297368 A1 10/2014 Ferder
2014/0316561 A1* 10/2014 Tkachenko ........ G06Q 30/0223 700/236
2014/0330685 A1 11/2014 Nazzari
2014/0346185 A1 11/2014 Chayun et al.
2014/0347473 A1 11/2014 Wolff et al.
2015/0006281 A1 1/2015 Takahashi
2015/0046343 A1 2/2015 Martini
2015/0066677 A1 3/2015 Bowles et al.
2015/0073590 A1* 3/2015 Garcia Manchado .. G07F 9/009 700/232
2015/0088698 A1* 3/2015 Ackerman ......... G06Q 30/0637 705/26.82
2015/0088731 A1 3/2015 Ackerman
2015/0105901 A1* 4/2015 Joshi .................... G06Q 20/327 700/232
2015/0120485 A1 4/2015 Nash
2015/0161714 A1 6/2015 Fainshtein
2015/0170237 A1 6/2015 Powell
2015/0177330 A1 6/2015 Morris
2015/0193797 A1 7/2015 Gerrity
2015/0206200 A1 7/2015 Edmondson et al.
2015/0249353 A1* 9/2015 Hamilton, IV ........ G06Q 20/18 320/114
2015/0278529 A1 10/2015 Cho et al.
2015/0293860 A9 10/2015 Bowles
2015/0294278 A1 10/2015 Nguyen
2015/0309912 A1 10/2015 Nguyen et al.
2015/0317619 A1 11/2015 Curtis
2015/0324761 A1 11/2015 Nguyen et al.
2015/0324870 A1 11/2015 Nguyen et al.
2015/0332206 A1 11/2015 Trew et al.
2015/0356637 A1 12/2015 Graffia et al.
2016/0019607 A1 1/2016 Burmester et al.
2016/0019685 A1 1/2016 Nguyen et al.
2016/0055392 A1 2/2016 Nakano
2016/0078434 A1 3/2016 Huxham et al.
2016/0087381 A1 3/2016 Wong et al.
2016/0091549 A1 3/2016 Snook et al.
2016/0092849 A1 3/2016 Cirannek et al.
2016/0098688 A1* 4/2016 Hunt ...................... G06Q 10/30 705/308
2016/0098689 A1 4/2016 Bowles et al.
2016/0098690 A1 4/2016 Silva et al.
2016/0125367 A1 5/2016 Bowles et al.
2016/0125548 A1 5/2016 Bowles et al.
2016/0125612 A1 5/2016 Seki et al.
2016/0132840 A1 5/2016 Bowles et al.
2016/0171456 A1 6/2016 Bowles et al.
2016/0171544 A1 6/2016 Heminger et al.
2016/0171575 A1 6/2016 Bowles et al.
2016/0180371 A1 6/2016 Lawson
2016/0184990 A1 6/2016 Song et al.
2016/0210648 A1 7/2016 Cirannek et al.
2016/0253861 A1* 9/2016 Seo ......................... G07F 13/06 99/330
2016/0269401 A1 9/2016 Saito et al.
2016/0269895 A1 9/2016 Soini et al.
2016/0275460 A1 9/2016 Ploetner et al.
2016/0275518 A1 9/2016 Bowles et al.
2016/0284019 A1 9/2016 Bowles et al.
2016/0292710 A1* 10/2016 Casselle ............. G06Q 30/0211
2016/0301786 A1 10/2016 Koltsov et al.
2016/0327383 A1 11/2016 Becker et al.
2016/0328684 A1 11/2016 Bowles et al.
2016/0335616 A1 11/2016 Bordeleau et al.
2016/0364939 A1* 12/2016 Chayun ................. H04W 24/04
2016/0379287 A1* 12/2016 Dabiri .................... G06Q 40/02 705/26.43
2017/0011374 A1* 1/2017 McDivitt ............ G07F 17/3248
2017/0083886 A1 3/2017 Silva et al.
2017/0091823 A1 3/2017 Adinarayan et al.
2017/0110902 A1 4/2017 Miller
2017/0115235 A1 4/2017 Ohlsson et al.
2017/0123828 A1 5/2017 Ben-Harosh et al.
2017/0142484 A1* 5/2017 Jeon ..................... H04N 21/466
2017/0169401 A1 6/2017 Beane et al.
2017/0221110 A1 8/2017 Sullivan et al.
2017/0249729 A1 8/2017 Greene et al.
2017/0256051 A1 9/2017 Dwivedi et al.
2017/0256119 A1* 9/2017 Abdelmalak .......... G06Q 20/18
2017/0278191 A1 9/2017 Tassone et al.
2017/0286920 A1 10/2017 Silva et al.
2017/0286921 A1 10/2017 Bowles
2017/0301010 A1 10/2017 Bowles et al.
2017/0301035 A1 10/2017 Bowles et al.
2017/0301078 A1 10/2017 Forutanpour et al.
2017/0323279 A1 11/2017 Dion et al.
2017/0330158 A1 11/2017 Librizzi et al.
2017/0343481 A1 11/2017 Jahanshahi et al.
2017/0356857 A1 12/2017 Forutanpour et al.
2017/0372273 A1 12/2017 Bowles et al.
2017/0372465 A1 12/2017 Forutanpour et al.
2018/0084094 A1 3/2018 Sinha et al.
2018/0101810 A1 4/2018 Feng et al.
2018/0122022 A1* 5/2018 Kelly ................. G06Q 30/0633
2018/0130136 A1 5/2018 Bowles et al.
2018/0157246 A1 6/2018 Huang et al.
2018/0157820 A1 6/2018 Adams et al.
2018/0160269 A1 6/2018 Baarman et al.
2018/0165655 A1* 6/2018 Marcelle ............ G06Q 10/1093
2018/0240144 A1 8/2018 Curtis
2018/0247280 A1 8/2018 Bowles et al.
2018/0255047 A1 9/2018 Cicchitto
2018/0260794 A1 9/2018 Bowles et al.
2018/0293566 A1 10/2018 Engles et al.

(56) References Cited

U.S. PATENT DOCUMENTS

| | | | | |
|---|---|---|---|---|
| 2018/0293664 | A1 | 10/2018 | Zhang et al. | |
| 2018/0300776 | A1 | 10/2018 | Yost | |
| 2018/0321163 | A1 | 11/2018 | Casadio | |
| 2018/0322623 | A1 | 11/2018 | Memo et al. | |
| 2018/0342050 | A1 | 11/2018 | Fitzgerald et al. | |
| 2018/0350163 | A1 | 12/2018 | Pofale et al. | |
| 2018/0365744 | A1* | 12/2018 | Lennon | G06Q 30/0601 |
| 2019/0017863 | A1* | 1/2019 | Saltzman | G06Q 20/065 |
| 2019/0019147 | A1 | 1/2019 | McCarty et al. | |
| 2019/0051090 | A1 | 2/2019 | Goldberg et al. | |
| 2019/0066073 | A1 | 2/2019 | Yen et al. | |
| 2019/0066075 | A1 | 2/2019 | Lobo et al. | |
| 2019/0066439 | A1 | 2/2019 | Pinkus | |
| 2019/0073566 | A1 | 3/2019 | Brauer | |
| 2019/0073568 | A1 | 3/2019 | He et al. | |
| 2019/0102874 | A1 | 4/2019 | Goja | |
| 2019/0156611 | A1* | 5/2019 | Redhead | G07F 9/006 |
| 2019/0166278 | A1 | 5/2019 | Hiyama et al. | |
| 2019/0222748 | A1 | 7/2019 | Weir et al. | |
| 2019/0251777 | A1* | 8/2019 | Abdelmalak | G07F 11/64 |
| 2019/0272628 | A1 | 9/2019 | Tsou | |
| 2019/0279181 | A1* | 9/2019 | Kelly | G07F 9/023 |
| 2019/0279431 | A1 | 9/2019 | Wurmfeld et al. | |
| 2019/0287141 | A1 | 9/2019 | Bordeleau et al. | |
| 2019/0318465 | A1 | 10/2019 | Nguyen | |
| 2019/0325530 | A1 | 10/2019 | Bowles et al. | |
| 2019/0372827 | A1 | 12/2019 | Vasseur et al. | |
| 2019/0375300 | A1 | 12/2019 | Lyon | |
| 2020/0020091 | A1 | 1/2020 | Forutanpour et al. | |
| 2020/0020097 | A1 | 1/2020 | Do et al. | |
| 2020/0042795 | A1 | 2/2020 | Lee et al. | |
| 2020/0042969 | A1 | 2/2020 | Ray | |
| 2020/0066067 | A1 | 2/2020 | Herman et al. | |
| 2020/0090137 | A1 | 3/2020 | Bowles et al. | |
| 2020/0104028 | A1* | 4/2020 | Vats | G06F 3/04845 |
| 2020/0104720 | A1 | 4/2020 | Boa et al. | |
| 2020/0104868 | A1 | 4/2020 | Schubert et al. | |
| 2020/0126046 | A1 | 4/2020 | Bowles | |
| 2020/0151677 | A1 | 5/2020 | Bowles et al. | |
| 2020/0151678 | A1 | 5/2020 | Silva et al. | |
| 2020/0151679 | A1 | 5/2020 | Hunt et al. | |
| 2020/0167748 | A1 | 5/2020 | Dion et al. | |
| 2020/0175481 | A1 | 6/2020 | Pham | |
| 2020/0175669 | A1 | 6/2020 | Bian et al. | |
| 2020/0202319 | A1 | 6/2020 | Forutanpour et al. | |
| 2020/0202405 | A1 | 6/2020 | Glickman et al. | |
| 2020/0202419 | A1 | 6/2020 | Beauchamp | |
| 2020/0241891 | A1 | 7/2020 | Li et al. | |
| 2020/0258343 | A1 | 8/2020 | Forutanpour et al. | |
| 2020/0259300 | A1 | 8/2020 | Forutanpour et al. | |
| 2020/0265487 | A1 | 8/2020 | Forutanpour et al. | |
| 2020/0265666 | A1 | 8/2020 | Yamamiya | |
| 2020/0286030 | A1* | 9/2020 | Hewett | G06Q 10/087 |
| 2020/0342442 | A1 | 10/2020 | Curtis | |
| 2020/0387881 | A1* | 12/2020 | Smith | G06F 21/31 |
| 2020/0393742 | A1 | 12/2020 | Dion et al. | |
| 2020/0410793 | A1 | 12/2020 | Folco | |
| 2021/0012315 | A1 | 1/2021 | Priebatsch | |
| 2021/0035206 | A1 | 2/2021 | Bowles et al. | |
| 2021/0081698 | A1 | 3/2021 | Lindeman et al. | |
| 2021/0081914 | A1 | 3/2021 | Nelms et al. | |
| 2021/0110366 | A1 | 4/2021 | Dion et al. | |
| 2021/0110440 | A1 | 4/2021 | Dion et al. | |
| 2021/0150773 | A1 | 5/2021 | Muendel et al. | |
| 2021/0174312 | A1* | 6/2021 | Bowles | G06Q 10/30 |
| 2021/0192484 | A1* | 6/2021 | Forutanpour | G06Q 20/208 |
| 2021/0209512 | A1 | 7/2021 | Gaddam et al. | |
| 2021/0209746 | A1* | 7/2021 | Johnson | G01N 21/95 |
| 2021/0217076 | A1* | 7/2021 | Kruper | G06F 3/0488 |
| 2021/0224867 | A1 | 7/2021 | Bordeleau et al. | |
| 2021/0247016 | A1 | 8/2021 | Affentranger | |
| 2021/0254966 | A1 | 8/2021 | Hur et al. | |
| 2021/0255240 | A1 | 8/2021 | McGrath | |
| 2021/0264483 | A1 | 8/2021 | Hirata | |
| 2021/0272208 | A1 | 9/2021 | Leise et al. | |
| 2021/0278338 | A1* | 9/2021 | Jung | B25B 11/02 |
| 2021/0295494 | A1 | 9/2021 | Forutanpour et al. | |
| 2021/0327203 | A1 | 10/2021 | Shah | |
| 2021/0343030 | A1 | 11/2021 | Sagnoas | |
| 2021/0357545 | A1 | 11/2021 | Sugawara et al. | |
| 2022/0027879 | A1 | 1/2022 | Bowles et al. | |
| 2022/0050897 | A1 | 2/2022 | Gaddam et al. | |
| 2022/0051212 | A1 | 2/2022 | Forutanpour et al. | |
| 2022/0051300 | A1 | 2/2022 | Forutanpour et al. | |
| 2022/0051301 | A1 | 2/2022 | Forutanpour et al. | |
| 2022/0051507 | A1 | 2/2022 | Forutanpour et al. | |
| 2022/0051514 | A1* | 2/2022 | Schmidt | G06K 7/1417 |
| 2022/0067798 | A1 | 3/2022 | Forutanpour et al. | |
| 2022/0068076 | A1 | 3/2022 | Forutanpour et al. | |
| 2022/0084296 | A1* | 3/2022 | Sadalgi | G06T 11/10 |
| 2022/0114854 | A1 | 4/2022 | Forutanpour et al. | |
| 2022/0164833 | A1 | 5/2022 | Dion et al. | |
| 2022/0172178 | A1 | 6/2022 | Forutanpour et al. | |
| 2022/0187802 | A1 | 6/2022 | Wittenberg et al. | |
| 2022/0198407 | A1 | 6/2022 | Beane et al. | |
| 2022/0254216 | A1* | 8/2022 | Schwarzli | G07F 9/023 |
| 2022/0262189 | A1 | 8/2022 | Dion et al. | |
| 2022/0277281 | A1* | 9/2022 | Dion | E05G 1/06 |
| 2022/0284406 | A1 | 9/2022 | Hunt et al. | |
| 2022/0292464 | A1 | 9/2022 | Silva et al. | |
| 2022/0318774 | A1* | 10/2022 | Bowles | G06Q 10/30 |
| 2023/0007937 | A1 | 1/2023 | Forutanpour et al. | |
| 2023/0051060 | A1* | 2/2023 | Nitu | G07C 9/00571 |
| 2023/0077844 | A1* | 3/2023 | Bowles | G06Q 10/30 705/308 |
| 2023/0100849 | A1* | 3/2023 | Bowles | G06Q 20/18 705/308 |
| 2023/0188998 | A1 | 6/2023 | Zellner et al. | |
| 2023/0196865 | A1 | 6/2023 | Forutanpour et al. | |
| 2023/0215109 | A1 | 7/2023 | Ha | |
| 2023/0238751 | A1 | 7/2023 | Forutanpour et al. | |
| 2023/0259910 | A1 | 8/2023 | Forutanpour et al. | |
| 2023/0264871 | A1 | 8/2023 | Williams et al. | |
| 2023/0274346 | A1 | 8/2023 | Bowles et al. | |
| 2023/0297973 | A1 | 9/2023 | Bowles et al. | |
| 2023/0297974 | A1 | 9/2023 | Bowles et al. | |
| 2023/0306384 | A1 | 9/2023 | Bowles et al. | |
| 2023/0371729 | A1 | 11/2023 | Williams et al. | |
| 2023/0394904 | A1 | 12/2023 | Forutanpour et al. | |
| 2024/0005289 | A1 | 1/2024 | Silva et al. | |
| 2024/0087276 | A1 | 3/2024 | Silva et al. | |
| 2024/0144461 | A1 | 5/2024 | Forutanpour et al. | |
| 2024/0185317 | A1 | 6/2024 | Forutanpour et al. | |
| 2024/0249251 | A1 | 7/2024 | Bowles | |
| 2024/0249321 | A1 | 7/2024 | Forutanpour et al. | |
| 2024/0265364 | A1 | 8/2024 | Forutanpour et al. | |
| 2024/0265470 | A1 | 8/2024 | Bowles et al. | |
| 2024/0289753 | A1 | 8/2024 | Bowles | |
| 2024/0289814 | A1 | 8/2024 | Schroder et al. | |
| 2024/0312284 | A1* | 9/2024 | Dion | G06Q 20/18 |
| 2024/0321033 | A1 | 9/2024 | Forutanpour et al. | |
| 2024/0322599 | A1 | 9/2024 | Bober | |
| 2024/0333032 | A1 | 10/2024 | Bober | |
| 2024/0346463 | A1 | 10/2024 | Hunt et al. | |

FOREIGN PATENT DOCUMENTS

| | | | |
|---|---|---|---|
| CA | 3235982 | | 9/2011 |
| CA | 2818533 | A1 | 5/2012 |
| CA | 2866147 | | 9/2013 |
| CA | 2942619 | A1 | 9/2014 |
| CA | 2937152 | A1 | 7/2015 |
| CA | 2985549 | | 11/2016 |
| CA | 3069888 | | 1/2019 |
| CA | 3069890 | | 1/2019 |
| CA | 2926097 | | 11/2020 |
| CN | 1365479 | | 8/2002 |
| CN | 1574437 | | 2/2005 |
| CN | 2708415 | | 7/2005 |
| CN | 1864088 | | 11/2006 |
| CN | 1957320 | | 5/2007 |
| CN | 2912132 | | 6/2007 |
| CN | 200965706 | | 10/2007 |
| CN | 101176124 | | 5/2008 |

(56) References Cited

FOREIGN PATENT DOCUMENTS

| | | | |
|---|---|---|---|
| CN | 101379488 | A | 3/2009 |
| CN | 201956656 | U | 8/2011 |
| CN | 102246384 | | 11/2011 |
| CN | 102315630 | A | 1/2012 |
| CN | 102467728 | A | 5/2012 |
| CN | 202351953 | | 7/2012 |
| CN | 202353475 | U | 7/2012 |
| CN | 102654927 | | 8/2012 |
| CN | 202394296 | | 8/2012 |
| CN | 102682597 | A | 9/2012 |
| CN | 202564711 | U | 11/2012 |
| CN | 102812500 | | 12/2012 |
| CN | 202585951 | U | 12/2012 |
| CN | 202702438 | U | 1/2013 |
| CN | 202711369 | U | 1/2013 |
| CN | 102930642 | | 2/2013 |
| CN | 102976004 | | 3/2013 |
| CN | 103198562 | | 7/2013 |
| CN | 103226870 | | 7/2013 |
| CN | 203242065 | | 10/2013 |
| CN | 103440607 | | 12/2013 |
| CN | 103514641 | | 1/2014 |
| CN | 103544772 | | 1/2014 |
| CN | 203408902 | | 1/2014 |
| CN | 103662541 | | 3/2014 |
| CN | 103679147 | A | 3/2014 |
| CN | 103765455 | | 4/2014 |
| CN | 203520502 | | 4/2014 |
| CN | 103824387 | A | 5/2014 |
| CN | 203588366 | U | 5/2014 |
| CN | 103843040 | | 6/2014 |
| CN | 103954626 | | 7/2014 |
| CN | 103999053 | | 8/2014 |
| CN | 302944037 | S | 9/2014 |
| CN | 302944252 | S | 9/2014 |
| CN | 302944253 | S | 9/2014 |
| CN | 303042750 | S | 12/2014 |
| CN | 205103926 | U | 3/2016 |
| CN | 105488702 | A | 4/2016 |
| CN | 105513201 | | 4/2016 |
| CN | 205129815 | U | 4/2016 |
| CN | 205132514 | U | 4/2016 |
| CN | 205140067 | U | 4/2016 |
| CN | 205247436 | | 5/2016 |
| CN | 106022379 | A | 10/2016 |
| CN | 303896361 | S | 10/2016 |
| CN | 106203643 | A | 12/2016 |
| CN | 106293734 | A | 1/2017 |
| CN | 106372638 | A | 2/2017 |
| CN | 304051346 | S | 2/2017 |
| CN | 304139831 | S | 5/2017 |
| CN | 106911159 | A | 6/2017 |
| CN | 304169301 | S | 6/2017 |
| CN | 206440635 | U | 8/2017 |
| CN | 107220640 | A | 9/2017 |
| CN | 206466691 | U | 9/2017 |
| CN | 107514978 | A | 12/2017 |
| CN | 206861374 | U | 1/2018 |
| CN | 207037788 | U | 2/2018 |
| CN | 105444678 | B | 3/2018 |
| CN | 304702339 | S | 6/2018 |
| CN | 304702340 | S | 6/2018 |
| CN | 304747709 | S | 7/2018 |
| CN | 304795309 | S | 8/2018 |
| CN | 108596658 | A | 9/2018 |
| CN | 207854959 | | 9/2018 |
| CN | 108647588 | A | 10/2018 |
| CN | 207993120 | U | 10/2018 |
| CN | 207993121 | U | 10/2018 |
| CN | 207995226 | U | 10/2018 |
| CN | 304842785 | S | 10/2018 |
| CN | 108764236 | A | 11/2018 |
| CN | 208086545 | U | 11/2018 |
| CN | 208172834 | U | 11/2018 |
| CN | 208176564 | | 12/2018 |
| CN | 304958348 | S | 12/2018 |
| CN | 305014434 | S | 1/2019 |
| CN | 305014435 | S | 1/2019 |
| CN | 208790107 | | 4/2019 |
| CN | 109831575 | A | 5/2019 |
| CN | 208819255 | U | 5/2019 |
| CN | 208819289 | U | 5/2019 |
| CN | 208819290 | U | 5/2019 |
| CN | 208969761 | U | 6/2019 |
| CN | 305275610 | S | 7/2019 |
| CN | 110333876 | A | 10/2019 |
| CN | 110347341 | A | 10/2019 |
| CN | 110595361 | A | 12/2019 |
| CN | 110653162 | A | 1/2020 |
| CN | 110675399 | A | 1/2020 |
| CN | 110751002 | A | 2/2020 |
| CN | 110788015 | A | 2/2020 |
| CN | 110796646 | A | 2/2020 |
| CN | 110796647 | A | 2/2020 |
| CN | 110796669 | A | 2/2020 |
| CN | 110827244 | A | 2/2020 |
| CN | 110827245 | A | 2/2020 |
| CN | 110827246 | A | 2/2020 |
| CN | 110827247 | A | 2/2020 |
| CN | 110827248 | A | 2/2020 |
| CN | 110827249 | A | 2/2020 |
| CN | 110880028 | A | 3/2020 |
| CN | 110928730 | A | 3/2020 |
| CN | 305638504 | S | 3/2020 |
| CN | 11080184 | A | 4/2020 |
| CN | 110976302 | A | 4/2020 |
| CN | 111009073 | A | 4/2020 |
| CN | 210348162 | U | 4/2020 |
| CN | 111175318 | A | 5/2020 |
| CN | 111210473 | A | 5/2020 |
| CN | 305767220 | S | 5/2020 |
| CN | 111238430 | A | 6/2020 |
| CN | 111262987 | A | 6/2020 |
| CN | 111272067 | A | 6/2020 |
| CN | 111272388 | A | 6/2020 |
| CN | 111272393 | A | 6/2020 |
| CN | 111273704 | A | 6/2020 |
| CN | 111277466 | A | 6/2020 |
| CN | 111277659 | A | 6/2020 |
| CN | 111277695 | A | 6/2020 |
| CN | 111277696 | A | 6/2020 |
| CN | 111290660 | A | 6/2020 |
| CN | 111290949 | A | 6/2020 |
| CN | 111291661 | A | 6/2020 |
| CN | 111292302 | A | 6/2020 |
| CN | 111294454 | A | 6/2020 |
| CN | 111294459 | A | 6/2020 |
| CN | 111307429 | A | 6/2020 |
| CN | 111311556 | A | 6/2020 |
| CN | 111311687 | A | 6/2020 |
| CN | 111311749 | A | 6/2020 |
| CN | 111314445 | A | 6/2020 |
| CN | 111314535 | A | 6/2020 |
| CN | 111325715 | A | 6/2020 |
| CN | 111325716 | A | 6/2020 |
| CN | 111325717 | A | 6/2020 |
| CN | 111325901 | A | 6/2020 |
| CN | 210666955 | U | 6/2020 |
| CN | 305818424 | S | 6/2020 |
| CN | 111439560 | A | 7/2020 |
| CN | 211149556 | U | 7/2020 |
| CN | 305955503 | S | 7/2020 |
| CN | 211291337 | U | 8/2020 |
| CN | 211296771 | U | 8/2020 |
| CN | 211402187 | U | 9/2020 |
| CN | 211515235 | U | 9/2020 |
| CN | 211538600 | U | 9/2020 |
| CN | 111830293 | A | 10/2020 |
| CN | 111830354 | A | 10/2020 |
| CN | 111860890 | A | 10/2020 |
| CN | 111860891 | A | 10/2020 |
| CN | 211630227 | U | 10/2020 |
| CN | 306113050 | S | 10/2020 |
| CN | 306113051 | S | 10/2020 |

(56) References Cited

FOREIGN PATENT DOCUMENTS

| | | | |
|---|---|---|---|
| CN | 306113052 | S | 10/2020 |
| CN | 212023984 | U | 11/2020 |
| CN | 212031269 | U | 11/2020 |
| CN | 306164092 | S | 11/2020 |
| CN | 306164093 | S | 11/2020 |
| CN | 306164094 | S | 11/2020 |
| CN | 306164095 | S | 11/2020 |
| CN | 112098443 | A | 12/2020 |
| CN | 212084259 | U | 12/2020 |
| CN | 212268703 | U | 1/2021 |
| CN | 212314534 | U | 1/2021 |
| CN | 212322247 | U | 1/2021 |
| CN | 212364464 | U | 1/2021 |
| CN | 306272538 | S | 1/2021 |
| CN | 306283626 | S | 1/2021 |
| CN | 112348761 | A | 2/2021 |
| CN | 112348808 | A | 2/2021 |
| CN | 112393880 | A | 2/2021 |
| CN | 112395118 | A | 2/2021 |
| CN | 212460662 | U | 2/2021 |
| CN | 212586854 | U | 2/2021 |
| CN | 212597202 | U | 2/2021 |
| CN | 306323627 | S | 2/2021 |
| CN | 112433902 | A | 3/2021 |
| CN | 112452935 | A | 3/2021 |
| CN | 112455988 | A | 3/2021 |
| CN | 112456100 | A | 3/2021 |
| CN | 112565505 | A | 3/2021 |
| CN | 212677296 | U | 3/2021 |
| CN | 212681731 | U | 3/2021 |
| CN | 111314537 | B | 4/2021 |
| CN | 112613622 | A | 4/2021 |
| CN | 112613914 | A | 4/2021 |
| CN | 112614117 | A | 4/2021 |
| CN | 112614269 | A | 4/2021 |
| CN | 112633194 | A | 4/2021 |
| CN | 112634245 | A | 4/2021 |
| CN | 112634288 | A | 4/2021 |
| CN | 112634301 | A | 4/2021 |
| CN | 112672145 | A | 4/2021 |
| CN | 112735081 | A | 4/2021 |
| CN | 213001252 | U | 4/2021 |
| CN | 213004872 | U | 4/2021 |
| CN | 112777290 | A | 5/2021 |
| CN | 112783702 | A | 5/2021 |
| CN | 112816490 | A | 5/2021 |
| CN | 112822740 | A | 5/2021 |
| CN | 112828842 | A | 5/2021 |
| CN | 112837076 | A | 5/2021 |
| CN | 112837102 | A | 5/2021 |
| CN | 213149008 | U | 5/2021 |
| CN | 213301455 | U | 5/2021 |
| CN | 213301535 | U | 5/2021 |
| CN | 213305483 | U | 5/2021 |
| CN | 112907182 | A | 6/2021 |
| CN | 112991614 | A | 6/2021 |
| CN | 113032198 | A | 6/2021 |
| CN | 113034481 | A | 6/2021 |
| CN | 113034493 | A | 6/2021 |
| CN | 113034529 | A | 6/2021 |
| CN | 113034530 | A | 6/2021 |
| CN | 113034531 | A | 6/2021 |
| CN | 113038012 | A | 6/2021 |
| CN | 113052798 | A | 6/2021 |
| CN | 113110806 | A | 7/2021 |
| CN | 113114794 | A | 7/2021 |
| CN | 113132523 | A | 7/2021 |
| CN | 113160494 | A | 7/2021 |
| CN | 113190215 | A | 7/2021 |
| CN | 113191789 | A | 7/2021 |
| CN | 213765490 | U | 7/2021 |
| CN | 213796595 | U | 7/2021 |
| CN | 213807304 | U | 7/2021 |
| CN | 306700330 | S | 7/2021 |
| CN | 113220647 | A | 8/2021 |
| CN | 113220648 | A | 8/2021 |
| CN | 113237473 | A | 8/2021 |
| CN | 113238680 | A | 8/2021 |
| CN | 113238905 | A | 8/2021 |
| CN | 113252678 | A | 8/2021 |
| CN | 113254292 | A | 8/2021 |
| CN | 113254293 | A | 8/2021 |
| CN | 113254294 | A | 8/2021 |
| CN | 113268162 | A | 8/2021 |
| CN | 113298078 | A | 8/2021 |
| CN | 113301202 | A | 8/2021 |
| CN | 113329222 | A | 8/2021 |
| CN | 213917879 | U | 8/2021 |
| CN | 213933659 | U | 8/2021 |
| CN | 306744667 | S | 8/2021 |
| CN | 306744668 | S | 8/2021 |
| CN | 306786433 | S | 8/2021 |
| CN | 306786434 | S | 8/2021 |
| CN | 113422860 | A | 9/2021 |
| CN | 214160736 | U | 9/2021 |
| CN | 214162705 | U | 9/2021 |
| CN | 214427985 | U | 10/2021 |
| CN | 113591066 | A | 11/2021 |
| CN | 113591963 | A | 11/2021 |
| CN | 113808322 | A | 12/2021 |
| CN | 215246545 | U | 12/2021 |
| CN | 215247165 | U | 12/2021 |
| CN | 215247245 | U | 12/2021 |
| CN | 215247426 | U | 12/2021 |
| CN | 215262785 | U | 12/2021 |
| CN | 215262787 | U | 12/2021 |
| CN | 215266884 | U | 12/2021 |
| CN | 215266954 | U | 12/2021 |
| CN | 215325354 | U | 12/2021 |
| CN | 113887609 | A | 1/2022 |
| CN | 113901996 | A | 1/2022 |
| CN | 113947445 | A | 1/2022 |
| CN | 215555043 | U | 1/2022 |
| CN | 215556081 | U | 1/2022 |
| CN | 215575427 | U | 1/2022 |
| CN | 215576764 | U | 1/2022 |
| CN | 215576765 | U | 1/2022 |
| CN | 114038114 | A | 2/2022 |
| CN | 114063364 | A | 2/2022 |
| CN | 114066367 | A | 2/2022 |
| CN | 215703219 | U | 2/2022 |
| CN | 215708961 | U | 2/2022 |
| CN | 114155260 | A | 3/2022 |
| CN | 114170419 | A | 3/2022 |
| CN | 114170435 | A | 3/2022 |
| CN | 114186702 | A | 3/2022 |
| CN | 114219105 | A | 3/2022 |
| CN | 114281627 | A | 4/2022 |
| CN | 114298204 | A | 4/2022 |
| CN | 114298345 | A | 4/2022 |
| CN | 114299293 | A | 4/2022 |
| CN | 114299657 | A | 4/2022 |
| CN | 114328051 | A | 4/2022 |
| CN | 114330533 | A | 4/2022 |
| CN | 114330534 | A | 4/2022 |
| CN | 114332016 | A | 4/2022 |
| CN | 114371417 | A | 4/2022 |
| CN | 114374795 | A | 4/2022 |
| CN | 114386629 | A | 4/2022 |
| CN | 114494856 | A | 5/2022 |
| CN | 216612155 | U | 5/2022 |
| CN | 216751854 | U | 6/2022 |
| CN | 216751855 | U | 6/2022 |
| CN | 217133280 | U | 8/2022 |
| CN | 217133770 | U | 8/2022 |
| CN | 217550626 | U | 10/2022 |
| CN | 217589621 | U | 10/2022 |
| CN | 307592104 | S | 10/2022 |
| CN | 217820056 | U | 11/2022 |
| CN | 113870223 | A | 12/2022 |
| CN | 115512480 | A | 12/2022 |
| CN | 218260123 | U | 1/2023 |
| CN | 218313632 | U | 1/2023 |
| CN | 218329991 | U | 1/2023 |

(56) References Cited

FOREIGN PATENT DOCUMENTS

| | | | |
|---|---|---|---|
| CN | 218332714 | U | 1/2023 |
| CN | 218336838 | U | 1/2023 |
| CN | 112672145 | B | 2/2023 |
| CN | 218497120 | U | 2/2023 |
| DE | 10031532 | | 10/2001 |
| EP | 0116970 | | 12/1991 |
| EP | 0654003 | | 5/1995 |
| EP | 1168253 | | 1/2002 |
| EP | 1270905 | | 1/2003 |
| EP | 1699020 | | 9/2006 |
| EP | 1703436 | | 9/2006 |
| EP | 2701450 | | 2/2014 |
| EP | 2810219 | | 12/2014 |
| EP | 2974137 | A4 | 4/2017 |
| EP | 3206194 | A1 | 8/2017 |
| EP | 3255753 | | 12/2017 |
| EP | 2428072 | | 1/2018 |
| EP | 3295434 | A1 | 3/2018 |
| ES | 2304327 | | 10/2008 |
| FR | 3047833 | B1 | 3/2018 |
| GB | 2167553 | | 5/1986 |
| GB | 202012494 | | 9/2020 |
| GB | 202209941 | | 7/2022 |
| GR | 20210100761 | | 7/2022 |
| HK | 30014296 | A | 8/2020 |
| IL | 241616 | A | 12/2015 |
| JP | H7112801 | | 5/1995 |
| JP | H7334583 | | 12/1995 |
| JP | H11242005 | | 9/1999 |
| JP | H11334851 | | 12/1999 |
| JP | 2000121564 | | 4/2000 |
| JP | 2000171409 | A | 6/2000 |
| JP | 2000180371 | | 6/2000 |
| JP | 3123095 | | 1/2001 |
| JP | 2001312766 | | 11/2001 |
| JP | 2002019147 | | 1/2002 |
| JP | 2002183286 | | 6/2002 |
| JP | 2002259528 | | 9/2002 |
| JP | 2002302252 | | 10/2002 |
| JP | 2002324264 | | 11/2002 |
| JP | 2002358354 | | 12/2002 |
| JP | 2003016179 | A | 1/2003 |
| JP | 2003139516 | | 5/2003 |
| JP | 2003230229 | | 8/2003 |
| JP | 2003242243 | | 8/2003 |
| JP | 2003264007 | | 9/2003 |
| JP | 2003267509 | | 9/2003 |
| JP | 2004021569 | | 1/2004 |
| JP | 2004191496 | | 7/2004 |
| JP | 2004226129 | | 8/2004 |
| JP | 2004226328 | A | 8/2004 |
| JP | 2004239850 | | 8/2004 |
| JP | 2004288143 | | 10/2004 |
| JP | 2004303102 | | 10/2004 |
| JP | 2004341681 | | 12/2004 |
| JP | 2005063203 | | 3/2005 |
| JP | 2005122059 | | 5/2005 |
| JP | 2005308476 | | 11/2005 |
| JP | 2006127308 | | 5/2006 |
| JP | 2006195814 | | 7/2006 |
| JP | 2006203451 | | 8/2006 |
| JP | 2006227764 | | 8/2006 |
| JP | 2006260246 | | 9/2006 |
| JP | 2007141266 | | 6/2007 |
| JP | 2007155455 | | 6/2007 |
| JP | 2007179516 | | 7/2007 |
| JP | 2007265340 | | 10/2007 |
| JP | 2008045959 | | 2/2008 |
| JP | 2008059403 | | 3/2008 |
| JP | 2008522299 | | 6/2008 |
| JP | 2008293391 | | 12/2008 |
| JP | 2007086725 | | 4/2009 |
| JP | 2009175035 | | 8/2009 |
| JP | 2009245058 | | 10/2009 |
| JP | 2009250971 | | 10/2009 |
| JP | 2009290852 | | 12/2009 |
| JP | 2010177720 | | 8/2010 |
| JP | 2010276896 | | 12/2010 |
| JP | 2011518387 | | 6/2011 |
| JP | 2012032370 | | 2/2012 |
| JP | 2012504832 | | 2/2012 |
| JP | 2012058932 | | 3/2012 |
| JP | 2013033361 | | 2/2013 |
| JP | 2013037441 | | 2/2013 |
| JP | 2013531823 | | 8/2013 |
| JP | 2014513829 | A | 6/2014 |
| JP | 2015505999 | A | 2/2015 |
| JP | 2015513135 | | 4/2015 |
| JP | 2016504900 | | 2/2016 |
| JP | 6050922 | B2 | 12/2016 |
| JP | 2017040957 | A | 2/2017 |
| JP | 2017093938 | | 6/2017 |
| JP | 2017142781 | A | 8/2017 |
| JP | 2017173902 | A | 9/2017 |
| JP | 2017201559 | | 11/2017 |
| JP | 6266065 | B1 | 3/2018 |
| JP | 2018520453 | A | 7/2018 |
| JP | 2019012474 | | 1/2019 |
| JP | 3223233 | U | 9/2019 |
| JP | 2020526847 | | 8/2020 |
| JP | 2021530786 | A | 11/2021 |
| JP | 2022539909 | A | 9/2022 |
| JP | 2022539910 | A | 9/2022 |
| JP | 2022539912 | A | 9/2022 |
| JP | 2022545336 | A | 9/2022 |
| KR | 20000064168 | | 11/2000 |
| KR | 20010074614 | | 8/2001 |
| KR | 20010097567 | | 11/2001 |
| KR | 100581234 | B1 | 5/2006 |
| KR | 100766860 | | 10/2007 |
| KR | 20130085255 | | 7/2013 |
| KR | 101326680 | | 11/2013 |
| KR | 101329949 | | 11/2013 |
| KR | 20140037543 | | 3/2014 |
| KR | 101599251 | | 3/2016 |
| KR | 20180086617 | | 8/2018 |
| KR | 20180088062 | | 8/2018 |
| KR | 20180088063 | | 8/2018 |
| KR | 20180117278 | | 10/2018 |
| KR | 20190026131 | | 3/2019 |
| KR | 20190107593 | | 9/2019 |
| KR | 20190107594 | | 9/2019 |
| KR | 20190107595 | | 9/2019 |
| KR | 20190107596 | | 9/2019 |
| KR | 20200115308 | | 10/2020 |
| KR | 20210020717 | | 2/2021 |
| KR | 20210059148 | | 5/2021 |
| KR | 20210107515 | | 9/2021 |
| WO | 8503790 | | 8/1985 |
| WO | 2001015096 | | 3/2001 |
| WO | 2002005176 | | 1/2002 |
| WO | 221090 | | 3/2002 |
| WO | 2002025613 | | 3/2002 |
| WO | 2002039357 | | 5/2002 |
| WO | 2003012717 | | 2/2003 |
| WO | 2003014994 | | 2/2003 |
| WO | 2004021114 | | 3/2004 |
| WO | 2004114490 | | 12/2004 |
| WO | 2005008566 | | 1/2005 |
| WO | 2005054877 | | 6/2005 |
| WO | 2005101346 | | 10/2005 |
| WO | 2006021825 | | 3/2006 |
| WO | 2006058601 | | 6/2006 |
| WO | 2006080851 | | 8/2006 |
| WO | 2007066166 | | 6/2007 |
| WO | 2009089607 | | 7/2009 |
| WO | 2009128173 | | 10/2009 |
| WO | 2009128176 | | 10/2009 |
| WO | 2009129526 | | 10/2009 |
| WO | 2010040116 | | 4/2010 |
| WO | 2010128267 | | 11/2010 |
| WO | 2010128315 | | 11/2010 |
| WO | 2011115857 | A2 | 9/2011 |
| WO | 2011131016 | | 10/2011 |

(56) References Cited

FOREIGN PATENT DOCUMENTS

| | | |
|---|---|---|
| WO | 2012073126 | 6/2012 |
| WO | 2012138679 | 10/2012 |
| WO | 2013002748 | 1/2013 |
| WO | 2013063042 | 5/2013 |
| WO | 2013074819 | 5/2013 |
| WO | 2013116256 | 8/2013 |
| WO | 2014033350 | 3/2014 |
| WO | 2014075055 | 5/2014 |
| WO | 2014088978 | 6/2014 |
| WO | 2014141180 | 9/2014 |
| WO | 2015022409 | 2/2015 |
| WO | 2015093676 | 6/2015 |
| WO | 2015108864 | 7/2015 |
| WO | 2015146026 | 10/2015 |
| WO | 2016181224 | 11/2016 |
| WO | 2015196175 A1 | 12/2016 |
| WO | 2016196175 | 12/2016 |
| WO | 2017034441 | 3/2017 |
| WO | 2017052684 A1 | 3/2017 |
| WO | 2017081527 | 5/2017 |
| WO | 2017156046 | 9/2017 |
| WO | 2018124669 | 7/2018 |
| WO | 2018133068 | 7/2018 |
| WO | 2018146374 | 8/2018 |
| WO | 2019012305 | 1/2019 |
| WO | 2019012505 | 1/2019 |
| WO | 2019012506 | 1/2019 |
| WO | 2019212513 | 11/2019 |
| WO | 2019212515 | 11/2019 |
| WO | 2019008943 | 4/2020 |
| WO | 2020082991 | 4/2020 |
| WO | 2020204503 | 10/2020 |
| WO | 2021019286 | 2/2021 |
| WO | 2021082918 A1 | 5/2021 |
| WO | 2021082919 A1 | 5/2021 |
| WO | 2021082920 A1 | 5/2021 |
| WO | 2021082921 A1 | 5/2021 |
| WO | 2021082922 A1 | 5/2021 |
| WO | 2021082923 | 5/2021 |
| WO | 2021142009 | 7/2021 |
| WO | 2021147385 | 7/2021 |
| WO | 2021147386 | 7/2021 |
| WO | 2021147387 | 7/2021 |
| WO | 2021147388 A1 | 7/2021 |
| WO | 2021172803 | 9/2021 |
| WO | 2022034298 | 2/2022 |
| WO | 2022090999 | 5/2022 |
| WO | 2022091000 | 5/2022 |
| WO | 2023073248 | 5/2023 |

OTHER PUBLICATIONS

3GPP Organizational Partners, "3rd Generation Partnership Project; Technical Specification Group Terminals; AT command set for GSM Mobile Equipment (ME)," Global System for Mobile Communications, 1998, 124 pages.

Aftermarket Cellular Accessories, "Cellular Phone Model Identification," retrieved from http://web/archive.org/web/20060328064957/http://aftermarketcellular.com/ic/identification.html on Mar. 16, 2014, published Mar. 28, 2006, 3 pages.

Altec Lansing User's Guide 2007, 8 pages.

Anderle, Megan, "Verizon's new app aims to make phone recycling easy and profitable", Internet Article, May 1, 2014, XP093222792, retrieved from the Internet: URL: https://www.theguardian.com/sustainable-business/verizon-mobile-phone-recycling-cell-ecoatm.

Bhule et al., "Environmental and economic trade-offs in consumer electronic products recycling: a case study of cell phones and computers," IEEE International Symposium on Electronics and the Environment, Conference Record, 2004.

Bournique, D.: "Mobile Karma Shuts Down as iCloud and Blacklists Challenge Used Phone Buyers", Prepaid Phone News, Jul. 23, 2014 (Jul. 23, 2014), XP055229747, Retrieved from the Internet <URL:http://www.prepaidphonenews.com/2014/07/mobile-karma-shuts-down-as-icloud-and.html>; accessed Nov. 27, 2017; 2 pages.

Business Wire, "The World's First Office Photography Machine" at CES 2008 Launched by Ortery Technologies, Jan. 7, 2008, 3 pages.

Cnet, "Tackling LCD "burn in", and dead/stick Pixels", published Sep. 2, 2009, retrieved from http://www.cnet.com/news/tackling-LCD-burn-ins-and-deadstuck-pixels/.

Cybercom Group Europe AB, "OMSI Forum," Downloads, 2005, 2 pages.

Cybercom Group Europe AB, "OMSI Provides Easy Service and Maintenance for Mobile Phones," Press Release, 2005, 1 page.

Cybercom Group Europe AB, "The OMSI 2.0 Interface Supports," OMSI 2.0 Description, available at least before Oct. 2008, 1 page.

Cybercom Group, "Leading Telecom Organisations Address Device Management Issues," Press Release, 2007, 1 page.

Evgenii Masunov, Mar. 25, 2010, http://www.appleinsider.ru/news/ipone-obladaet-luchshim-tachskrinom-provereno_robotom.html, 4 pages.

Final Office Action mailed Mar. 3, 2022 in U.S. Appl. No. 16/719,699, 20 pages.

Final Office Action response filed May 25, 2022 in U.S. Appl. No. 16/719,699, 17 pages.

Foster et al., "Automated Visual Inspection: A Tutorial" 1990 Computers Ind. Eng. vol. 18(4): 493-504.

Geekanoids, You Tube Video, "Apple iPhone 3GS Unboxing and Review", uploaded on Jun. 19, 2009, retrieved from http://www.youtube.com/watch?v=GCEi9QAeDqk on Sep. 2, 2009.

Geyer et al. "The economics of cell phone reuse and recycling," The International Journal of Advanced Manufacturing Technology, 47(5): 515-525, 2010.

Graffia et al., "Retail Station for E-Device Identification, Assessment, and Trade-In", Jun. 6, 2014 (Drawings and Specification) (Year: 2014).

Grose, Thomas; "New Life for Old Phones," ASE Prism 22.3 (2012): 18.

GSM Arena Glossary, "LCD (Liquid Crystal Display", retrieved from http://www.gsmarena.com/glossary.php3?term=LCD on Apr. 28, 2016, 1 page.

Hassan, et al.; "A Novel Cascaded Deep Neural Network for Analyzing Smart Phone Data for Indoor Localization", Dec. 2019, vol. 101, pp. 760-769, Future Generation Computer Systems.

Hazelwood, et al.; "Life Extension of Electronic Products: A Case Study of Smartphones", Sep. 20, 2021, IEEE Access, vol. 9, pp. 144726-144739, DOI: 10.1109/ACCESS.2021.3121733.

International Numbering Plan. Retrieved on Apr. 5, 2013 at <http://web.archive.org/web/20070322214125/http://www.numberingplans.com/?page+analysis&sub+imeinr>, 2 pages.

International Search Report and Written Opinion mailed Mar. 25, 2020 in International Application No. PCT/US2019/067268, 11 pages.

International Search Report and Written Opinion mailed May 19, 2022 in International Application No. PCT/US2021/073020, 22 pages.

Investopedia: What's the difference between weighted average accounting and FIFO/LIFO accounting methods? Aug. 19, 2010. Accessed via archive.org [https://web.archive.org/web/20100819200402/http://www.investopedia.com/ask/answers/09/weighted-average-fifo-lifo-accounting.asp].

Kanter, James Max, "Color Crack:Identifying Cracks in Glass," dated Dec. 9, 2014; retrieved from the internet http://www.jmaxkanter.com/static/papers/color_crack.pdf on Sep. 22, 2017.

Kuriyan, et al.: "Review of Research on Rural PC Kiosks," Apr. 14, 2007, 22 pages, retrieved at http://research.microsoft.com/research/tem/kiosks.

Lambert, Emily, "Use It Up, Wear It Out", Forbes 175.5 (2005): 77-78. Business Source Complete. Web. Jan. 6, 2015, 3 pages.

Littleton Partners with Donations Ink (Jan. 19, 2006) US Fed News Service, Including US State News. Web. Jan. 6, 2015, 1 page.

MobileGazette.com, "2006 in Review: The Good, The Bad and The Ugly", published Dec. 2006, retrieved from http://www.mobilegazette.com/2006-review-06x12x22.htm on Nov. 11, 2015.

Nithi et al., "Smart Power Management for Mobile Handsets".

(56) References Cited

OTHER PUBLICATIONS

Non-Final Office Action mailed Apr. 29, 2021 in U.S. Appl. No. 16/719,699, 14 pages.
Non-Final Office Action mailed Dec. 19, 2022 in U.S. Appl. No. 16/719,699, 16 pages.
Non-Final Office Action mailed Jun. 16, 2025 in U.S. Appl. No. 18/639,420, p. 66.
Non-Final Office Action mailed Jun. 5, 2024 in U.S. Appl. No. 17/645,039, pp. all.
Non-Final Office Action mailed Sep. 28, 2023 in U.S. Appl. No. 17/645,039, 13 pages.
Non-Final Office Action response filed Feb. 28, 2024 in U.S. Appl. No. 17/645,039, 9 pages.
Non-Final Office Action response filed Jun. 20, 2023 in U.S. Appl. No. 16/719,699, XX pages.
Non-Final Office Action response filed Oct. 29, 2021 in U.S. Appl. No. 16/719,699, 19 pages.
Non-Final Office Action response filed Oct. 3, 2024 in U.S. Appl. No. 17/645,039, pp. all.
Notice of Allowance mailed Jan. 27, 2025 in U.S. Appl. No. 17/645,039, pp. all.
Notice of Allowance mailed Mar. 14, 2014 in U.S. Appl. No. 16/719,699, pp. all.
Notice of Allowance mailed Sep. 14, 2022 in U.S. Appl. No. 16/719,699, 10 pages.
Notice of Allowance mailed Sep. 18, 2013 in U.S. Appl. No. 16/719,699, pp. all.
Novotny, et al.; "Smart City Concept, Applications and Services," Aug. 26, 2014, Journal of Telecommunications System & Management, vol. 3, Issue 2, pp. 1-8, DOI: 10.4172/2167-0919.1000117.
Oliveira, et al., "Automatic crack detection on road imagery using anisotropic diffusion and region linkage," 18th European Signal Processing Conference (EUSIPCO-2010), Aug. 23, 2010, pp. 274-278.
Park, et al., "Ambiguous Surface Defect Image Classification of AMOLED Displays in Smartphones", Jan. 26, 2016, IEEE Transactions on Industrial Informatics, vol. 12, Issue 2, pp. 597-607, DOI: 10.1109/TII.2016.2522191.
PC World, "Wipe Your Cell Phone's Memory Before Giving it Away", published Jan. 2006, retrieved from http://www.washingtonpost.com/wp-dyn/content/article/2006/01/30/AR2006013001144.html on Nov. 10, 2015.
Perng et al., "A Novel Vision System for CRT Panel Auto-Inspection", Journal of the Chinese Institute of Industrial Engineers, vol. 24, No. 5, pp. 341-350 (2007).
Perng et al., "A Novel Vision System for CRT Panel Auto-Inspection", Proceedings of the 2005 IEEE International Conference on Mechatronics, Jul. 10-12, 2005, pp. 4.
Phifer, "How to Use your 3G Phone as a Wireless Broad Band Modem," Computer Weekly News, 2007, 6 pages.
Rawson, Chris, "TUAW: 25 Ways to Check the Hardware on Your iPhone 4", published Aug. 12, 2010, retrieved at http://www.tuaw.com/2010/08/13/hardware-test-your-iphone-4/ on Feb. 28, 2014.
Rehg et al. "Vision for a Smart Kiosk", Jun. 1997, Computer Vision and Pattern Recognition, pp. 690-696.
RMS Communications Group, "RMS Communications Group Inc. opens cell phone kiosk at Ocean City Mall in Toms River, N.J.", retrieved from http://www.prweb.com/releases/2004/11/prweb177351.htm, Nov. 12, 2004, 2 pages.
Rolf Steinhilper "Remanufacturing: The Ultimate Form of Recycling", Fraunhofer IRBVerlag, 1998, parts 1-3, http://www.reman.org/Publications_main.htm.
Romano "Recycling a Phone at EcoATM is an Easy Route to Feeling Green," Xconomy, Jan. 22, 2014, pp. 1-3.
Rosebrock, "How to Build a Kick-Ass Mobile Document Scanner in Just 5 Minutes" Pylmage Search, Sep. 2014, 19 pages.
Shotton et al., "Efficiently Combining Contour and Texture Cues for Object Recognition", Proceedings of the British Machine Vision Conference 2008, (Sep. 1, 2008), pp. 7.1-7.10 * abstract *.
Shue, Jiuh-Biing et al. "Extended consumer responsibility: Syncretic value-oriented pricing strategies for trade-in-for-upgrade programs" Transportation Research Part E: Logistics and Transportation Review 122 (2019) 350-367.
SimplySellular, "Get Cash for your Old Cell Phone", published Apr. 2, 2010, retrieved from http://simplysellular.com/conditions.php on Jan. 6, 2015, 2 pages.
Sony Ericsson Mobile Communications AB, "P800/P802," White Paper, 2003, 128 pages.
Sony Ericsson Mobile Communications AB, "T68i/T68ie," White Paper, 2002, 71 pages.
TecAce Software: "Android Smartphone Testing App—Movaluate—TecAce Software | PRLog" Internet Article, May 6, 2013, XP093222769, retrieved from the Internet: URL: https://www.prlog.org/12132313-android-smartphone-testing-app-movaluate.html.
Tecace Software: "Your phone appraisal-Movaluate—Android Apps on Google Play", Android Apps on Google Play, Aug. 12, 2013 (Aug. 12, 2013), XP055230264, Retrieved from the Internet <URL:https://play.google.com/store/apps/details?id=com.tecace.android.app.movaluate&hl=en>; accessed Nov. 27, 2017; 2 pages.
Tech Spurt; Sandisk iXpand Review, Wireless Charger & Auto Photo Backup!, Aug. 21, 2019, 1 page, retrieved at https://www.youtube.com/watch?v=zemKQ6xULww.
Trading devices for dollars, The Economist (US) 405.8813:8 (US), Economist Intelligence Unit N.A. Incorporated, Dec. 1, 2012.
Turner, "5 MP3 Players for Pumping Up Your Workouts," Mashable.com, Nov. 4, 2010, available online at https://mashable.com/2010/11/04/mp3-players-for-sports/ (Year: 2010).
Tuzun, "Usability testing of a 3D touch screen kiosk system for way-finding," Computers in Human Behavior vol. 61, Aug. 2016, pp. 73-79.
Watson; "Review: SanDisk iXpand Wireless Charger" Sep. 15, 2019, 4 pages retrieved at https://www.whatmobile.net/Reviews/article/review-sandisk-ixpand-wireless-charger.
Waugh, "Phone recycling machine lets you drop in old mobiles—and spits out cash instantly," Daily Mail Online, Jan. 13, 2012, p. 1-2.
Wikipedia, "Machine Vision" Sep. 19, 2009, 6 pages.
Wiley Encyclopedia of Computer Science and Technology, Nov. 2008, 2362 pages, Wiley-interscience, ISBN-10: 0471383937, ISBN-13: 978-0471383932.
Wilson, Doug, "Liquid Crystal Display (LCD) Inspection System", National Instruments Case Study, available May 10, 2009, retrieved from http://sine.ni.com/cs/app/cod/p/id/cs-345 on Jan. 5, 2015, 2 pages.
Wu, "Overview of Wireless Power and Data Communication" WPC/QI Developers Forum, Oct. 29, 2016, 21 pages.
Yahoo Answers, "What is a Clean ESN?" published Jun. 23, 2009, retrieved from http://web.archive.org/web/20090623215042/http://answers.yahoo.com/question/inde,8020US?qid=20080318061012AANFRco on Apr. 3, 2014.
Zhang, Yiyang, "The design of glass crack detection system based on image preprocessing technology," 2014 IEEE 7th Joint International Information Technology and Artificial Intelligence Conference, IEEE, Dec. 20, 2014; pp. 39-42.
Belak, "Terotechnology," 2004 IEEE, pp. 201-204.
Huang et al., "Construction of an Automatic Inspection system using capability of identifying Color Characteristics of Products," 2008, pp. 1-6 (Year 2006).
Non-Final Office Action mailed Oct. 1, 2025 in U.S. Appl. No. 19/028,229, pp. 13.
Notice of Allowance mailed Apr. 9, 2026 in U.S. Appl. No. 19/028,229, pp. 11.
PTO Response to Rule 312 Communication mailed Mar. 12, 2026 in U.S. Appl. No. 18/639,420, pp. 2.
Shi, "The LOB Recreation Model: Predicting the Limit Order Book from TAQ History Using an Ordinary Differential Equation Recurrent Neural Network" 548-556. The Thirty-Fifth AAAI Conference on Artificial Intelligence. 2021; <DOI: 10.48550/arXiv.2103.01670> abstract; p. 551, 2nd column, 1st paragraph; p. 552, 1st column, 1st paragraph; fig. 3.

(56) References Cited

OTHER PUBLICATIONS

Zhou, et al. "Application of environmental accounting information to the decision-making for the environmentally conscious design and end-of-life management of cellular phones," 2006, IEEE, pp. 173-178.

* cited by examiner

SYSTEMS AND METHODS FOR VENDING AND/OR PURCHASING MOBILE PHONES AND OTHER ELECTRONIC DEVICES

CROSS-REFERENCE TO RELATED APPLICATIONS INCORPORATED BY REFERENCE

This application is a continuation of U.S. application Ser. No. 17/645,039 filed Dec. 17, 2021, now U.S. Pat. No. 12,322,259, which claims the benefit of U.S. Provisional Patent Application No. 63/127,148, filed Dec. 17, 2020, and is also a continuation-in-part of U.S. patent application Ser. No. 16/719,699, filed Dec. 18, 2019, now U.S. Pat. No. 11,989,710, which claims priority to U.S. Provisional Patent Application No. 62/782,302, filed Dec. 19, 2019 and to U.S. Provisional Patent Application No. 62/782,947, filed Dec. 20, 2018, the entirety of each of which is incorporated by reference herein and made part of the present disclosure.

TECHNICAL FIELD

The present disclosure is generally directed to systems and methods for vending, purchasing, transferring data to or from, recycling, and/or performing other processes associated with mobile phones and/or other electronic devices.

BACKGROUND

Consumer electronic devices, such as mobile phones, laptop computers, notebooks, tablets, MP3 players, etc., are ubiquitous. Currently there are over 6 billion mobile devices in use in the world; and the number of these devices is growing rapidly with more than 1.5 billion mobile phones being sold in 2018 alone. There are now more mobile devices in use than there are people on the planet. Part of the reason for the rapid growth in the number of mobile phones and other electronic devices is the rapid pace at which these devices evolve, and the increased usage of such devices in third world countries.

As a result of the rapid pace of development, a relatively high percentage of electronic devices are replaced every year as consumers continually upgrade their mobile phones and other electronic devices to obtain the latest features or a better operating plan. According to the U.S. Environmental Protection Agency, the U.S. alone disposes of over 370 million mobile phones, PDAs, tablets, and other electronic devices every year. Millions of other outdated or broken mobile phones and other electronic devices are simply tossed into junk drawers or otherwise kept until a suitable disposal solution arises.

Although many electronic device retailers and cell carrier stores now offer mobile phone trade-in or buyback programs, many old mobile phones still end up in landfills or are improperly disassembled and disposed of in developing countries. Unfortunately, however, mobile phones and similar devices typically contain substances that can be harmful to the environment, such as arsenic, lithium, cadmium, copper, lead, mercury and zinc. If not properly disposed of, these toxic substances can seep into groundwater from decomposing landfills and contaminate the soil with potentiality harmful consequences for humans and the environment.

As an alternative to retailer trade-in or buyback programs, consumers can now recycle and/or sell their used mobile phones using self-service kiosks located in malls, retail stores, or other publicly accessible areas. Such kiosks are operated by ecoA™, LLC, the assignee of the present application, and embodiments of such kiosks are disclosed in, for example, U.S. Pat. Nos. 10,475,002; 10,445,708; 10,438,174; 10,417,615; 10,127,647; 9,911,102; 9,885,672; 8,463,646; 8,423,404; 8,239,262; 8,200,533; 8,195,511; and 7,881,965; each of which is incorporated herein by reference in its entirety.

There is a need for systems that enable consumers to easily sell their old mobile phones and purchase new ones. Additionally, there is a need for systems that enable consumers to conveniently transfer the data from their old mobile phone to a newly purchased phone. Simplifying the selling and purchasing processes, enhancing the consumer experience, and discouraging fraud can incentivize consumers to dispose of their old phones and other electronic devices in an efficient and environmentally conscientious way.

DETAILED DESCRIPTION

Figure 1A:
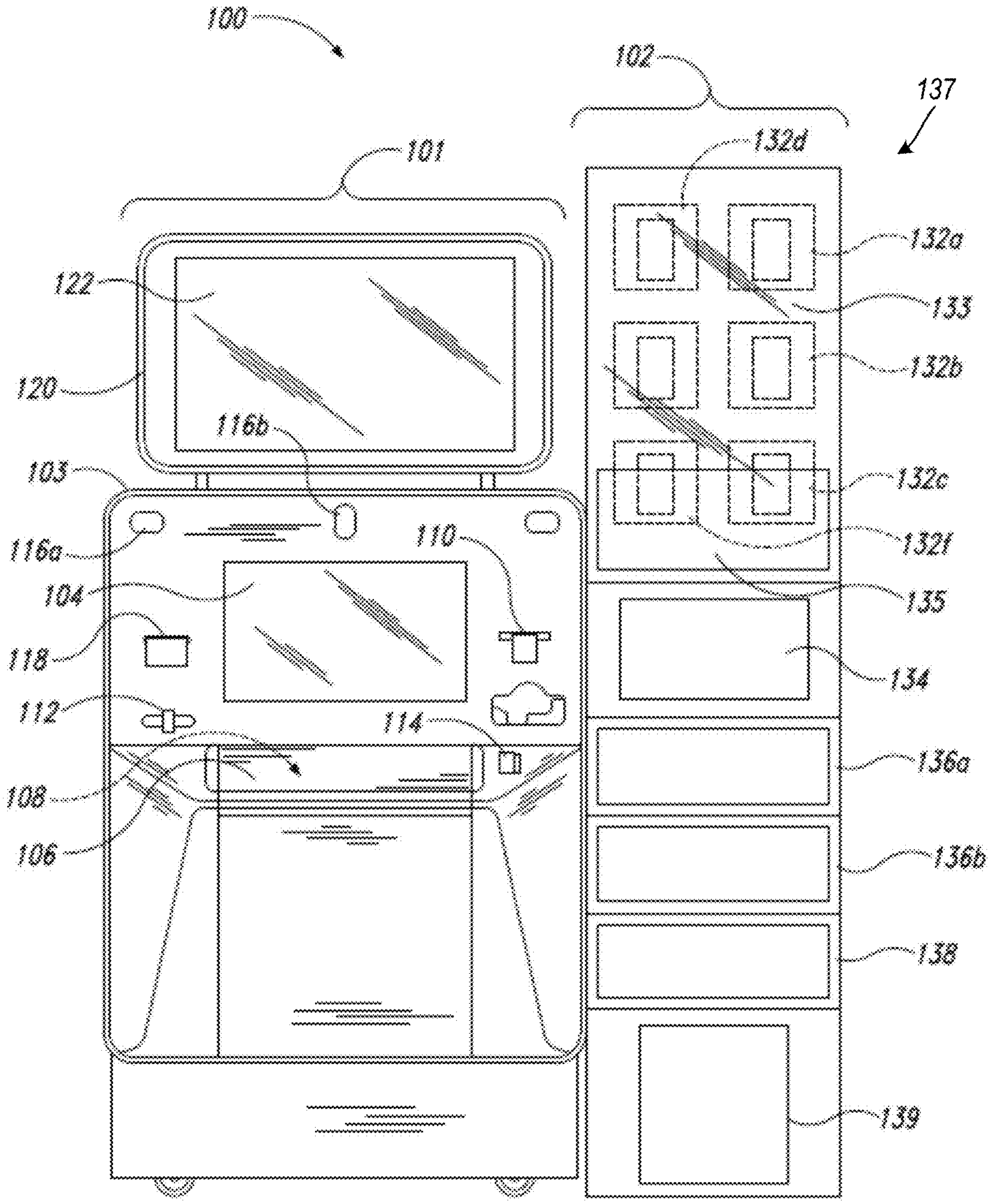
FIG. 1A is a partially schematic front view of a kiosk for purchasing and/or vending mobile phones and/or other electronic devices, configured in accordance with embodiments of the present technology.

The following disclosure describes various embodiments of systems and methods that can enable consumers to purchase "new" mobile electronic devices (e.g., new mobile phones) and/or sell their "old" mobile electronic devices (e.g., old mobile phones). For example, in some embodiments a kiosk or system of kiosks configured in accordance with the present technology can enable users to sell, e.g., a damaged or broken mobile phone, purchase a new mobile phone, and then transfer data from the old phone to the new phone. In other similar embodiments, users can purchase a new phone, transfer data from an old phone to the new phone, and then sell the old phone. In some embodiments, the user may also have the option of applying the proceeds from the sale of the old phone toward the cost of the new phone. Embodiments a can also enable users to sell their old mobile phones without having to buy a new phone, and/or purchase new phones without selling an old phone. In some embodiments, the systems are embodied in two kiosks: e.g., a vending kiosk (e.g., at which a user can purchase a phone) and a purchasing kiosk (e.g., at which the user can sell and/or recycle a phone) that can be used together (e.g., as a single kiosk having a "vending kiosk portion" and a "purchasing kiosk portion") and/or separately as standalone kiosks. In general, as used herein the term "old" does not necessarily mean that a phone is chronologically old, outdated, damaged, etc., but only that the phone is one that the owner wishes to sell and/or replace with a new phone. Similarly, the term "new" phone is not limited to phones that are brand new, but can also include phones that have been recycled and refurbished for resale and/or are otherwise "new" to the purchaser.

The following disclosure also describes various embodiments of kiosk systems and methods that can be used to purchase a mobile phone from one user, prepare the mobile phone for resale (e.g., by removing personal data from the phone, cleaning the phone, etc.), and then sell the phone to another user. Accordingly, in these embodiments phones that have been purchased by the kiosk do not have to be retrieved from the kiosk, manually prepared for resale by service personnel, and the restocked in a vending kiosk or offered for sale through other channels. Instead, embodiments of the kiosk systems described herein can purchase phones, automatically process them for resale, and then resell them without the phones ever having to be removed from the kiosk.

Certain details are set forth in the following description and in FIGS. 1A-17 to provide a thorough understanding of various embodiments of the present technology. In other instances, well-known structures, materials, operations and/or systems often associated with smartphones and other handheld devices, consumer electronic devices, computer hardware, software, and network systems, etc. are not shown or described in detail in the following disclosure to avoid unnecessarily obscuring the description of the various embodiments of the present technology. Those of ordinary skill in the art will recognize, however, that the present technology can be practiced without one or more of the details set forth herein, or with other structures, methods, components, and so forth.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention. In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1A.

FIG. 1A is a front view of a kiosk 100 for purchasing or recycling mobile phones and other electronic devices from consumers, selling (e.g., vending) mobile phones and other electronic devices to consumers, and/or performing other processes and transactions associated with such devices, in accordance with embodiments of the present technology. The term "recycling" is used herein for ease of reference to generally refer to purchasing, reselling, exchanging, donating, etc. mobile phones and other electronic devices. For example, owners may elect to sell their used mobile phones and/or other electronic devices at the kiosk 100, and the electronic devices can be recycled for resale, reconditioning, repair, recovery of salvageable components, environmentally-conscious disposal, etc. Unless otherwise specified and/or the context requires otherwise, the term "processing" in this context is used herein for case of reference to generally refer to all manner of services and operations that may be performed or facilitated by embodiments of the kiosk 100 on, with, or otherwise in relation to an electronic device. Such services and operations may include, for example, identifying, evaluating, pricing, auctioning, decommissioning, transferring data from or to, cleaning, reconfiguring, refurbishing, changing carriers, and/or facilitating insurance transactions, etc.

Although many embodiments of the present technology are described herein in the context of mobile phones, aspects of the present technology are not limited to mobile phones and generally apply to other mobile electronic devices and/or other consumer electronic devices. Such devices include, as non-limiting examples, all manner of mobile phones; smartphones; handheld devices; personal digital assistants (PDAs); MP3 or other digital music players; tablet, notebook, ultrabook and laptop computers; e-readers all types of cameras GPS devices; set-top boxes; universal remote controls; wearable computers; etc. In some embodiments, it is contemplated that the kiosk 100 can facilitate selling and/or otherwise processing larger consumer electronic devices, such as desktop computers, TVs, game consoles, etc., as well smaller electronic devices such as Google® Glass™, smartwatches (e.g., the Apple Watch™, Android Wear™ devices such as the Moto 360®, or the Pebble Steel™ watch), etc. Aspects of the kiosks described herein and various features thereof can be at least generally similar in structure and function to the systems, methods and corresponding features described in the following patents and patent applications, which are incorporated herein by reference in their entireties: U.S. Pat. Nos.: 11,080,672, 10,1360,990, 10,853,873, 10,572,946, 10,475,002; 10,445,708; 10,438,174; 10,417,615; 10,401,411; 10,269,110; 10,127,647; 10,055,798; 9,885,672; 9,881,284; 8,200,533; 8,195,511; and 7,881,965; U.S. patent application Ser. Nos. 17/445,799; 17/445,821; 17/445,799; 17/445,178; 17/445,158; 17/445,083; 17/445,082; 17/125,994; 16/794,009; 16/788,169; 16/788,153; 16/719,699; 16/794,009; 16/534,741; 15/057,707; 14/967,183; 14/964,963; 14/663,331; 14/660,768; 14/598,469; 14/568,051; 14/498,763; 13/794,1316; 13/794, 1314; 13/753,539; 13/733,984; 13/705,252; 13/693,032; 13/658,1328; 13/658,825; 13/492,835; 13/113,497; and U.S. Provisional Application Nos. 63/220,890, 63/220,381, 63/127,148, 63/116,020; 63/116,007; 63/088,377; 63/070,207; 63/066,794; 62/950,075; 62/807,165; 62/807,153; 62/1304,714; 62/782,947; 62/782,302; 62/332,736; 62/221,510; 62/202,330; 62/169,072; 62/091,426; 62/090,855; 62/076,437; 62/073,847; 62/073,840; 62/059,132; 62/059,129; 61/607,572; 61/607,548; 61/607,001; 61/606,997; 61/595,154; 61/593,358; 61/583,232; 61/570,309; 61/551,410; 61/472,611; 61/347,635; 61/183,510; and 61/102,304. All the patents and patent applications listed in the preceding sentence and any other patents or patent applications identified herein are incorporated herein by reference in their entireties.

In the illustrated embodiment, the kiosk 100 includes a first kiosk portion 101 for purchasing and/or recycling mobile phones and/or other electronic devices received from users, and a second kiosk portion 102 for selling (e.g., vending) such devices to users. (In some embodiments, the first kiosk portion 101 can be referred to as a "purchasing kiosk portion" and the second kiosk portion 102 can be referred to as a "vending kiosk portion.") In some embodiments, the first kiosk portion 101 and the second kiosk portion 102 can have separate housings placed near each other and/or physically attached to each other (as shown in FIG. 1A), or they can be spaced apart from each other as separate kiosks that can either be used separately or in conjunction with each other. In other embodiments, the first kiosk portion 101 and the second kiosk portion 102 can be integrated into a single unit or housing (e.g., as described below with reference to FIG. 2).

The first kiosk portion 101 can be at least generally similar in structure and function to one or more of the kiosks described in detail in the patents and applications incorporated herein by reference in their entirety. For example, in the illustrated embodiment the first kiosk portion 101 is a floor-standing self-service machine configured for use by a user (e.g., a consumer, customer, etc.) to recycle, sell, and/or perform other operations with a mobile phone or other consumer electronic device. In other embodiments, the kiosk portion 101 can be configured for use on a countertop or a similar raised surface. Although the first kiosk portion 101 is configured for use by consumers, in various embodiments the kiosk portion 101 and/or various portions thereof can also be used by other operators, such as a retail clerk or kiosk assistant to facilitate the selling or other processing of mobile phones and other electronic devices.

In the illustrated embodiment, the first kiosk portion 101 includes a housing 103 that is approximately the size of a conventional vending machine. The housing 103 can be of conventional manufacture from, for example, sheet metal, plastic panels, etc. A plurality of user interface devices are provided on a front portion of the housing 103 for providing instructions and other information to users, and/or for receiving user inputs and other information from users. For example, the kiosk portion 101 can include a display screen 104 (e.g., a liquid crystal display (LCD) or light emitting diode (LED) display screen, a projected display (such as a heads-up display or a head-mounted device), GUI, and so on) for providing information, prompts, etc. to users. The display screen 104 can include a touch screen for receiving user input and responses to displayed prompts. In addition or alternatively, the kiosk portion 101 can include a separate keyboard or keypad for this purpose. The kiosk portion 101 can also include an ID reader or scanner 112 (e.g., a driver's license scanner), a fingerprint reader 114, and one or more cameras 116 (e.g., digital still and/or video cameras, webcams, identified individually as cameras 116a-b). The kiosk portion 101 can additionally include output devices such as a label printer having an outlet 110, and a cash dispenser having an outlet 118. Although not identified in FIG. 1A, the kiosk portion 101 can further include a speaker and/or a headphone jack for audibly communicating information to users, one or more lights for visually communicating signals or other information to users, a handset or microphone for receiving verbal input from the user, a card reader (e.g., a credit/debit card reader, loyalty card reader, etc.), a receipt or voucher printer and dispenser, as well as other user input and output devices. The input devices may include a touchpad, a pointing device such as a mouse, a joystick, pen, game pad, motion sensor, scanner, eye direction monitoring system, etc. Additionally, the first kiosk portion 101 can also include a machine-readable code reader (for reading and/or scanning, e.g., a bar code, a QR code, and/or other machine-readable code displayed on a mobile device or otherwise associated with the mobile device), a bag/package dispenser, a digital signature pad, etc.

In the illustrated embodiment, the kiosk portion 101 additionally includes a header 120 having a display screen 122 for displaying marketing advertisements and/or other video or graphical information to attract users to the kiosk 100. In addition to the user interface devices described above, the front portion of the housing 103 also includes an access panel or door 106. As described in greater detail below, the access door 106 can be configured to automatically retract so that the user can place an electronic device (e.g., a mobile phone) in an inspection area 108 for automatic inspection by the first kiosk portion 101.

A sidewall portion of the housing 103 (e.g., the sidewall opposite the second kiosk portion 102) can include a number of conveniences to help users recycle or otherwise process their mobile phones. For example, in the illustrated embodiment the sidewall can carry an accessory bin that is configured to receive mobile device accessories that the user wishes to recycle or otherwise dispose of. Additionally, the sidewall can provide a free charging station with a plurality of electrical connectors for charging a wide variety of mobile phones and other consumer electronic devices.

Figure 1C:
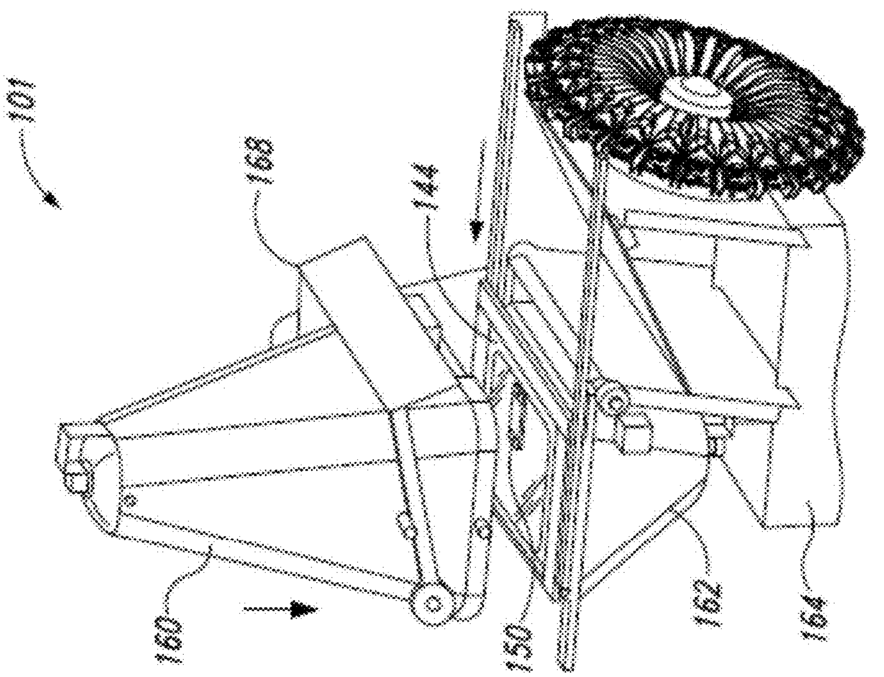
FIGS. 1B-1E are a series of isometric views of a portion of the kiosk of FIG. 1A with a number of exterior panels removed to illustrate internal components and operation in accordance with embodiments of the present technology.
Figure 1B:
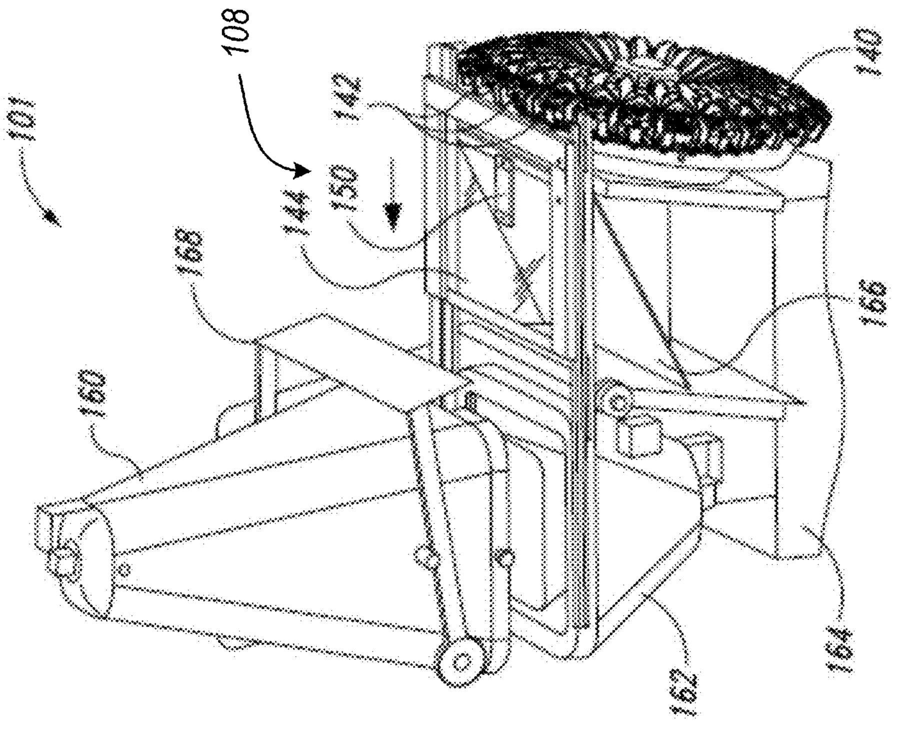

FIGS. 1B-1E are a series of isometric views of the first kiosk portion 101 with the housing 103 removed to illustrate selected internal components of the first kiosk portion 101 configured in accordance with embodiments of the present technology. Referring first to FIG. 1B, in the illustrated embodiment the first kiosk portion 101 includes a connector carrier 140 and an inspection plate 144 operably disposed behind the access door 106 (FIG. 1A). In the illustrated embodiment, the connector carrier 140 is a rotatable carousel that is configured to rotate about a generally horizontal, center axis and carries a plurality of electrical connectors 142 (e.g., approximately 25 connectors) distributed around an outer periphery thereof. In other embodiments, other types of connector carrying devices (including both fixed and linearly movable arrangements) can be used. In some embodiments, the connectors 142 can include a plurality of interchangeable USB connectors configured to provide power and/or exchange data with a variety of different mobile phones and/or other electronic devices. In operation, the carousel 140 is configured to automatically rotate about its central axis to position an appropriate one of the connectors 142 adjacent to an electronic device, such as a mobile phone 150, that has been placed on the inspection plate 144 for recycling. The connector 142 can then be manually and/or automatically withdrawn from the carousel 140 and connected to a port on the mobile phone 150 for electrical analysis. Such analysis can include, e.g., an evaluation of make, model, configuration, condition, etc. using one or more of the methods and/or systems described in detail in the commonly owned patents and patent applications identified herein and incorporated by reference in their entireties.

In the illustrated embodiment, the inspection plate 144 is configured to translate back and forth (on, e.g., parallel mounting tracks) to move an electronic device, such as the mobile phone 150, between a first position directly behind the access door 106 and a second position between an upper chamber 160 and an opposing lower chamber 162. Moreover, in this embodiment the inspection plate 144 is transparent, or at least partially transparent (e.g., formed of glass, Plexiglas, etc.) to enable the mobile phone 150 to be photographed, imaged, and/or otherwise optically evaluated from all, or at least most or some viewing angles (e.g., top, bottom, sides, etc.) using, e.g., one or more cameras, mirrors, etc. mounted to or otherwise associated with the upper and lower chambers 160 and 162, respectively. In some embodiments, the inspection plate 144 can be stationary, the inspection plate 144 may be partially transparent, and/or the inspection plate 144 may be non-transparent. When the mobile phone 150 is in the second position, the upper chamber 160 can translate downwardly to generally enclose the mobile phone 150 between the upper chamber 160 and the lower chamber 162. In some embodiments, the upper chamber 160 is stationary. The upper chamber 160 is operably coupled to a gate 168 that moves up and down in unison with the upper chamber 160. As noted above, in the illustrated embodiment the upper chamber 160 and/or the lower chamber 162 can include one or more cameras, magnification tools, scanners (e.g., bar code scanners, infrared scanners, etc.) or other imaging components (not shown) and an arrangement of mirrors (also not shown) to view, photograph and/or otherwise visually evaluate the mobile phone 150 from multiple perspectives. In some embodiments, one or more of the cameras and/or other imaging components discussed above can be movable to facilitate device evaluation. The inspection area 108 (FIG. 1A) can also include weight scales, heat detectors, UV readers/detectors, and the like for further evaluation of electronic devices placed therein. The first kiosk portion 101 can further include an angled binning plate 166 for directing electronic devices from the transparent plate 144 into a collection bin 164 positioned in a lower portion of the kiosk portion 101.

The first kiosk portion 101 can be used in a number of different ways to efficiently facilitate the recycling, selling and/or other processing of mobile phones and other consumer electronic devices. Referring to FIGS. 1A-1E together, in some embodiments a user wishing to sell a used mobile phone, such as the mobile phone 150, approaches the first kiosk portion 101 and identifies the type of device the user wishes to sell by, for example, responding to textual and/or visual prompts displayed on the screen 104. Next, the user may be prompted to remove any cases, stickers, or other accessories from the device 150 so that it can be accurately evaluated. Additionally, the kiosk portion 101 may print and dispense a unique identification label (e.g., a small adhesive-backed sticker with a QR code, barcode, etc.) from the label outlet 110 for the user to adhere to the back of the mobile phone 150. After this is done, the door 106 retracts allowing the user to place the mobile phone 150 onto the transparent plate 144 in the inspection area 108 (FIG. 1B). The door 106 then closes and the transparent plate 144 moves rearwardly to move the mobile phone 150 under the upper chamber 160 as shown in FIG. 1C. In some embodiments, the transparent plate 144 does not move and the user places the mobile phone 150 onto the transparent plate 144 between the upper and lower chambers 160, 162 (e.g., the user can place the phone 150 directly into a position for inspection). The upper chamber 160 can, in some embodiments, move downwardly to generally enclose the mobile phone 150 between the upper and lower chambers 160 and 162. One or more of the cameras and/or other imaging components in the upper and/or lower chambers 160 and 162 can perform a visual inspection of the mobile phone 150. In some embodiments, only one of the upper chamber 160 and the lower chamber 162 can include the one or more cameras for visual inspection of the phone 150. For example, in some embodiments, only one side of the mobile phone 150 is visually inspected; and/or in other embodiments the first kiosk portion 101 can include an apparatus to turn the mobile phone 150 over so that both sides of the mobile phone 150 can be inspected by one or more cameras in the upper chamber 160 or one or more cameras in the lower chamber 162.

In some embodiments, the visual inspection can include a 3D visual analysis (of, e.g., the shape and/or size of the phone 150) to confirm the identification of the mobile phone 150 (e.g., make and model) and/or to evaluate or assess the condition and/or function of the mobile phone 150 and/or its various components and systems. For example, in some embodiments, the cameras and/or other imaging components in the upper and/or lower chambers 160 and 162 obtain images of the mobile phone 150 under, e.g., various lighting conditions, and the first kiosk portion 101 can use visual inspection and recognition software to analyze the images of the mobile phone 150. The visual inspection and recognition software can analyze the images to, e.g., determine the borders of the phone 150 and the corresponding external dimensions of the phone 150. The external dimensions can be utilized to determine a subset of possible mobile phones from a master database of mobile phones stored in memory of the kiosk 100 or stored in a remote database accessible to the kiosk 100 via a network connection. In some embodiments, the visual inspection and recognition software can then use a set of secondary and/or tertiary features of the phone 150 as shown on the images to further distinguish the device. These secondary and tertiary features can include placement and size of the display screen, placements and size of the keyboard, unique buttons, placement of ports, and other distinguishing features. The visual analysis can also include an inspection of a display screen on the mobile phone 150 for cracks or other damage. For example, the visual inspection and recognition software can subtract an image of the display screen and/or other portions of the mobile phone 150 obtained by the one or more kiosk cameras from an image of an undamaged phone of the same make and model. The result of the subtraction can identify, e.g., damaged pixels, cracks in the screen, broken or missing parts, and/or low, medium or high wear. In some embodiments, the display screen of the phone 150 can be illuminated for the images, and in other embodiments the display screen may be "off" or otherwise not illuminated. In some embodiments, the visual inspection can also include performing optical character recognition (OCR) to identify printed or displayed patterns, codes, and/or text, and comparing characteristics of the patterns, codes, and/or text (e.g., layout, size, font, color, etc.) to templates to determine the presence of device identifiers such as a model number, serial number, IMEI number, etc. In some embodiments, the first kiosk portion 101 can perform the visual analysis using one or more of the methods and/or systems described in detail in the commonly owned patents and patent applications identified herein and incorporated by reference in their entireties.

Figure 1E:
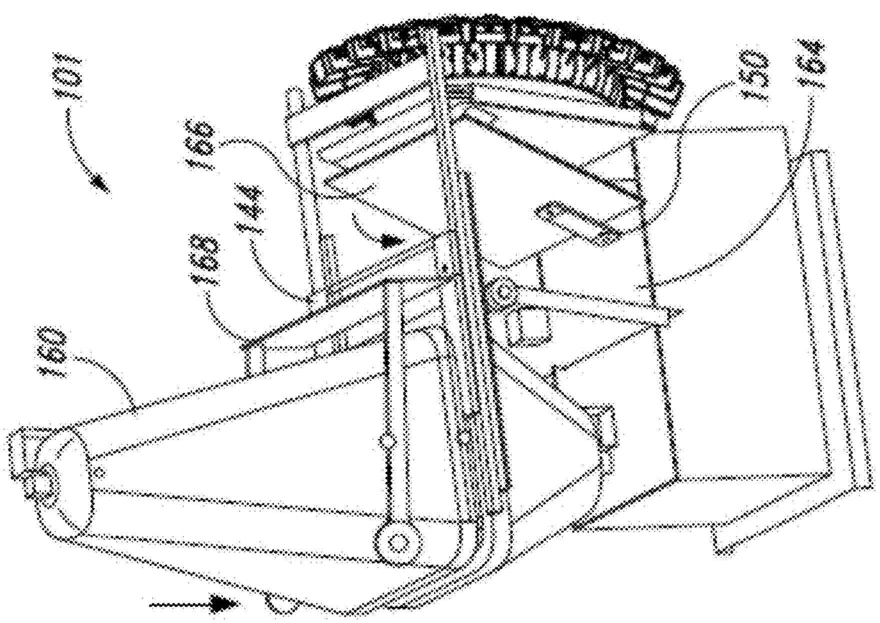
Figure 1D:
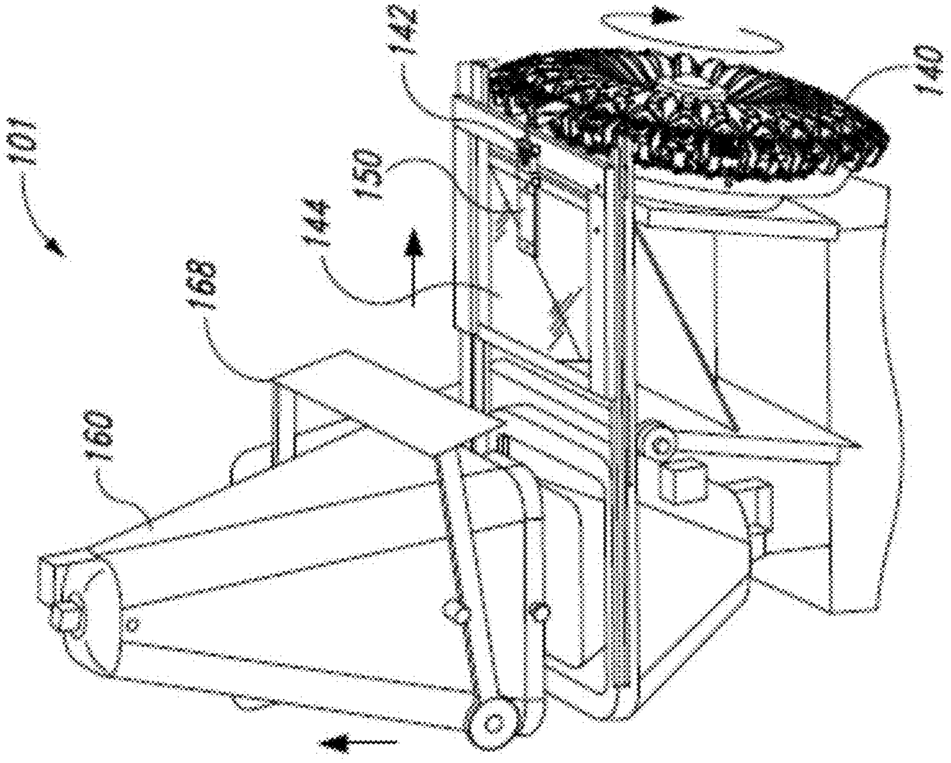

Referring next to FIG. 1D, after the visual analysis is performed and the device 150 has been identified, the upper chamber 160 returns to its upper position (e.g., if the upper chamber 160 had moved downward) and the transparent plate 144 returns the mobile phone 150 to its initial position next to the door 106 (FIG. 1A) (e.g., if the transparent plate 144 moved after the user positioned the mobile phone 150 on the transparent plate 144). The display screen 104 can also provide an estimated price or an estimated range of prices that the kiosk portion 101 may offer the user for the mobile phone 150 based on the visual analysis and/or based on user input (e.g., input regarding the type, condition, etc. of the mobile phone 150). If the user indicates (via, e.g., input via the touch screen) that he or she wishes to proceed with the transaction, the carousel 140 automatically rotates an appropriate one of the connectors 142 into an upper position adjacent the transparent plate 144, and the door 106 is again opened. The user can then be instructed (via, e.g., the display screen 104) to withdraw the appropriate connector 142 (and its associated wire) from the carousel 140, plug the connector 142 into the corresponding port (e.g., a USB port) on the mobile phone 150, and reposition the mobile phone 150 in the inspection area on the transparent plate 144. After doing so, the door 106 once again closes and the kiosk portion 101 (or, more specifically, a kiosk processor) performs an electrical inspection of the mobile phone 150 via the connector 142 to identify the phone and further evaluate the condition of the phone as well as specific component and operating parameters such as memory, carrier, etc.

For example, in some embodiments, the kiosk portion 101 (e.g., a kiosk CPU or other processing device) can query the mobile phone 150 (by using, e.g., an operating system API) to obtain characteristic information about the mobile phone 150, which can include device identification, make, model, and/or configuration. In other embodiments, the characteristic information can further include device functionality including hardware/software configuration, charging capability, memory capacity, etc. Information necessary to identify and/or evaluate a mobile device can include, for example, a unique identifier (e.g., an IMEI number or an MEID or equivalent number of a mobile phone, a hardware media access control address (MAC address) of a networkable device, or a model number and serial number of the electronic device); information describing the device manufacturer (e.g., a manufacturer name or ID code), model, characteristics and capabilities (e.g., CPU type and speed, storage capacity (SRAM, DRAM, disk, etc.), wireless carrier, radio bands (frequency ranges and encodings such as CDMA, GSM, LTE, etc.), color, and/or condition; and so on. In some embodiments, the electrical analysis can include evaluating the condition and/or functionality of the charging circuit of the electronic device. In particular, the testing electronics can measure the amount of charge current that the charging circuit draws on the power lines, and the testing electronics can use the corresponding current measurement signal to determine whether the charging circuit is functional or damaged. In some embodiments, the kiosk portion 101 can perform the electrical analysis using one or more of the methods and/or systems described in detail in the commonly owned patents and patent applications identified herein and incorporated by reference in their entireties.

In some embodiments, the user can attach the electrical connector to the mobile phone 150 and/or perform an electrical analysis of the device before the kiosk portion 101 performs a visual analysis of the phone. For example, in such an embodiment the user can approach the kiosk portion 101 and identify the type of device (e.g., the make and model) he or she wishes to recycle, and/or the appropriate electrical connector for connecting to the device. The kiosk portion 101 can then use this information to stage the appropriate electrical connector at the inspection area. Alternatively, the kiosk portion 101 can present the user with a selection of standard electrical connectors from which the user can determine an appropriate electrical connector for connecting to the device. Either way, the door 106 retracts and the user is instructed to withdraw the selected connector 142 from the carrier 140, plug it into the corresponding port (e.g., a USB port) on the mobile phone 150, and position the mobile phone 150 on the transparent plate 144 in the inspection area. The user may also be prompted to remove any cases, stickers, or other accessories from the mobile phone 150, and adhere a unique identification label to the back of the mobile phone 150 as described above. The door 106 then closes and the kiosk portion 101 can perform an electrical inspection of the mobile phone 150 as described above, and after the electrical inspection, a visual inspection as described above. The electrical inspection can include gathering device identification information and/or other information, which the kiosk portion 101 can then use to customize further interaction with the user, such as to add or omit user inquiries depending on the type of device the user connects. Thus, in some embodiments, electrical inspection of the mobile phone 150 can occur before the user provides information about the mobile phone 150 to the kiosk portion 101.

After the visual and electronic analysis of the mobile phone 150, the kiosk portion 101 (e.g., the kiosk processor) determines whether the evaluation is sufficient for pricing the mobile phone 150. The determination can include, for example, whether the evaluation of the phone's type and condition is sufficient to determine a price to offer for the phone or whether the price for the phone could be in a range of possible prices. For example, to determine a price for the mobile phone 150, the kiosk portion 101 may use information about the make, model and/or condition of the phone or one or more unique identifiers of the phone to look up a current price for the device based on its make, model, and/or condition in a database or pricing model. The database or pricing model can be, for example, a local lookup table of common devices and/or a remotely hosted database or web service to which the kiosk portion 101 can transmit information about the electronic device and receive a current market value or offer price for the electronic device. After a phone purchase price has been determined, the user may be presented with the price via, e.g., the display screen 104. If the user declines the price (via, e.g., the touch screen), a retraction mechanism 143 automatically disconnects the connector 142 from the mobile phone 150, the door 106 opens, and the user can reach in and retrieve the mobile phone 150. If the user accepts the price, the door 106 remains closed and the purchase transaction proceeds. For example, the user may be prompted to place his or her identification (e.g., a driver's license) in the ID scanner 112 and provide a thumbprint via the fingerprint reader 114 (FIG. 1A). As a fraud prevention measure, the kiosk portion 101 can be configured to transmit an image of the driver's license to a remote computer screen, and an operator at the remote computer can visually compare the picture (and/or other information) on the driver's license to the person standing in front of the kiosk portion 101 as viewed by one or more of the cameras 116*a-b* (FIG. 1A) to confirm that the person attempting to sell the mobile phone 150 is in fact the person identified by the driver's license. In some embodiments, one or more of the cameras 116*a-b* can be movable to facilitate viewing of kiosk users, as well as other individuals in the proximity of the kiosk portion 101. Additionally, the person's fingerprint can be checked against records of known fraud perpetrators. If either of these checks indicate that the person selling the phone presents a fraud risk, the transaction can be declined and the mobile phone 150 returned to the user.

Returning to FIG. 1D, after the user's identity has been verified the retraction mechanism 143 automatically disconnects the connector 142 from the mobile phone 150 and the transparent plate 144 moves back toward the upper and lower chambers 160 and 162. As shown in FIG. 1E, however, when the upper chamber 160 is in the lower position the gate 168 permits the transparent plate 144 to slide underneath but not electronic devices carried thereon. As a result, the gate 168 knocks the phone 150 off of the transparent plate 144, onto the binning plate 166 and into the bin 164. The first kiosk portion 101 can then provide payment of the purchase price to the user. In some embodiments, payment can be made in the form of cash dispensed from the cash outlet 118. In other embodiments, the user can receive remuneration for the mobile phone 150 in various other useful ways. For example, the user can be paid via a redeemable cash voucher, a coupon, an e-certificate, a prepaid card, a wired or wireless monetary deposit to an electronic account (e.g., a bank account, credit account, loyalty account, online commerce account, mobile wallet, etc.), Bitcoin, etc.

As those of ordinary skill in the art will appreciate, the foregoing routines are but some examples of ways in which embodiments of the first kiosk portion 101 can be used to purchase, recycle or otherwise process consumer electronic devices such as mobile phones. Additionally, it should be understood that the configuration of the first kiosk portion 101 described above is but one example of a suitable mobile device evaluation, purchasing, and/or recycling system that can be used with embodiments of the present technology. Accordingly, other embodiments of the present technology can use other mobile device evaluation, purchasing, and/or recycling systems without departing from the present disclosure. Such systems specifically include, for example, the kiosk configurations described in detail in U.S. Provisional Application No. 62/807,153, titled KIOSK FOR EVALUATING AND PURCHASING USED ELECTRONIC DEVICES, which was filed Feb. 18, 2019 and is incorporated herein by reference in its entirety. Although the foregoing examples are described in the context of mobile phones, it should be understood that kiosk portion 101 and various embodiments thereof can also be used in a similar manner for recycling virtually any consumer electronic device, such as MP3 players, tablet computers, laptop computers, e-readers, PDAs, Google® Glass™, smartwatches, and other portable or wearable devices, as well as other relatively non-portable electronic devices such as desktop computers, printers, televisions, DVRs, devices for playing games, entertainment or other digital media on CDs, DVDs, Blu-ray, etc. Moreover, although the foregoing examples are described in the context of use by a consumer, the kiosk portion 101 in various embodiments thereof can similarly be used by others, such as store clerk, to assist consumers in recycling, selling, exchanging, etc. their electronic devices.

Although embodiments of the first kiosk portion 101 described above include establishing an electrical connection between the mobile phone 150 and the first kiosk portion 101 (and, more specifically, a central processing unit (CPU) of the kiosk portion 101) via an electrical connector for electrical inspection of the phone 150, in some embodiments the first kiosk portion 101 can establish a wireless connection with the mobile phone 150 to facilitate performing all or a portion of the phone evaluation and purchase steps described above. For example, in some embodiments the first kiosk portion 101 can include a wireless radio transceiver that is accessible by user devices. The first kiosk portion 101 can establish a wireless connection with the mobile phone 150 by providing connection instructions and/or authentication information (via, e.g., the display screen 104) for the user to enter on the mobile phone 150 and/or the first kiosk portion 101. For example, the first kiosk portion 101 can direct the user to make the mobile phone's Bluetooth connection discoverable, and/or can provide a Bluetooth pairing code that the user can type on the screen of the phone 150 or on the touchscreen of the first kiosk portion 101. As another example, the kiosk portion 101 can provide a Wi-Fi network name and/or password that when selected and/or entered on the user's phone 150 enables the user to wirelessly connect the device to the indicated Wi-Fi network. In other embodiments, establishing the connection can include providing a visual code or image (e.g., a QR code) for the user to scan using the mobile phone 150, such that scanning the code or image prompts the phone to connect to the kiosk's wireless network (e.g., upon user confirmation). In some embodiments, establishing the connection can include allowing a particular wireless device to join or use the wireless network or make a wireless connection. For example, when the first kiosk portion 101 detects the mobile phone 150 and determines that the device is registered for access or otherwise recognized, the kiosk portion 101 automatically wirelessly connects to the mobile phone 150 without requiring further user authentication. Once connected, the first kiosk portion 101 can perform all or a portion of the electrical inspection and/or other steps described above via the wireless connection. In other embodiments, the user can load a mobile app onto the mobile phone 150, and the app can evaluate the electronic device and facilitate wireless communication between the mobile phone 150 and the first kiosk portion 101 to facilitate phone evaluation and purchase by the kiosk portion 101. Various systems and methods for establishing a wireless connection between the kiosk 100 and a mobile phone or other electronic device of a user are described in at least some of the patents and/or patent applications incorporated herein by reference in their entireties. In other embodiments, wireless connections between the kiosk 100 and mobile phones and other electronic devices can be established using other suitable means known in the art.

As noted above, in some embodiments, the user can load a mobile app onto the mobile phone 150, and the app can evaluate the electronic device and/or facilitate wireless communication between the mobile phone 150 and the first kiosk portion 101 to facilitate phone evaluation and/or purchase by the first kiosk portion 101. For example, in some embodiments the user can download the app to the electronic device from an app store or other software repository (e.g., the Apple® App StoreSM, Google Play™ store, Amazon® Appstore™, and so on), from a website, from the kiosk 100 (e.g., sideloading an app over a wired or wireless data connection), etc. In some embodiments, the app and/or a remote server operatively connectable to the app can perform some or all of the device electrical inspection described herein. For example, the user can use the app to price the mobile phone 150 even when the electronic device is remote from the kiosk 100. In some embodiments, the app can obtain information from the mobile phone 150 automatically. For example, the app can access mobile device information under the iOS® operating system via the Settings/General/About screen, or by using Application Programming Interfaces (APIs) available via iOS®; other operating systems provide similar access to device information. The app can obtain information necessary to identify and/or evaluate the electronic device, such as a unique identifier (e.g., an IMEI number or an MEID or equivalent number of a mobile phone, a hardware media access control address (MAC address) of a networkable device, or a model number and serial number of the electronic device); information describing the device's manufacturer (e.g., a manufacturer name or ID code), model, characteristics (e.g., storage capacity, color, carrier, and/or radio bands), capabilities, and/or condition; and so on. Characteristic information about an electronic device can include the device make, model, and configuration. The app can store the information about the electronic device in a data structure on the electronic device (e.g., in a table maintained by the app) and/or remotely from the electronic device (e.g., in a data structure maintained at one or more of the kiosk 100, a server computer, a Cloud storage facility, etc.).

In some embodiments, the app can also perform tests to reveal the condition of the electronic device, such as tests of processor performance, battery charging and/or capacity, memory tests for quality of the memory, test calls to confirm sufficient operation of device's radios, and so forth). The app can perform interactive tests that incorporate user feedback, such as screen tests (e.g., asking the user whether there are any cracks in the glass and/or displaying a solid color or pattern on an LCD or LED display and prompting the user to identify dead or stuck pixels in the display), and/or interactive tests that include user action such as directing the user to activate a function on the electronic device (e.g., turning on a Bluetooth radio so that the app can test the radio's function).

In some embodiments, the app can determine whether the evaluation of the mobile phone 150 is sufficient to determine a price to offer for the device, or whether the device could be in a range of possible prices. If the app determines that the evaluation is sufficient to price the mobile phone 150, then the app can present the price to the user via, e.g., the phone's screen, and/or a remote server can send the user a text message or email containing the price that the user can obtain by selling the mobile phone 150 at the kiosk 100. In some embodiments, the app can also associate a unique identifier with the electronic device 150 or the user. The identifier can be a globally unique identifier (GUID) and/or a visual identifier, such as a QR code, a bar code, or other unique code, etc. After the user is presented with the offer price for the mobile phone 150, the user may elect to bring the phone 150 to the kiosk 100 for recycling. At the kiosk 100, the user can input the unique identifier of the electronic device and/or user identification. For example, when the user electrically connects the electronic device to the kiosk 100 (via, e.g., one of the wired connectors 142, or by a wireless connection), the kiosk 100 can detect the electronic device via the connection. Based on the type of the electronic device and/or the type of connection, the kiosk 100 can electrically query the electronic device to receive the unique identifier of the device. As another example, the kiosk 100 can prompt the user to enter the unique identifier at the touch screen portion of the display screen 104 of the first kiosk portion 101. The kiosk 100 can then use the unique identifier to retrieve stored information about the mobile phone 150 obtained by the app. In some embodiments, the kiosk 100 automatically retrieves information previously submitted about the mobile phone 150, such as information that the user submitted via the app, from the memory of the phone 150, and/or from a remote database. In some embodiments, the information can be retrieved from a remote stored location, and in other embodiments the information can be retrieved directly from the mobile phone 150 via, e.g., a wireless connection. After retrieving the information about the mobile phone 150 that was obtained via, e.g., the app, the first kiosk portion 101 can evaluate the phone 150 based at least in part on the information, and/or the first kiosk portion 101 can compare the information with information about the phone 150 obtained directly at the kiosk 100. For example, in some embodiments the first kiosk portion 101 can electrically query the mobile phone 150 (via a wired or wireless connection) as described above to confirm that the information received directly from the mobile phone 150 in response to the query corresponds to the information received via the app. After confirming the information about the mobile phone 150, the first kiosk portion 101 can proceed as described above to confirm a purchase price for the phone 150 and/or perform other portions of the phone purchase processes described herein. Various systems and methods for evaluating the mobile phone 150 with a mobile app and utilizing an app to facilitate device evaluation and purchase are described in at least some of the patents and/or patent applications incorporated herein by reference in their entireties.

Returning to FIG. 1A, in another aspect of this embodiment the second kiosk portion 102 includes a vending apparatus 137 having a plurality of vending units 132*a-f*, a display 134, a plurality of data transfer units or compartments 136*a,b*, a cleaning compartment 138, and a supply compartment 139. As described in greater detail below, each of the vending units 132 can be configured to hold and vend one or more mobile phones. In some embodiments, the vending units 132*a-f* can be positioned behind a transparent front cover or panel 133 that is positioned above an access door 135 through which users can access purchased phones. To accommodate urban areas where retail space is at a premium, the second kiosk portion 102 can be relatively tall and narrow, and each of the vending units 132 can similarly be relatively narrow. For example, in some embodiments the individual vending units 132 can be about 3 inches wide and can carry up to six mobile phones each.

In another aspect of the illustrated embodiment, the display 134 can be positioned below the vending units 132 to comply with ADA requirements, and can include, for example, a display screen for displaying graphical and textual prompts to users to facilitate use of the second kiosk portion 102. Additionally, the display 134 can also include, for example, a touch screen for receiving user input and responses to display prompts. The second kiosk portion 102 can further include a key pad and/or other user input devices (e.g., fingerprint reader(s), optical scanners, etc.) for receiving user input.

As described in further detail below, each of the data transfer compartments 136 includes means for transferring data from one mobile phone (e.g., an old mobile phone that a user wishes to sell via the first kiosk portion 101) to another mobile phone (e.g., a new mobile phone). In some embodiments, the second kiosk portion 102 can include two or more data transfer compartments 136 so that multiple users can use the second kiosk portion 102 to transfer data at the same time. In some embodiments, the cleaning compartment 138 can include an ultraviolet light source and/or other devices for cleaning mobile phones. In some embodiments, the supply compartment 139 can carry supplies that a user may access to facilitate a purchase or sale of a mobile phone. For example, in some embodiments the supply compartment 139 can include a plurality of pre-addressed shipping pouches that users can use to securely send their phone (e.g., an old mobile phone) to an operator of the system 100 for evaluation and sale.

Figure 2:
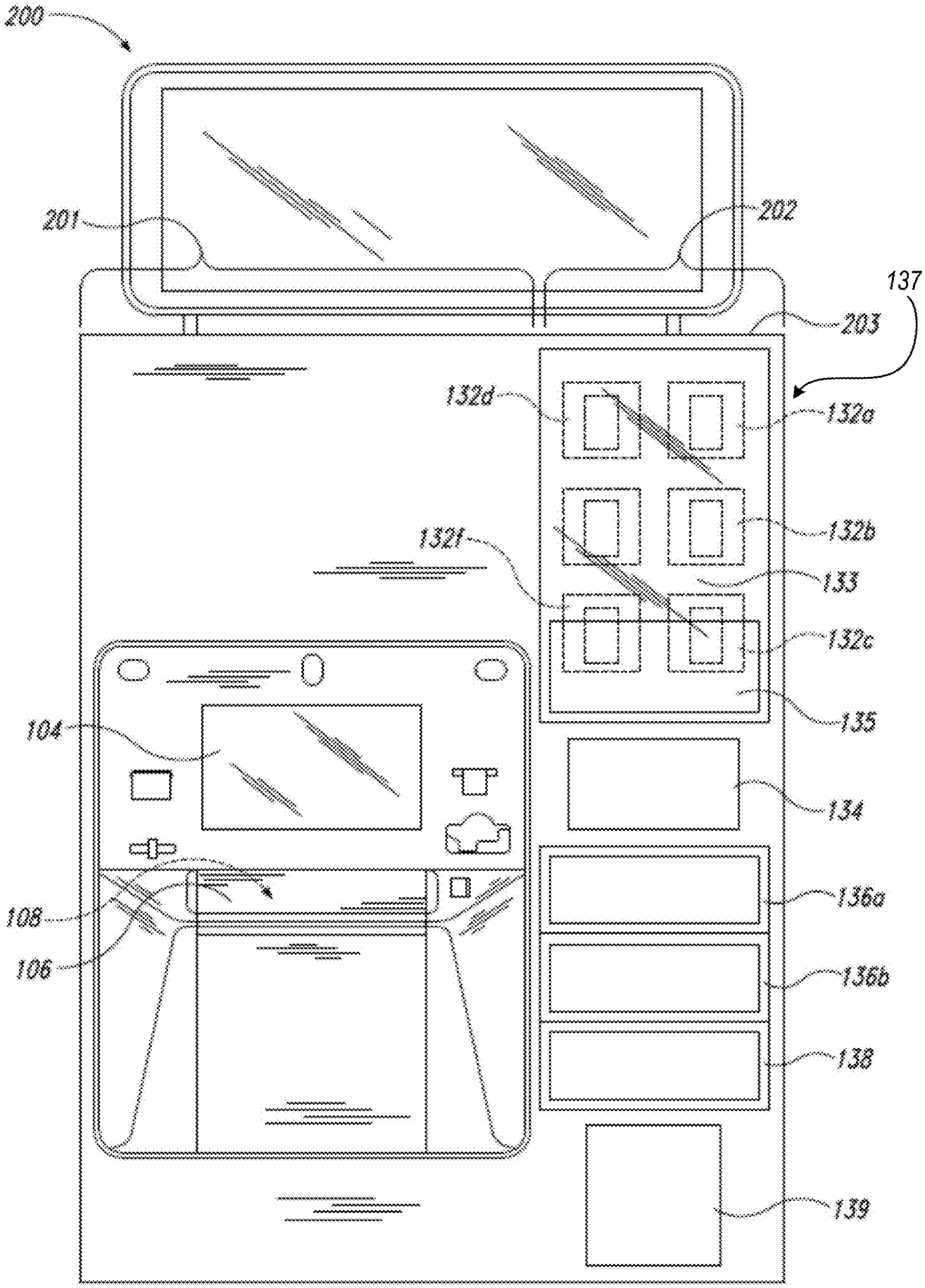
FIG. 2 is a partially schematic front view of a kiosk for purchasing and/or vending mobile phones and/or other electronic devices, configured in accordance with other embodiments of the present technology.

FIG. 2 is a front view of a kiosk 200 for purchasing or recycling "old" mobile phones and/or other electronic devices from consumers, selling (e.g., vending) "new" devices to consumers, and/or performing other processes associated with such devices and transactions, in accordance with other embodiments of the present technology. In some embodiments, the kiosk 200 is essentially the same in structure and function as the kiosk 100 described above with reference to FIG. 1A, except that the first kiosk portion 101 and the second kiosk portion 102 are integrated and/or otherwise positioned in a single housing 203. Accordingly, in some embodiments the kiosk 200 can include a first kiosk portion 201 having all, or at least substantially all, of the functionality provided by the first kiosk portion 101 of the kiosk 100, and a second kiosk portion 202 having all, or at least substantially all, of the functionality provided by the second kiosk portion 102 of the kiosk 100. In some embodiments, the first kiosk portion 201 can be referred to as a "purchasing kiosk portion" and the second kiosk portion 202 can be referred to as a "vending kiosk portion."

For example, in some embodiments a plurality of user interface devices can be provided on a front portion of the housing 203 for providing instructions and other information to users, and/or for receiving user inputs and other information from users. For example, the first kiosk portion 201 can include a display screen 104 (e.g., a liquid crystal display (LCD), etc.) for providing information, prompts, etc. to users to facilitate use of the first kiosk portion 201. The display screen 204 can include a touch screen for receiving user input and responses to displayed prompts. In some embodiments, the first kiosk portion 201 can further include an ID reader or scanner (e.g., a driver's license scanner), a fingerprint reader, and one or more cameras (e.g., digital still and/or video cameras), that are at least generally similar in structure and function to the scanner 112, fingerprint reader 114, and cameras 116 described in detail above with reference to FIG. 1A. Similarly, the first kiosk portion 201 can also include output devices such as a label printer, a cash dispenser, and/or other functionality described above with reference to FIG. 1A to facilitate purchasing a mobile phone from a user. In addition to the user interface devices described above, in some embodiments the first kiosk portion 201 also includes an access panel or door 106 located directly beneath the display screen 104. As described in detail above with reference to FIGS. 1A-1E, the access door 106 can be configured to automatically retract (open) so that the user can place electronic device in an inspection area 108 for automatic inspection by the kiosk 200. In some embodiments, the access door 106 can be opened and/or closed by the user. For example, if the user opens the access door 106, the kiosk 100, 200 can automatically terminate the evaluation process and require that the process be redone in order to move forward with a transaction. As will be clear from the foregoing discussion, the first kiosk portion 201 can include all, or at least substantially all, of the apparatus, structures, and functions the first kiosk portion 101 includes for purchasing a phone from a user as described above with reference to FIGS. 1A-1E.

Turning next to the second kiosk portion 202, in some embodiments this portion of the kiosk 200 can include all, or at least substantially all, of the structures and functions provided by the second kiosk portion 102 described above with reference to FIG. 1A. For example, this portion of the kiosk 200 can include a vending apparatus 137 having a plurality of vending units 132*a-f*, and a display 134 (e.g., a GUI). The vending units 132*a-f* and the display 134 can be at least generally similar in structure and function, or the same in structure and function, as the vending units 132*a-f* and the display 134, respectively, described in detail above with reference to FIG. 1A. Additionally, in some embodiments the second kiosk portion 202 can further include one or more data transfer compartments 136*a, b* and a cleaning compartment 138 that are at least generally similar in structure and function, or identical, to the data transfer compartment 136 and the cleaning compartment 138, respectively, described in detail above with reference to FIG. 1A.

Figure 3:
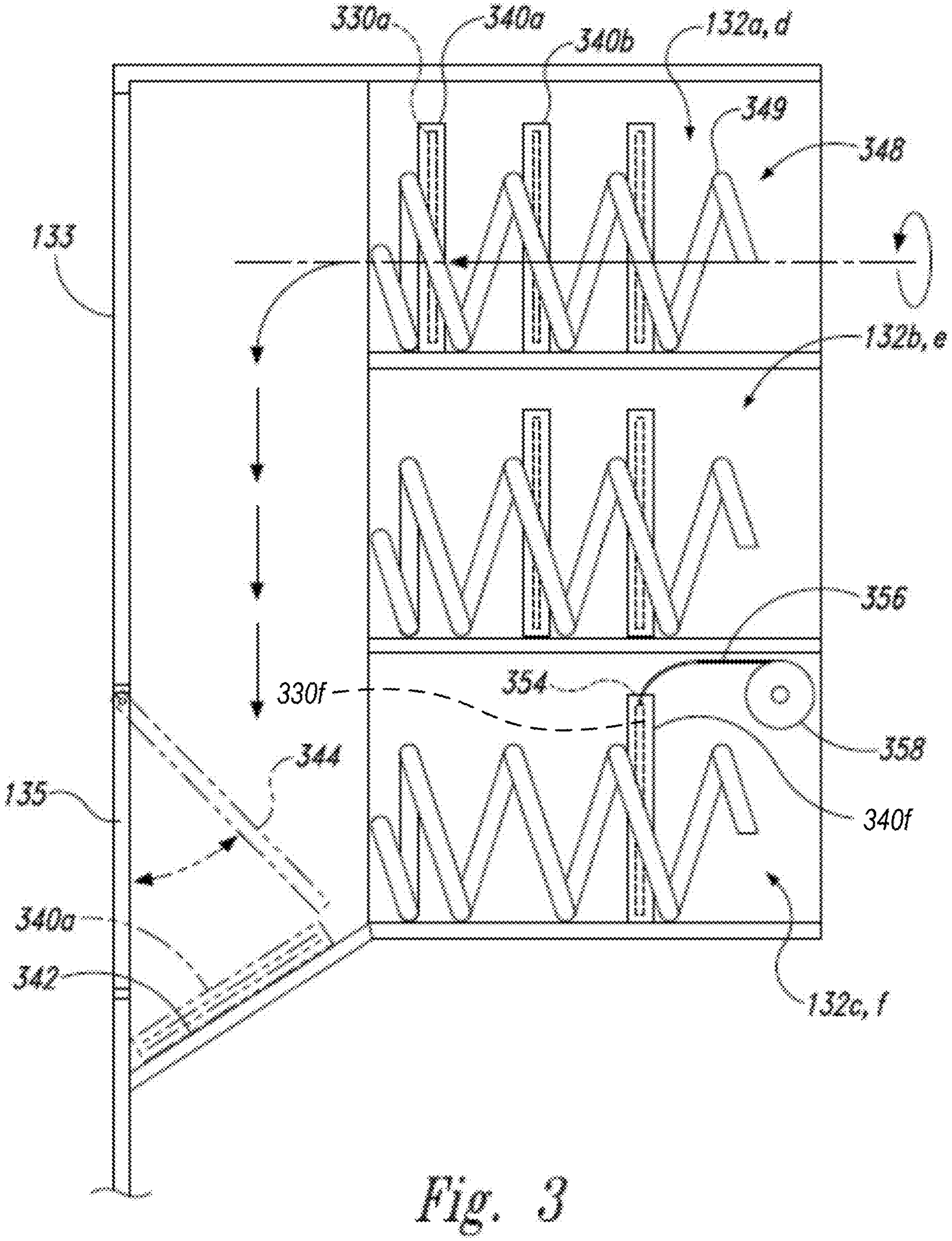
FIG. 3 is an enlarged, partially schematic side view of an electronic device vending apparatus configured in accordance with embodiments of the present technology.

FIG. 3 is an enlarged, partially schematic side view of the vending apparatus 137 having a plurality of the vending units 132 configured in accordance with embodiments of the present technology. Each of the vending units 132 can be at least generally similar in structure and function, and each can include a dispensing apparatus 348. In the illustrated embodiment, the dispensing apparatus 348 includes a rotatable dispenser 349 operably coupled to a drive mechanism (e.g., an electric motor, e.g., an electric stepper motor; not shown). The dispenser 349 is in the shape of a horizontally oriented coil or helix that is rotatably supported on a proximal end and supports a plurality of product packages 340. Each of the product packages 340*a-f* carries a corresponding mobile phone 330*a-f* and, in some embodiments, ancillary equipment such as a recharging cable, SIM card tool, etc. In some embodiments, one or more of the product packages 340*a-f* includes only a SIM card or a SIM card with a SIM card tool. In some embodiments, the phones 330 can be used phones that have been purchased from prior owners and processed for resale (e.g., personal data erased from memory) and/or brand-new phones. In some embodiments, the front cover 133 of the vending units 132 can be formed from plexiglass or some other transparent material that enables users to view the product packages 340 and see which mobile phones are available from the kiosk at any given time. In operation, the drive mechanism rotates the dispenser 349 about the longitudinal axis to advance the product packages 340 forward in response to user selections. When a selected product package 340 (e.g., the package 340*a*) gets to the end of the corresponding vending unit slot, it falls into an outlet tray 342. The user can then push the access door 135 inwardly as shown by the dashed lines in FIG. 3 to retrieve the product package 340*a*. In other embodiments, other types of suitable conveyor devices known in the art can be used to selectively vend the product packages 340. Such devices can include, for example, conveyor belts, robot arms, etc. Additionally, in some embodiments the last product package 340 in each vending unit 132 can be an empty package that never gets vended. This way customers will always see what appear to be "products" in the kiosk, instead of empty spaces. In some embodiments, packages 340 can be omitted and the phones 330 can processed and sold without packaging.

The vending units 132 described above are but one example of suitable vending systems and structures that the second kiosk portion 102, 202 can include for displaying, dispensing, and/or vending phones and/or other consumer electronic devices. In other embodiments, for example, the second kiosk portion 102, 202 can include a plurality of individual vending compartments or units having product support surfaces that are angled downwardly toward an outlet. Each of the units can hold one or more phones or other devices in, e.g., individual packages that are viewable to users. Each compartment can include a mechanism (e.g., a solenoid-driven release pin) configured to release a selected package when the corresponding product has been purchased by a user, thereby enabling the package to slide down the angled surface to the outlet for retrieval by the user.

As described in greater detail below with reference to FIG. 6, in some embodiments each of the vending units 132 can include one or more cable carriers 358 carrying one or more electrical cables 356. Each of the cables 356 can include a corresponding connector 354 that connects to one of the mobile phones 330 in its respective product package 340. As will be understood, in those embodiments in which the phones 330 are not contained in packages, the connectors 354 can connect to the mobile phones 330 without first passing through an opening in the respective package. As described in greater detail below, in some embodiments providing an electrical connection to each of the mobile phones 330 in the vending units 132 can enable the kiosk 100, 200 described above to effect a data transfer between a user's old phone and a newly selected phone 330 (e.g., the phone 330*f*) while the newly selected phone 330 is still held within the corresponding vending unit 132 and the old phone is contained in, for example, the inspection area 108 of the first kiosk portion 101, 201 and connected to the electrical connector 142. In some embodiments, the cable carriers 358 can include, e.g., spring-loaded and/or electromechanically driven spools and/or other devices configured to retract the cables 356 and/or otherwise unplug the connectors 354 from the respective phones 330 just prior to the phones being dispensed, and/or during the dispensing process.

Figure 4:
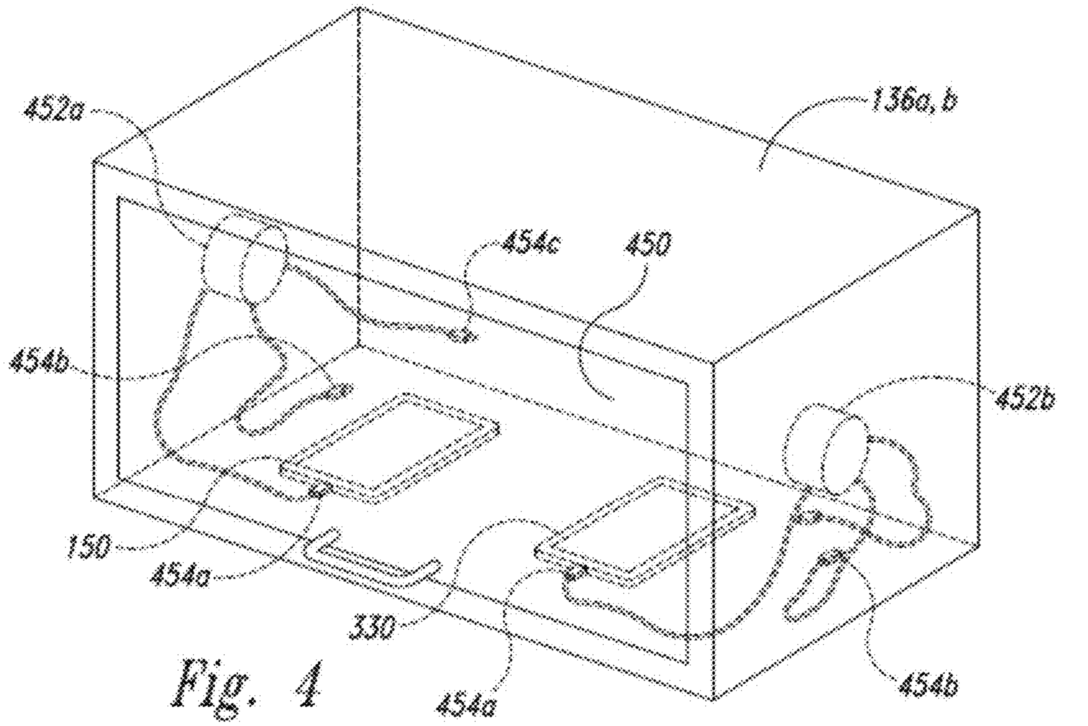
FIG. 4 is an enlarged, partially schematic isometric view of an electronic device data transfer apparatus configured in accordance with embodiments of the present technology.

FIG. 4 is an enlarged, partially schematic isometric view of one of the data transfer compartments 136 configured in accordance with embodiments of the present technology. In the illustrated embodiment, the data transfer compartment 136 can include a lockable door 450 that, when opened (with, e.g., an appropriate code), enables a user to place two or more mobile phones in the interior of the compartment. For example, in the illustrated embodiment the data transfer compartment 136 contains a new mobile phone 330 that the user purchased via one of the vending units 132, and an old mobile phone 150 (e.g., a mobile phone the user wishes to sell via the first kiosk portion 101, 201). The interior of the data transfer compartment 136 can include a first connector head 452*a* and a second connector head 452*b*. Each of the connector heads 452 can carry a plurality of electrical cables having corresponding connectors 454*a-c*. For example, in some embodiments each of the connector heads 452 can carry connectors suitable for connecting to each of the commercially available types of mobile phones, such as iPhones, Android phones, etc. In some embodiments, one or more of the connector heads 452*a,b* and/or one or more of the connectors 454*a-c* can be positioned and/or otherwise accessible outside of the data transfer compartment 136.

In some embodiments, to transfer data from the old phone 150 to the new phone 330, the user opens the door 450 and positions the old phone 150 inside the data transfer compartment 136 and connects it to the appropriate cable connector 454. The user then does the same with the new phone 330 (and, if needed, turns the new phone on) and closes the door 450. As described in greater detail below, in some embodiments the user then initiates the data transfer process by inputting (via, e.g., the display 134) appropriate selections (e.g., selections of data the user wishes to transfer to the new phone 330, such as contacts, photos, apps, etc.) via the display 134 of the second kiosk portion 102, 202, and the door 450 is automatically locked with a suitable mechanism (not shown). In some embodiments, the user can then define or be given (via, e.g., the display 134) a unique code that must be entered (via, e.g., the display 134) before the user can reopen the door 450 and remove the devices. After locking the door, the second kiosk portion processor transfers selected data (e.g., contacts, photos, settings, applications, etc.) from the old phone 150 to the new phone 330 (and/or deletes/erases selected data from the old phone 150) using data transfer methods known in the art and/or described in one or more of the patents and/or applications incorporated herein by reference in their entirety. For example, in some embodiments the kiosk processor can be configured to transfer the data directly from the old phone 150 to the new phone 330, or to a temporary storage device, to Cloud storage, and/or to other devices and/or systems, etc., and then to the new phone 330. In some embodiments, the kiosk processor can transfer the data from the mobile phone 150 over a network to a server for storage in a database and eventual retrieval by the use for download to the new phone 330. In some embodiments, the new phone 330 (and/or the mobile phone 150) can include a preloaded software application (a preloaded app) that can facilitate the data transfer from the mobile phone 150 to the new phone 330. In some embodiments, the user may also manually transfer their SIM card from the old phone 150 to the new phone 330 to, e.g., activate the new phone 330 prior to the data transfer. In some embodiments, wireless connectivity devices can be used to facilitate data transfer between the old phone 150 and/or the new phone 330.

In some embodiments, data can also be erased from the mobile phone 150. For example, a kiosk processor can be configured to instruct the mobile phone 150 to erase all personal data (e.g., photos, contacts, etc.) from the phone. Other data, such as operating software for the phone, may not be erased. If the data is to be transferred to a remote database for storage, a kiosk processor can be configured to transfer the data from the mobile phone 150, through the kiosk 100, 200, and over a network to a server for storage in a database for eventual retrieval by the owner of the device for, e.g., downloading to a new device. Once the data transfer is complete, the user can open the door 450 and retrieve the phones. In those embodiments that require a unique code to open the door 450, the user can input the unique code to open the door 450 and retrieve the phones.

Figure 5:
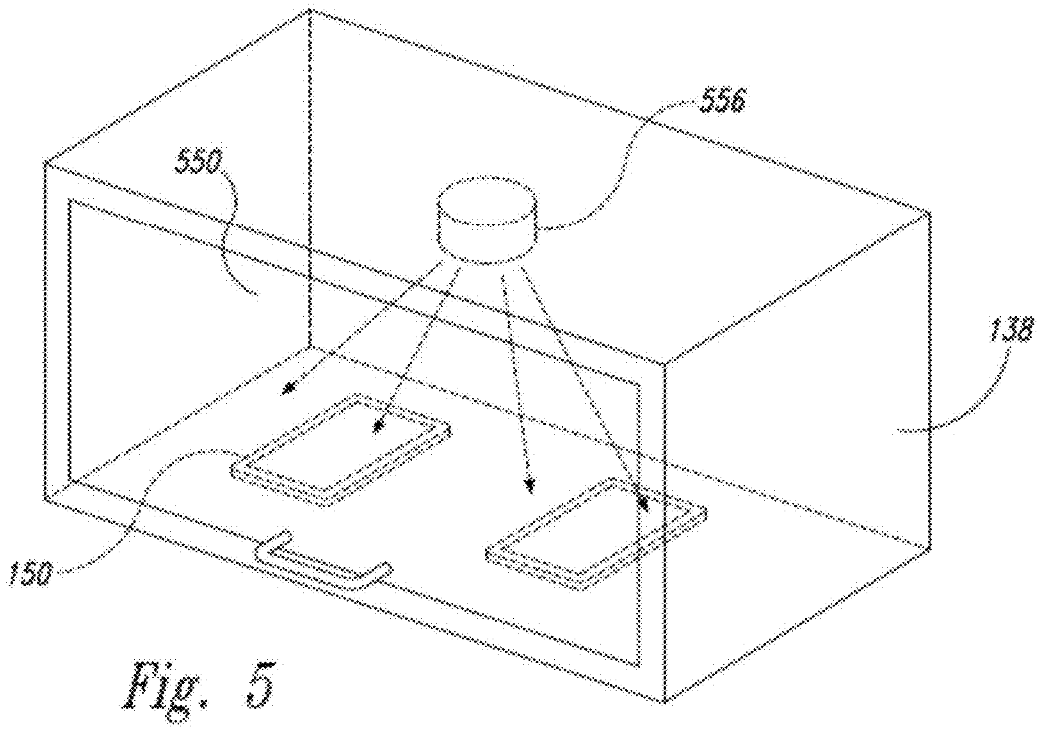
FIG. 5 is an enlarged, partially schematic isometric view of an electronic device cleaning apparatus configured in accordance with embodiments of the present technology.

FIG. 5 is an enlarged, partially schematic isometric view of the cleaning compartment 138 of the second kiosk portion 102, 202 described above. In the illustrated embodiment, the cleaning compartment 138 includes an interior portion having one or more ultraviolet (UV) light sources 556. To clean an old phone 150, the user can open the door 550 and place the old phone inside the cleaning compartment 138. The user can then start the cleaning process by pressing an appropriate button or similar manual control adjacent the cleaning compartment 138, or an icon on the display 134, which turns the UV light source 556 on to clean the phone 150. After a sufficient period of time and the phone is clean, the UV light source 556 turns off and an audible or visual signal can let the user know that they can retrieve the phone 150 from the cleaning compartment 138.

Figure 6:
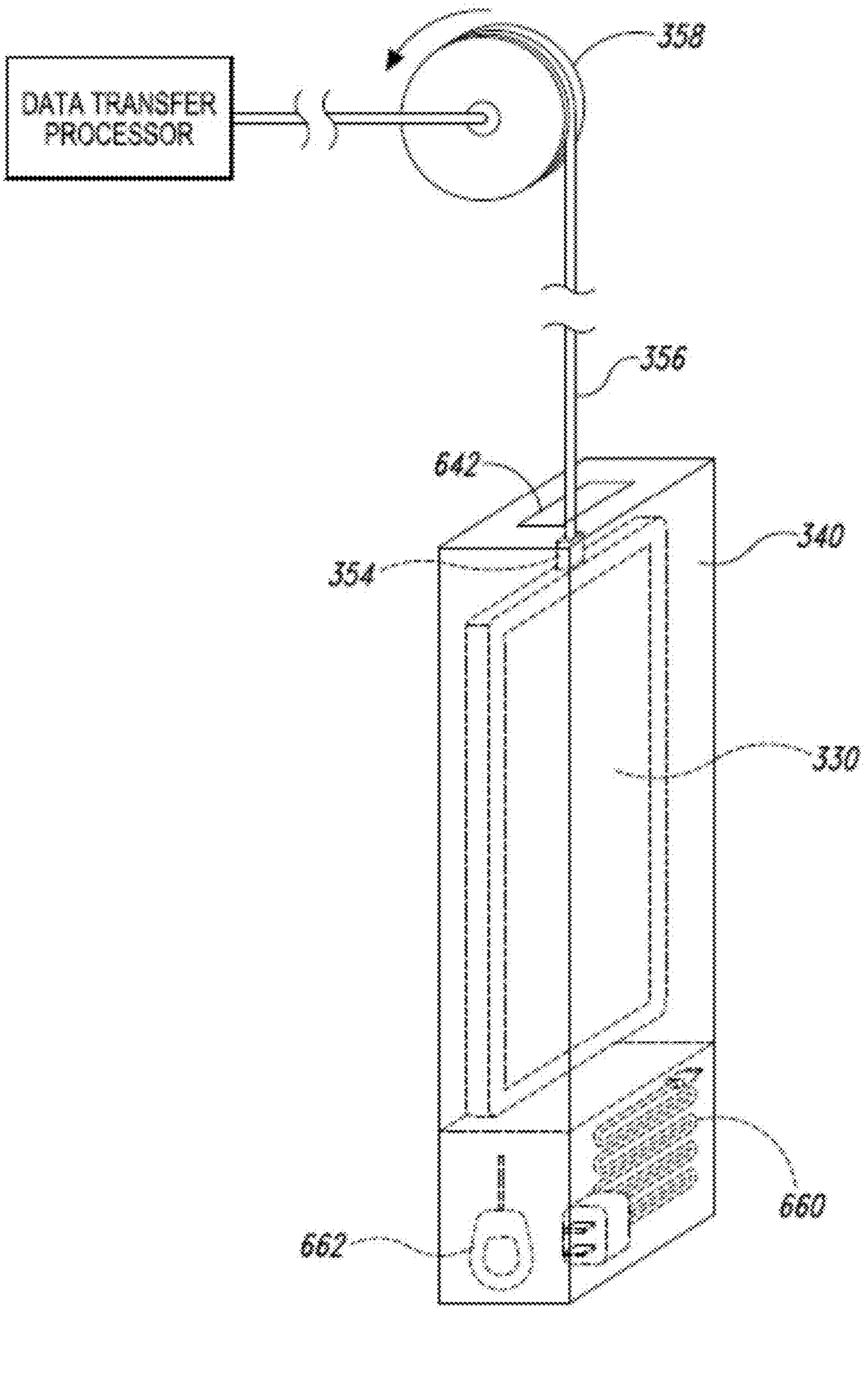
FIG. 6 is an enlarged, partially schematic isometric view of an electronic device in a vending package configured in accordance with embodiments of the present technology.

FIG. 6 is an enlarged, partially schematic isometric view of the product package 340 configured as it would be when contained within one of the vending units 132 described above with reference to FIG. 3, in accordance with embodiments of the present technology. In the illustrated embodiment, the product package 340 can be a paper (e.g., cardboard) box configured to enclose a mobile phone 330 and having an opening 642 through which the cable 356 can be connected to the mobile phone 330. As described above, in some embodiments, providing an electrical connection between the second kiosk portion 102, 202 and the mobile phone 330 while the mobile phone 330 is in the vending unit 132 enables the kiosk to transfer data from, for example, an old phone to the mobile device 330 after the device 330 has been selected and paid for by the user, but before it has been dispensed to the user. In some embodiments, the cable connection can, additionally or alternatively, enable the kiosk to keep the phone 330 charged, and/or to load other data, applications, etc. onto the phone 330 before it is dispensed to a customer. In another aspect of this embodiment, the product package 340 can include a compartment that contains ancillary equipment for use with the mobile phone 330. Such equipment can include, for example, a recharging cable 660 and/or a SIM card removal tool 662, etc.

Figure 7:
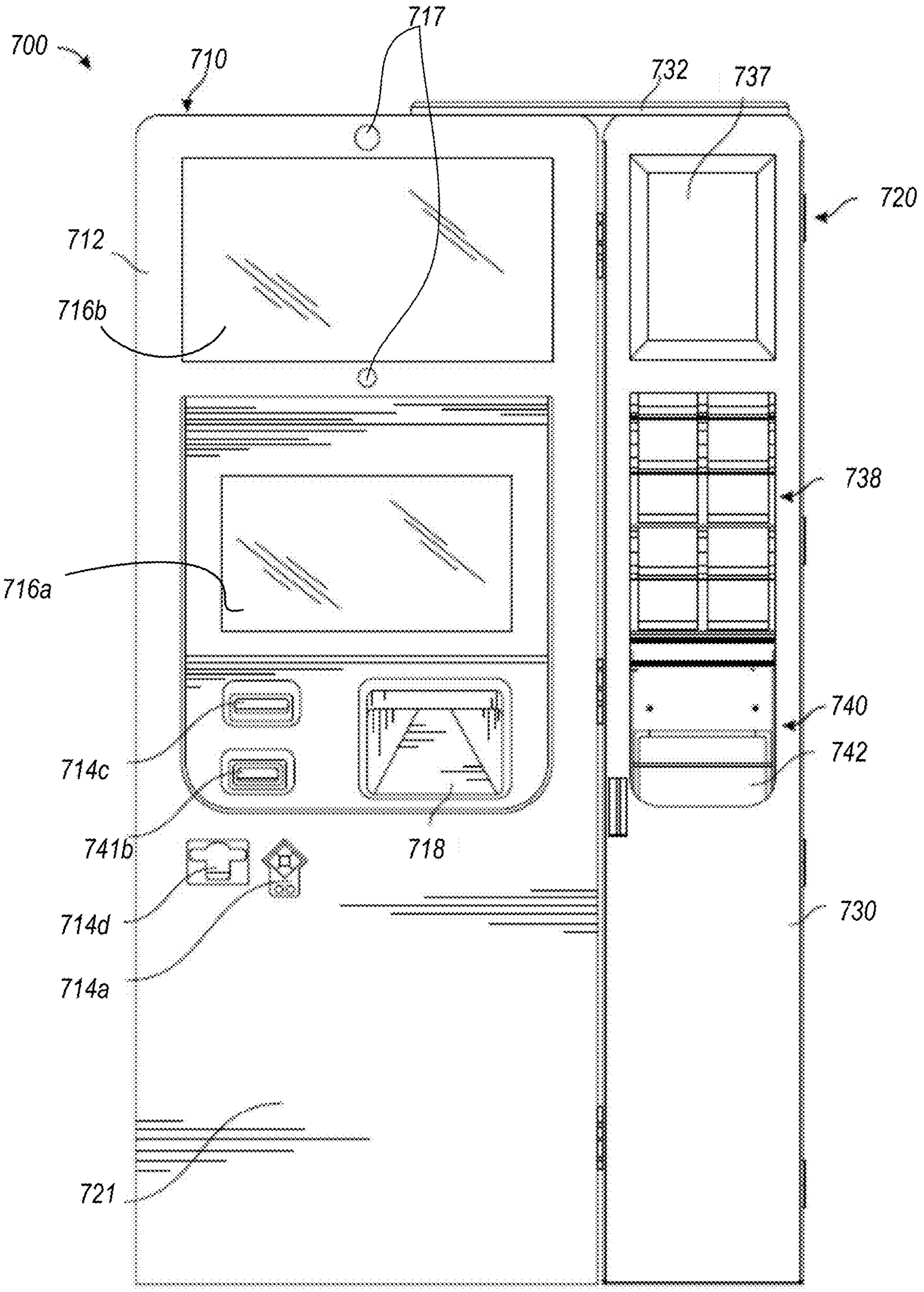
FIG. 7 is a front view of a kiosk for purchasing and/or vending mobile phones and/or other electronic devices, configured in accordance with embodiments of the present technology.

FIG. 7 is a front view of a kiosk 700 for purchasing and/or vending mobile phones and/or other electronic devices, configured in accordance with embodiments of the present technology. For example, the kiosk 700 can include a first kiosk portion 710 for purchasing and/or recycling mobile phones and/or other electronic devices received from users, and a second kiosk portion 720 for selling (e.g., vending) such devices to users. In some embodiments, the first kiosk portion 710 can be referred to as a "purchasing kiosk portion" and the second kiosk portion 720 can be referred to as a "vending kiosk portion." In some embodiments, the first kiosk portion 710 and the second kiosk portion 720 can have separate housings placed in close proximity to each other and/or physically attached to each other (as shown in FIG. 7), or they can be spaced apart from each other as separate kiosks that can either be used separately/independently of each or in conjunction with each other. In other embodiments, the first kiosk portion 710 and the second kiosk portion 720 can be integrated or otherwise positioned in a single unit or housing. In some embodiments, the first kiosk portion 710 can be similar or substantially the same, structurally and/or functionally, as the kiosks 10, 710 illustrated and described in U.S. Patent Pub. No. 2020/02513343, filed Feb. 11, 2020 and published Aug. 13, 2020, the entire contents of which are hereby incorporated by reference and made part of the present disclosure.

Figure 8A:
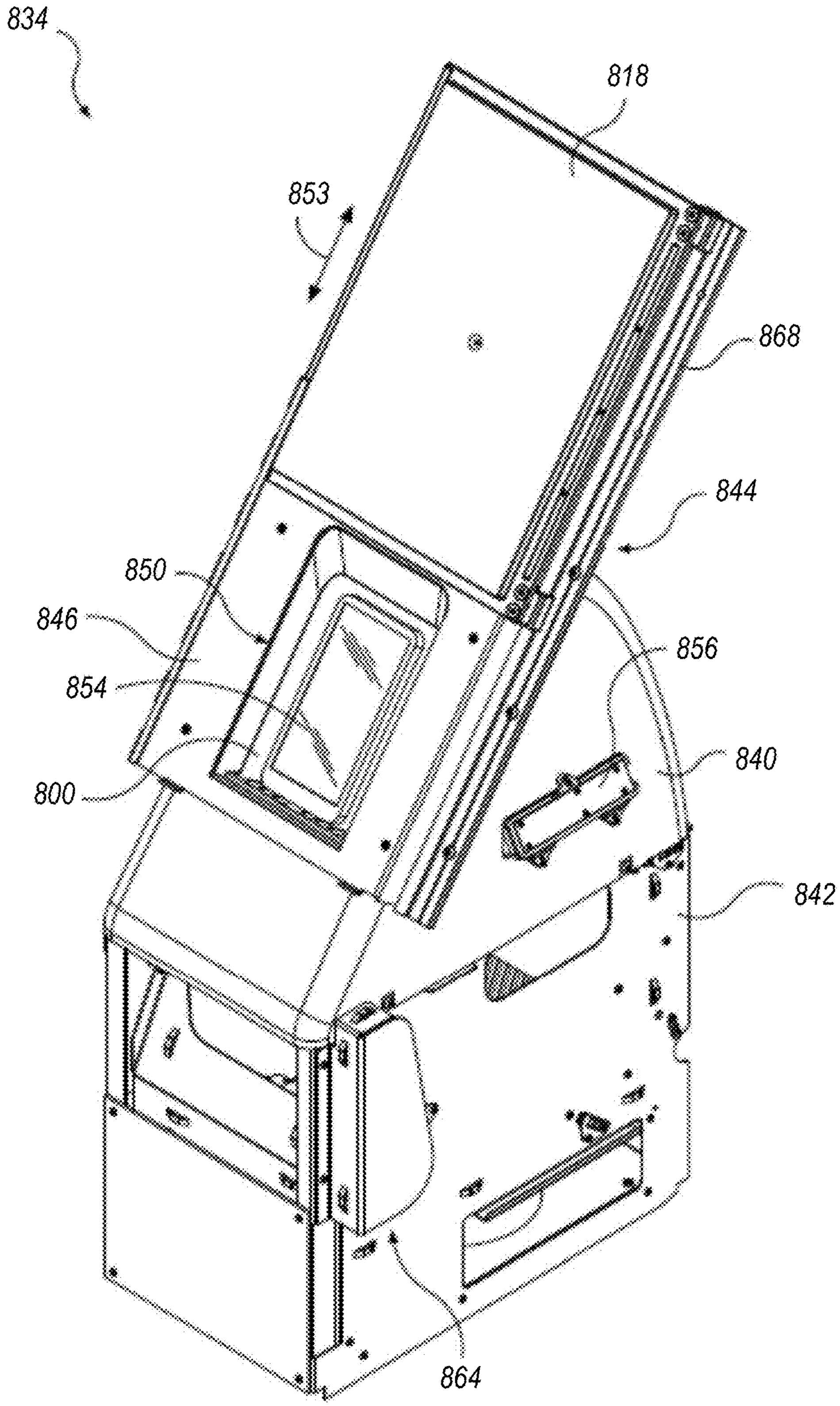
FIG. 8A is a front, top, right isometric view of an electronic device evaluation system (DES) of the kiosk of FIG. 7 configured in accordance with embodiments of the present technology.

With continued reference to FIG. 7, the first kiosk portion 710 can include a housing 712 and one or more user interface devices 714*a-d* configured to facilitate use of the first kiosk portion 710. The user interface devices 714*a-d* can include a keypad 714*a*, an identification card (ID card) reader and/or imaging device 714*b*, a payment dispenser 714*c*, a receipt dispenser 714*d*, and/or other user interface devices (e.g., a thumbprint scanner) to facilitate the electronic device purchase and/or vending process. As illustrated, the first kiosk portion 710 can also include one or more displays 716*a-b*. The one or more displays 716*a-b* can include touchscreen capability for receiving user inputs in response to displayed prompts, etc. The kiosk portion 710 can also include an access door 718 which can retract to permit the user to submit their electronic device (e.g., a mobile phone, not shown) for evaluation. The access door 718 can cover an aperture in a front door 721 of the first kiosk portion 710. One or more of the user input devices 714*a-d* (e.g., user interfaces) can be positioned on or in the front door 721 of the kiosk 710. In some embodiments, one or more of the user interface devices 714*a-d* can be positioned on or in a side wall of the kiosk housing 712. The first kiosk portion 710 can include one or more external cameras 1017 configured to image a user, and/or ID (e.g., and driver's license and/or other forms of ID), or other object outside of the kiosk. The first kiosk portion 710 can include a device evaluation system 834 (DES 834; FIG. 8A) positioned within the housing 712 (e.g., behind the access door 718).

FIG. 8A is an isometric view of the DES 834 removed from the first kiosk portion 710 to better illustrate the components of the DES 834. in some embodiments, the DES 834 can include an upper housing 840 and a lower housing 842. In some embodiments, the upper and lower housings 840, 842 are integrally formed with each other. In other embodiments, the upper and lower housings 840, 842 are separate parts. In some embodiments, the kiosk includes an access door assembly 844. The access door assembly 844 can be connected to the upper DES housing 840. In some embodiments, the access door assembly 844 includes a lower frame 846 mounted to the upper DES housing 840. The access door frame 846 can include an opening 48 configured to provide access to an inspection area 850 of the kiosk 710. As described in more detail below, the access door assembly 844 can include an access door 718 configured to move (e.g., slide) between a closed position and an open position (as shown in FIG. 8A) along a movement direction 853. In the closed position, the access door 18 blocks access to the electronic device inspection area 850 of the DES 834. In the open positioned, the access door 18 is moved away from the inspection area 850 as shown in FIG. 8A to allow for insertion and/or removal of an electronic device 854 into/from the inspection area 850.

Figure 8B:
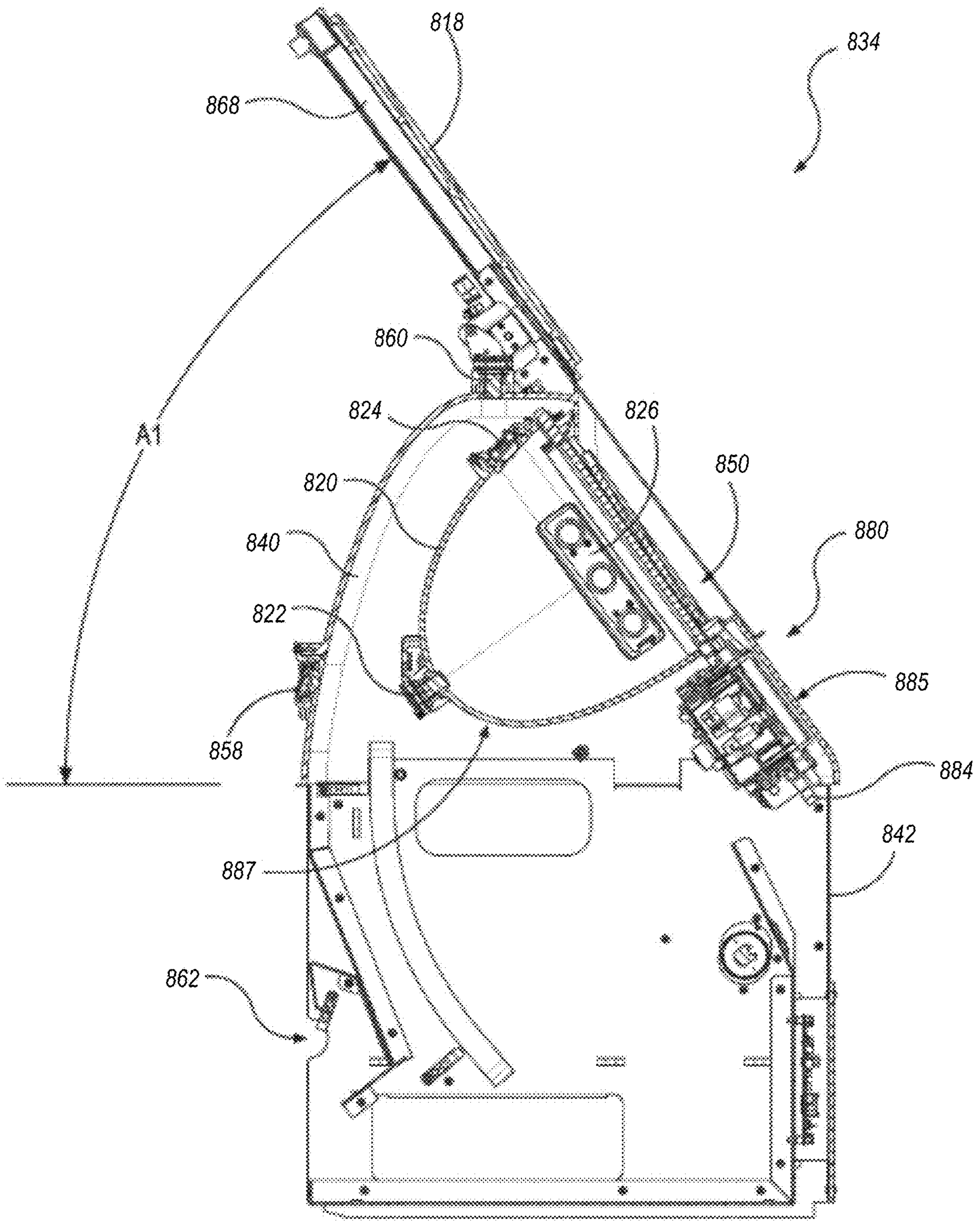
FIG. 8B is a cross-sectional side view of a tilting assembly of the DES of FIG. 8A, in which the tilting assembly is in a home position and an access door is opened, in accordance with embodiments of the present technology.

FIG. 8B is a left side cross-sectional side view of the DES 834 that shows the DES 834 in an initial or "home" position in which the moveable evaluation subassembly ("MES") 880 is arranged at an angle with respect to horizontal (e.g., inclined). For example, the angle A1 between a base plate 884 and horizontal can be less than 90° and greater than 0°. In some embodiments, the angle between the base plate 884 and horizontal is between 40°-80°, between 55°-75°, between 10°-85°, between 45°-70°, and/or between 30°-65° when the DES 834 is in the home position. In some embodiments, the angle between the base plate 884 and horizontal is approximately 60°. Orienting the base plate 884 at an angle less than 90° with respect to horizontal when in the home position can reduce the risk of the phone 854 inadvertently falling out of the inspection area 850. Orienting the base plate 884 an angle greater than 0° with respect to horizontal when in the home position can reduce the required depth of the kiosk 10 to accommodate the access door assembly 844 and/or other components of the kiosk 10, thereby reducing the overall size and/or footprint of the kiosk 10.

As illustrated in FIG. 8B, in some embodiments the lower dome assembly 887 can include a lower dome 820 having a curved dome/bulbous shape. The lower dome 820 can be mounted to the base plate 884 such that the lower dome assembly 887 moves with the base plate 884 as the MES 880 drives the base plate 884 between various positions. In some embodiments, the lower dome assembly 887 includes one or more cameras and/or lighting assemblies used to inspect the phone or other electronic device. For example, the lower dome assembly 87 can include a lower camera 822 mounted to the lower dome 820. The lower camera 822 can have a field of vision that includes all or most of the inspection plate 800. In some embodiments, the lower dome assembly 887 includes first and second lighting assemblies 826, 824. One or more of the lighting assemblies (e.g., the lower rear lighting assembly 824) can be mounted on a back side of the lower dome 820. In some embodiments, another lighting assembly (e.g., the lower side lighting assembly 826) is positioned on a side of the lower dome 820.

Figure 8C:
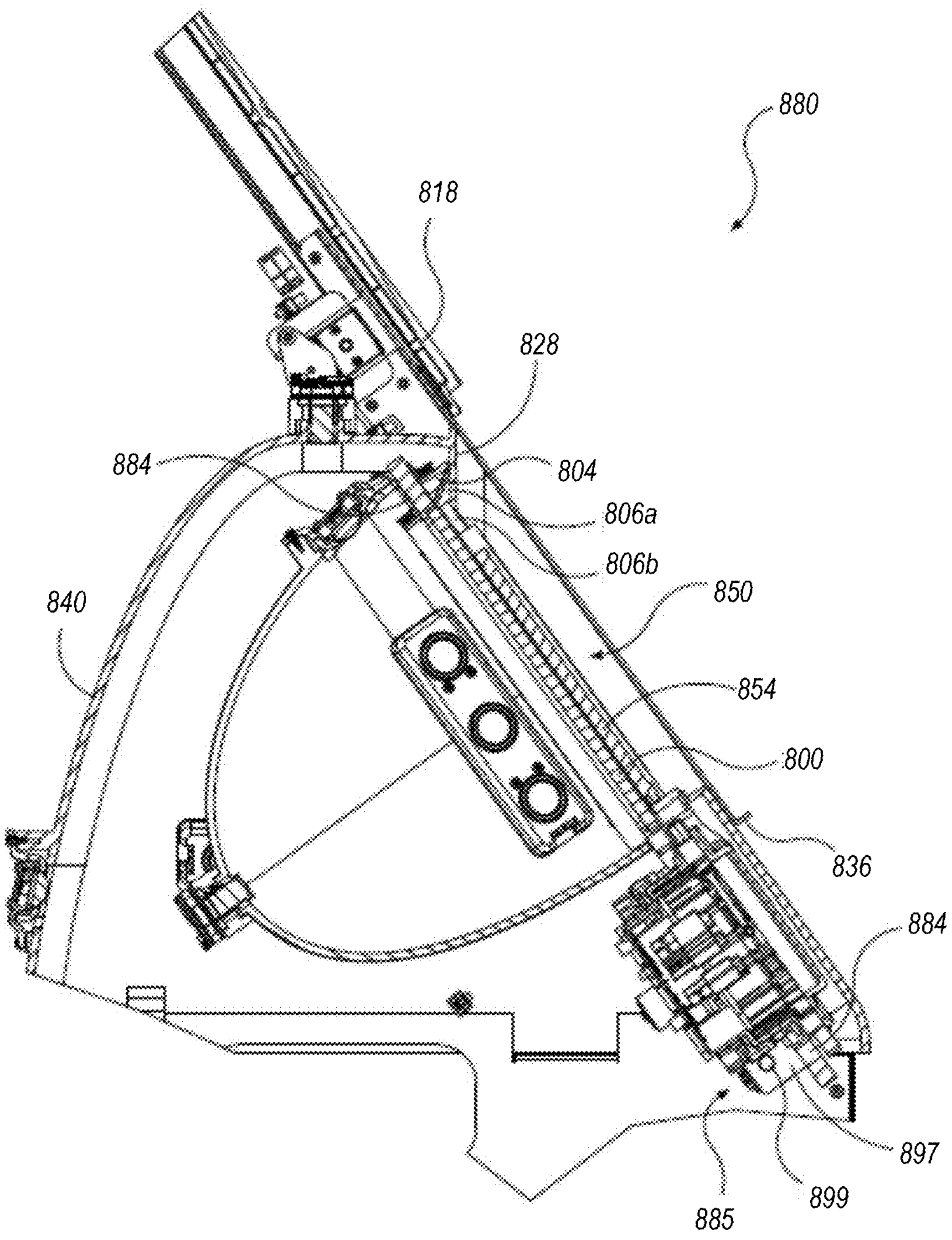
FIG. 8C is an enlarged cross-sectional side view of the DES of FIG. 8A, in which the tilting assembly is in the home position and the access door is opened.

FIG. 8C illustrates an enlarged left side cross-sectional view of the MES 880 and other components of the kiosk 1010. The upper DES housing 840 can include one or more rims or edges 828 at the boundaries of the inspection area 850. When the MES 880 is in the home position as shown, the rims 828 of the upper DES housing 840 can overlap the mirror frame 804 such that access to the interior of the upper and lower DES housings 840, 842 is closed to outside access. Access to the connector carrier 885 is also blocked by the interface between the upper DES housing 840 and the mirror frame 804.

Figure 8D:
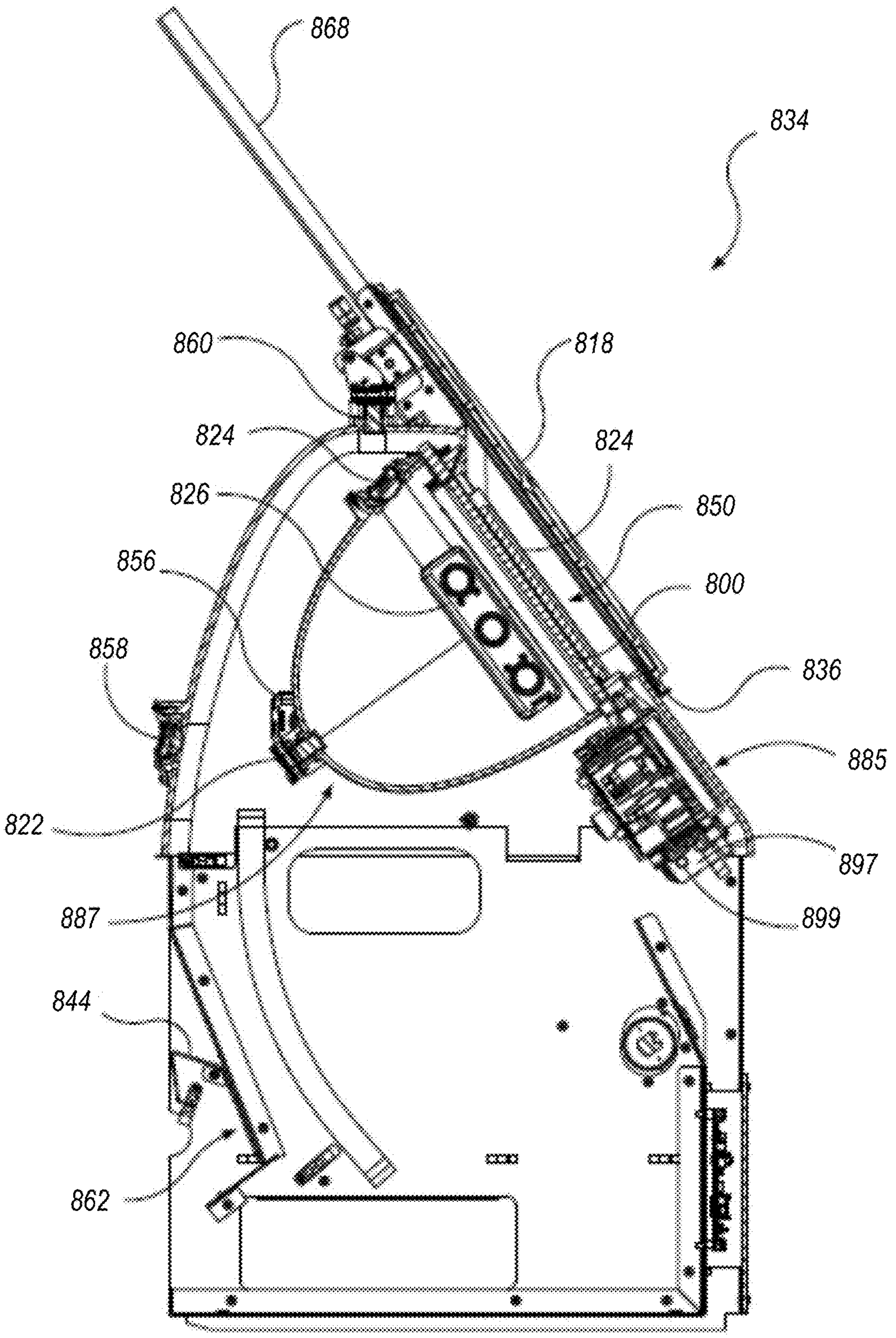
FIG. 8D is a cross-sectional side view of the DES of FIG. 8A, in which the tilting assembly is in the home position and the access door is closed.
Figure 8E:
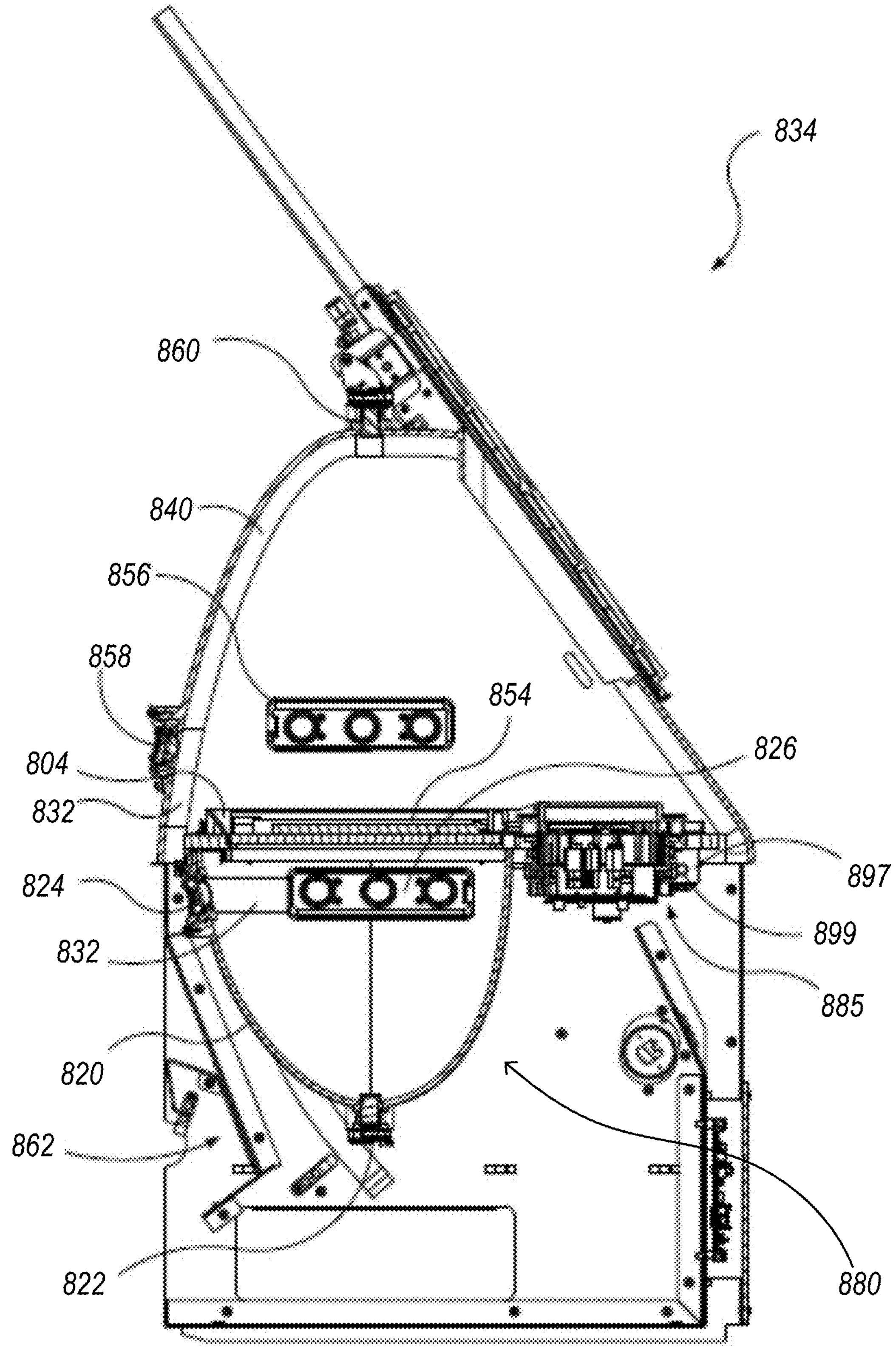
FIG. 8E is a cross-sectional side view of the DES of FIG. 8A, in which the tilting assembly is in a grading position and the access door is closed.
Figure 8F:
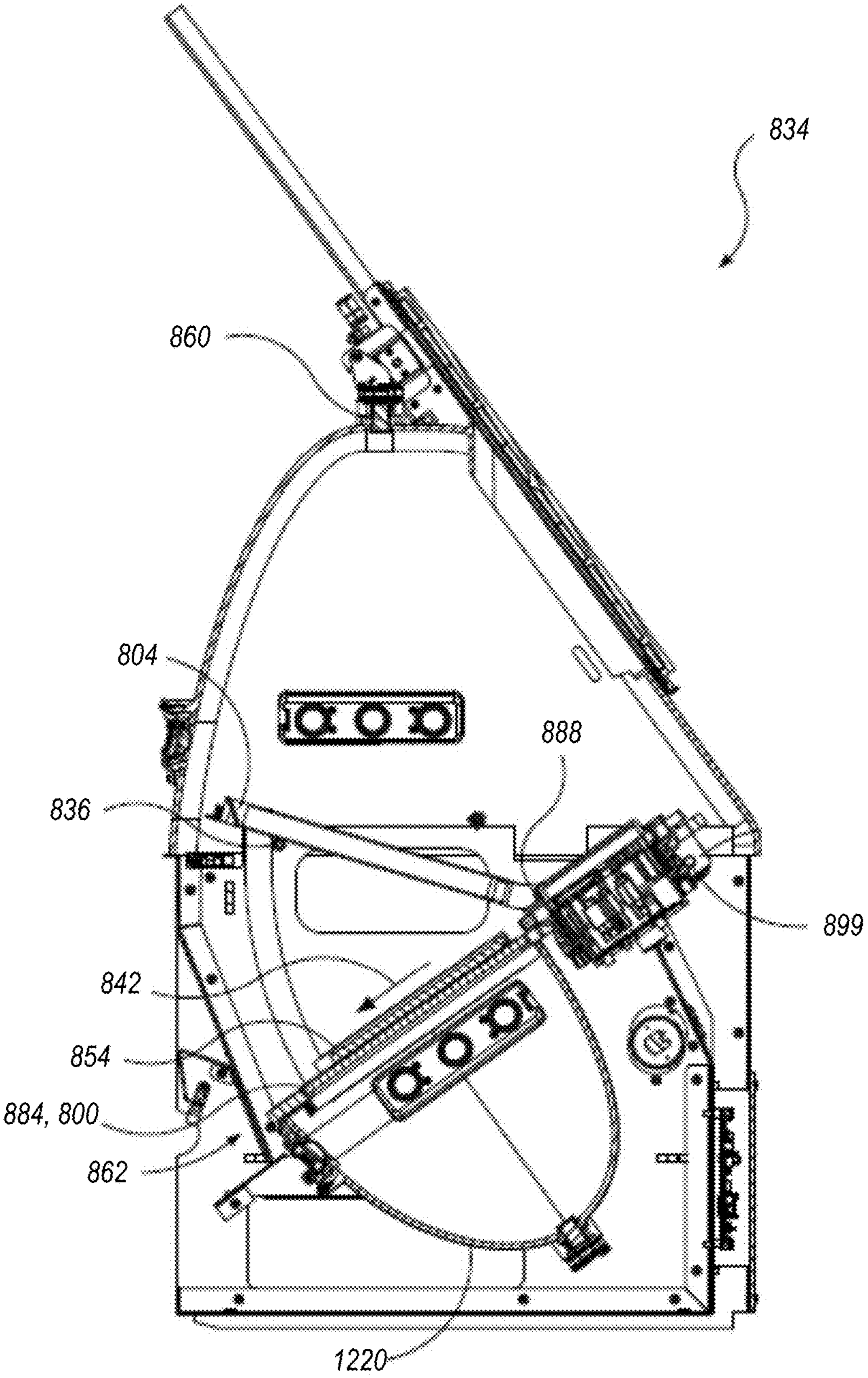
FIG. 8F is a cross-sectional side view of the DES of FIG. 8A, in which the tilting assembly is in a binning position and the access door is closed.

FIGS. 8D-8F are left side cross-sectional views illustrating the DES 834 in the home position, an inspection position, and a binning position, respectively. More specifically, FIG. 8D illustrates the access door 718 and the MES 880 in their respective default positions (e.g., the positions in which they are positioned in the absence of interaction with a user or maintenance staff). In the default position, the access door 718 is closed, thereby blocking access to the inspection area 850 of the DES 834. A user may instruct the first kiosk portion 710 (e.g., via a touch screen portion of one of the displays 716*a-b*, and/or via one of the user interface devices 714*a-d*) to open the access door 718 (e.g., as illustrated in FIG. 8B) to allow for placement of a phone or other electronic device 854 into the inspection area 850. For example, the user may tap or press one or more buttons or icons on the displays 716*a-b* or on the keypad 714*a* associated with a request to begin a transaction. The user may specify, via one or more of the user interface devices 714*a-d* (FIG. 7) and/or via a touch screen portion of one of the displays 716*a-b*, the make and/or model of the user's electronic device 854. In some embodiments, the connector carrier 885 can rotate and/or move toward the inspection area 850 and present the relevant connector to the inspection area 850. After the user inputs the electronic device 854 into the inspection area 850 and connects a connector thereto, the user may instruct the first kiosk portion 710 (e.g., via a touch screen portion of one of the displays 716*a-b*, and/or via one or more of the user interface devices 714*a-d*) to evaluate the electronic device 854 for trade-in and/or purchase value. In some embodiments, before closing the access door 718 and/or prior to placement of the electronic device 854 into the inspection area 850, the first kiosk portion 710 may use the lower camera 822 to take a picture of the user through the inspection plate 800 (e.g., for adherence to second-hand dealer laws and/or for other security purposes). As illustrated in FIGS. 8C and 8D, the first kiosk portion 710 can include one more door stops 836 configured to limit downward movement of the access door 718 and/or to define the closed position of the access door 718.

As illustrated in FIG. 8E, the MES 880 can rotate from the home position to an evaluation (e.g., grading, inspection, etc.) position. In some embodiments, the base plate 884 and/or inspection plate 800 are positioned substantially horizontal when in the evaluation position. The first kiosk portion 710 can be configured to evaluate the electronic device 854 when the MES 880 is in the evaluation position. Evaluation of the electronic device 854 can include visual evaluation (e.g., via one or more of cameras 860, 822) and/or electrical evaluation (e.g., via a connector and/or via a software application or wireless connection) to determine various information about the device that can affect the monetary value of the device. Such information can include, for example, the make, model, sub-model of the device, the device features (e.g., memory size, cell service carrier, etc.), device operability, device charge and/or rechargeability, physical condition (e.g., presence or absence of cracks, display function and condition, etc.

In some embodiments, evaluation (e.g., electrical and/or visual inspection) of the electronic device 854 include obtaining characteristic information about the electronic device 854, which can include device identification, make, model, and/or configuration. In other embodiments, the characteristic information can further include device functionality including hardware/software configuration, charging capability, memory capacity, etc. Information necessary to identify and/or evaluate a mobile device can include, for example, a unique identifier (e.g., an IMEI number or an MEID or equivalent number of a mobile phone, a hardware media access control address (MAC address) of a networkable device, or a model number and serial number of the electronic device); information describing the device manufacturer (e.g., a manufacturer name or ID code), model, characteristics and capabilities (e.g., CPU type and speed, storage capacity (SRAM, DRAM, disk, etc.), wireless carrier, radio bands (frequency ranges and encodings such as CDMA, GSM, LTE, etc.), and/or color, condition; and so on. In some embodiments, the electrical analysis can include evaluating the condition and/or functionality of the charging circuit of the electronic device. In particular, the testing electronics can measure the amount of charge current that the charging circuit draws on the power lines, and the testing electronics can use the corresponding current measurement signal to determine whether the charging circuit is functional or damaged. In some embodiments, the first kiosk portion 710 can perform the electrical analysis using one or more of the methods and/or systems described in detail in the commonly owned patents and patent applications identified herein and incorporated by reference in their entireties.

In some embodiments, one or both of the upper and lower domes 840, 820 can include a darkened (e.g., black, charcoal, or some other dark color) portion or band. For example, one or both of the domes can include a black band 832 on their respective inner surfaces. The black or darkened portions or bands 832 can absorb light and reduce glare within the domes 840, 820. Additionally or alternatively, in some embodiments, the upper and/or lower domes 840, 820 include one or more apertures therethrough to allow light to escape, thereby reducing glare within the inspection area 850 and on the inner surface of the domes 840, 820. The darkened portions and/or apertures can reduce unwanted reflections of light from the phone or electronic device 854 (e.g., reflections from curved/beveled corners and/or edges) to allow for increased accuracy and reliability in the evaluation/grading process.

After the first kiosk portion 710 evaluates the electronic device 854 as described above, the user is presented with a purchase offer via, for example, one of the displays 716*a-b*. The purchase price can be offered/paid in the form of, for example, cash, a voucher redeemable for cash, merchandise, services, etc., electronic value (e.g., bitcoin, e-certificates, credit to electronic payment account, etc.), credit (e.g., a prepaid credit card, debit card, gift card, etc.), coupons, loyalty points, and/or other forms of value. If the user rejects the offer (e.g., via a touch screen portion of one of the displays 716*a-b*, and/or via one of the user interface devices 14*a-d*), the MES 880 returns to the home position (FIG. 8D), the access door 718 opens, and the connector, if still connected to the electronic device 854, disconnects from the electronic device 854. In some transactions, the electronic device 854 may be displaced on the inspection plate 800 from its original home position. For example, the electronic device 854 may tilt (e.g., may be rotated from its home position or at an angle to its original orientation) in a direction parallel to the face of the inspection plate 800. In some such situations, the electronic device 854 may become jammed between, for example, the access door frame 846 and the inspection plate 800. The first kiosk portion 710 can be configured to detect such a jam and retract the MES 880 a small distance toward the evaluation position. The MES 880 may be locked in this intermediate position while the access door 718 opens to allow the user to retrieve their electronic device 854. Use of this intermediate position (e.g., a locked intermediate position) between the evaluation position and the home position can reduce the likelihood of damage to the electronic device 854 and/or to the first kiosk portion 710 during operation.

If the user accepts the offer from the first kiosk portion 710 and inputs that decision into the first kiosk portion 710 (e.g., via a touch screen portion of one of the displays 716*a-b*, and/or via one of the user interface devices 714*a-d*), the MES 880 rotates further downwardly about the pivot axis 899, as illustrated in FIG. 8F. In some embodiments, the offer price (e.g., cash, voucher, or some other type of remuneration) is dispensed to the user after acceptance (e.g., via the payment dispenser 714*c* and/or electronically into an account of the user).

Returning to FIG. 7, the second kiosk portion 720 (e.g., the vending kiosk portion) can include a housing 730. The housing 730 of the second kiosk portion 720 can be connected to permanently or removably attached to the housing 712 of the first kiosk portion 710. For example, one or more bars 732, straps, and/or other mechanical structures may be used to fasten or otherwise attached the two housings 712, 730 to each other. In some configurations, the housings 712, 730 are connected side-by-side as illustrated in FIG. 7. In other embodiments, the housings 712, 730 are stacked. In still other embodiments, the housings 712, 730 are not attached or otherwise connected to each other (e.g., in some embodiments where the two kiosk portions 710, 720 are not collocated and/or are used independently of each other as separate kiosks).

The second kiosk portion 720 can include a display 737. The display 737 can be configured to provide instructions for use of the second kiosk portion 720, advertisements, promotional materials, educational content, and/or other video content. In some embodiments, the display 737 is a touchscreen for use as a user-interface. The second kiosk portion 720 can include a storage bay 738 configured to store mobile phones and/or other electronic devices for sale. The second kiosk portion 720 can include a vending bay 740 wherein, as explained below, sold electronic devices (e.g., mobile phones) can be moved for removal by a user after purchase. Access to the vending bay 740 can be selectively prevented by a vending access door 742.

Figure 9A:
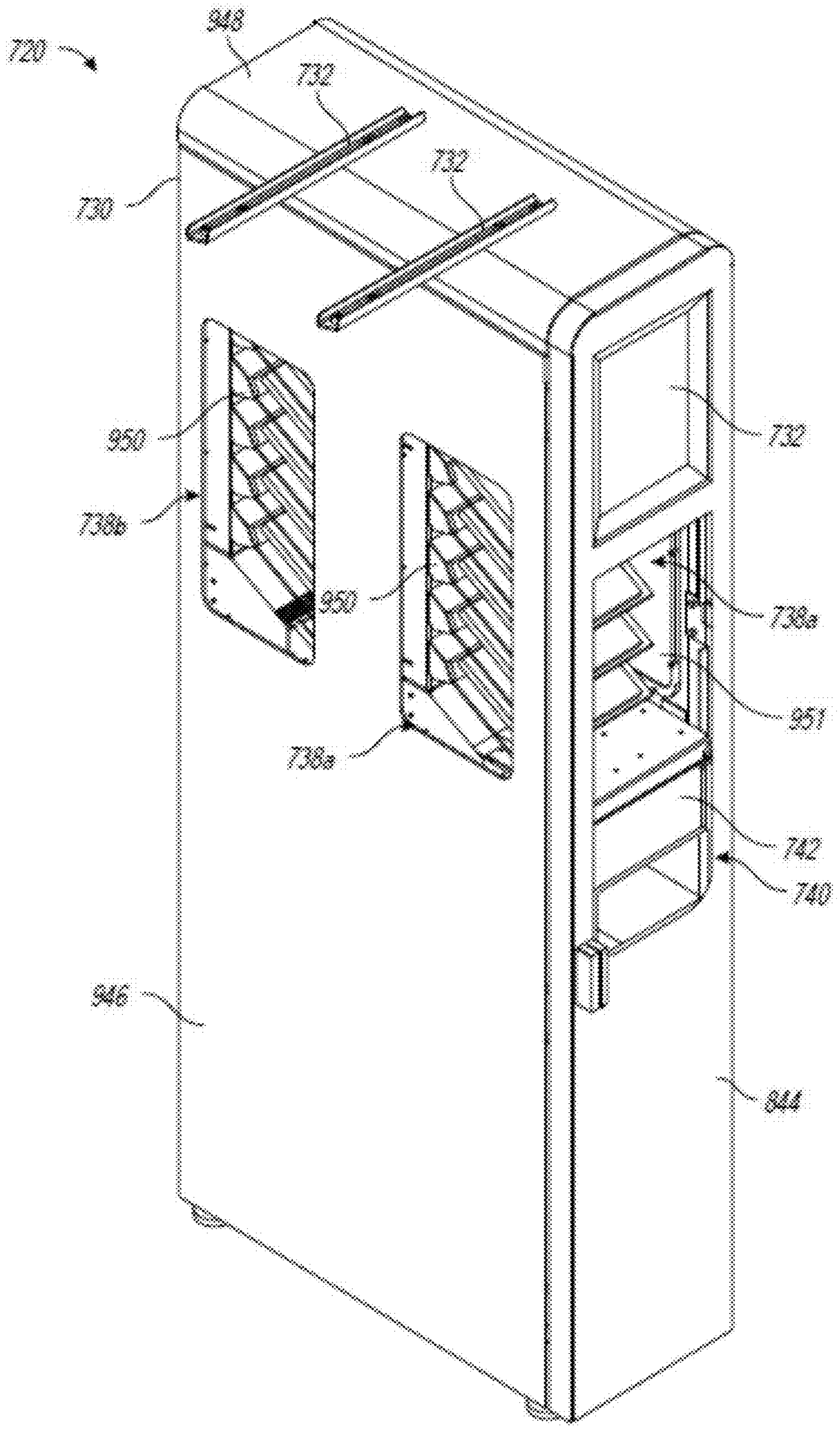
FIG. 9A is an isometric view of a vending kiosk portion of the kiosk of FIG. 7, configured in accordance with embodiments of the present technology.

FIG. 9A is an isometric view of the second kiosk portion 720 of FIG. 7, configured in accordance with embodiments of the present technology. The housing 730 of the kiosk portion 720 can include a front access door 844, one or more sidewalls 946 connected to the front access door 844, and a top wall 948 connected to the sidewalls 946. The bars 732 can be connected to the top wall 948 and/or one or more of the sidewalls 946 and can be configured to connect to a top wall or sidewall of the first kiosk portion 710.

The second kiosk portion 720 can include a front or first storage bay 738*a* and a second or rear storage bay 738*b*. In some embodiments, the sidewalls 946 (FIGS. 9A, 9C, and 9D) can include one or more windows 950 that provide users with a direct view of the mobile phones within the storage bays 738. The windows 950 can be constructed from a reinforced glass or polymer configured to resist cracking and/or shattering while providing a clear view into the storage bays 738. The door 844 can include a window 951 providing visual access to the front storage bay 738. The window 951 and/or the vending access door 742 can be constructed from the same or a similar material as the windows 950 in the sidewalls 946. By providing a clear view into the storage bays 738, while resisting or preventing unauthorized access to the storage bays 738, the windows 950 allow a user to directly view the variety of mobile phones within the storage bays 738 and quickly and confidently browse the available models. This visual access can accelerate the transaction process, as explained further below.

Figure 9B:
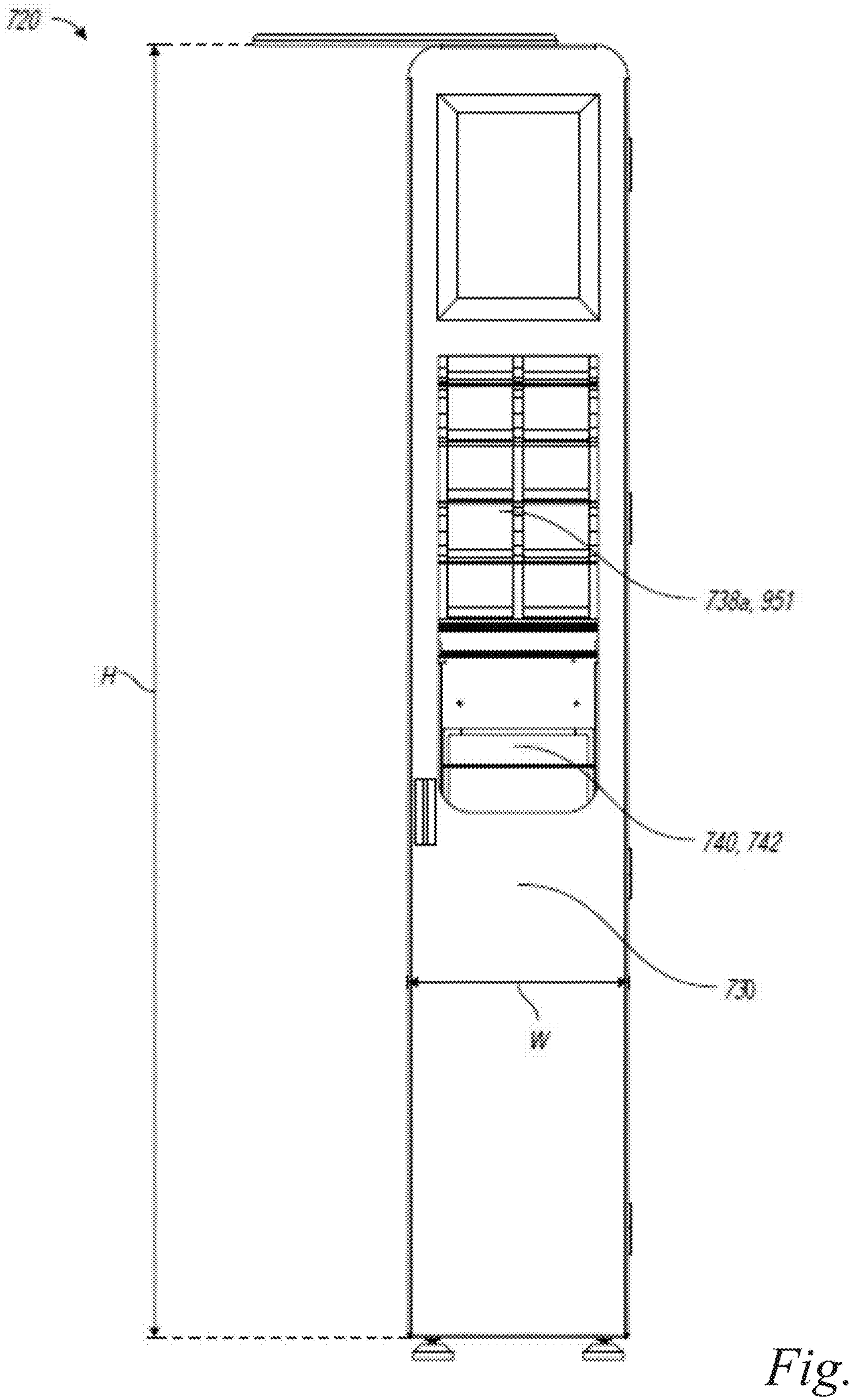
FIG. 9B is a front view of the vending kiosk portion of FIG. 9A.
Figure 9C:
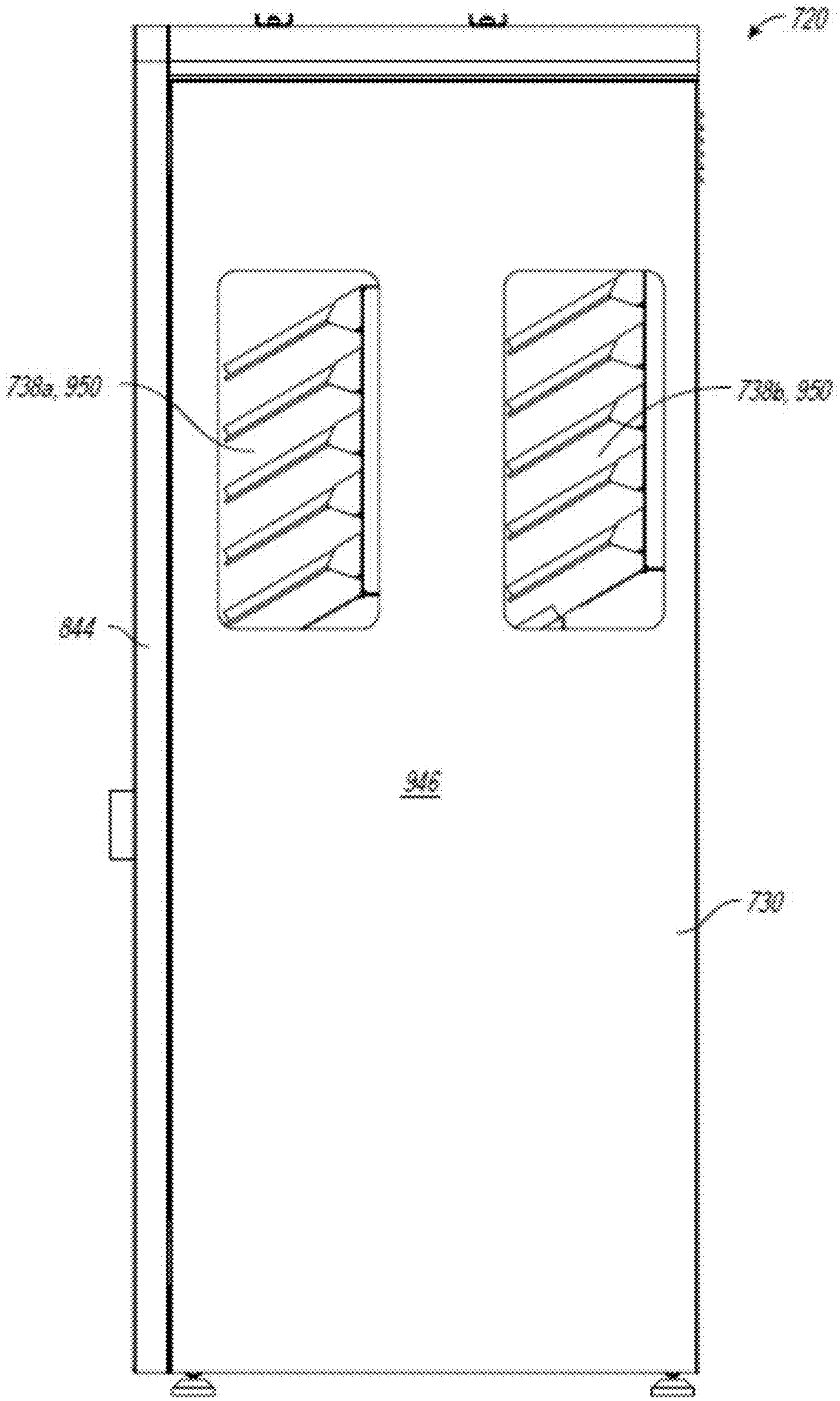
FIG. 9C is a right-side view of the vending kiosk portion of FIG. 9A.
Figure 9D:
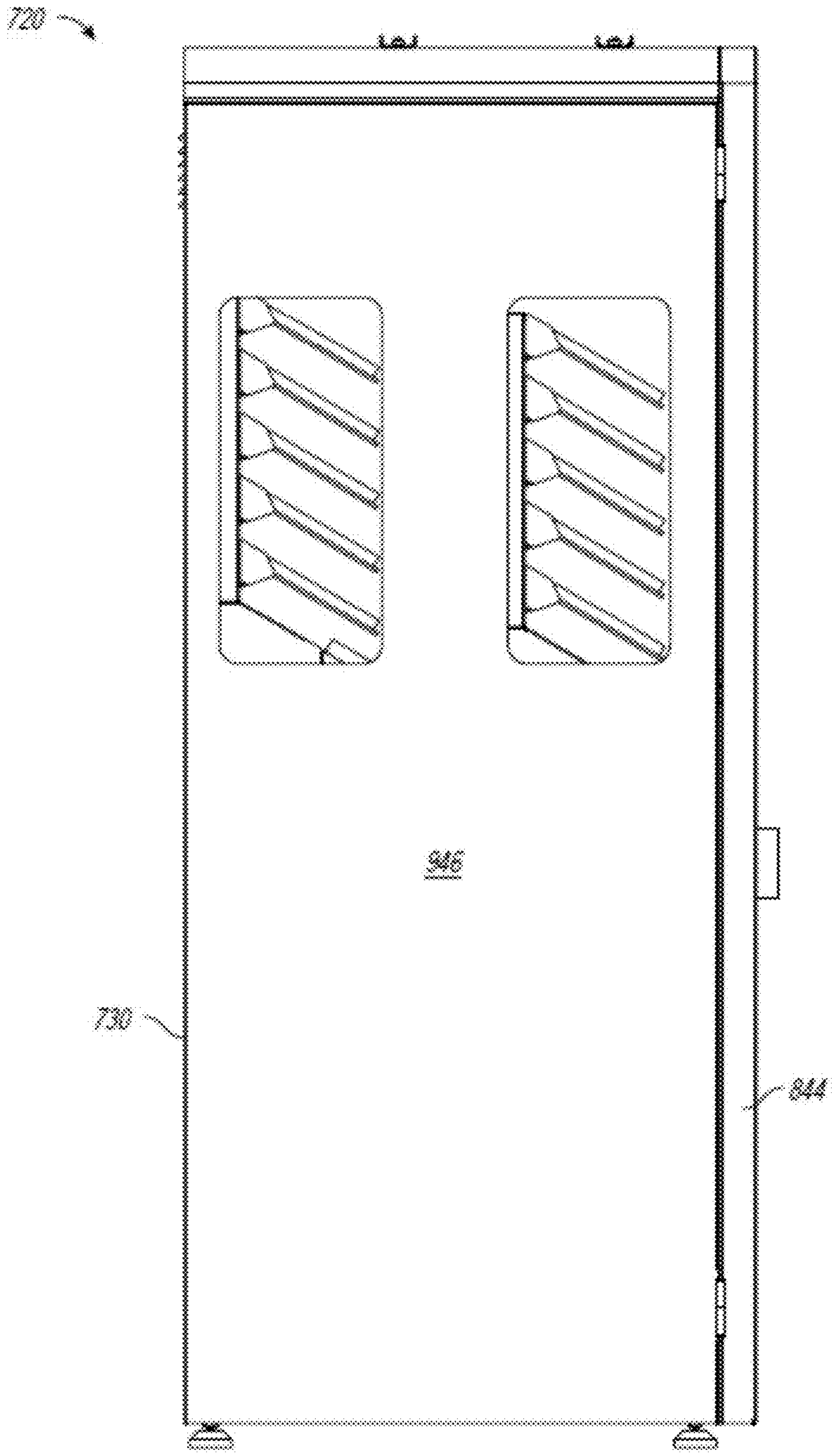
FIG. 9D is a left-side view of the vending kiosk portion of FIG. 9A.
Figure 9E:
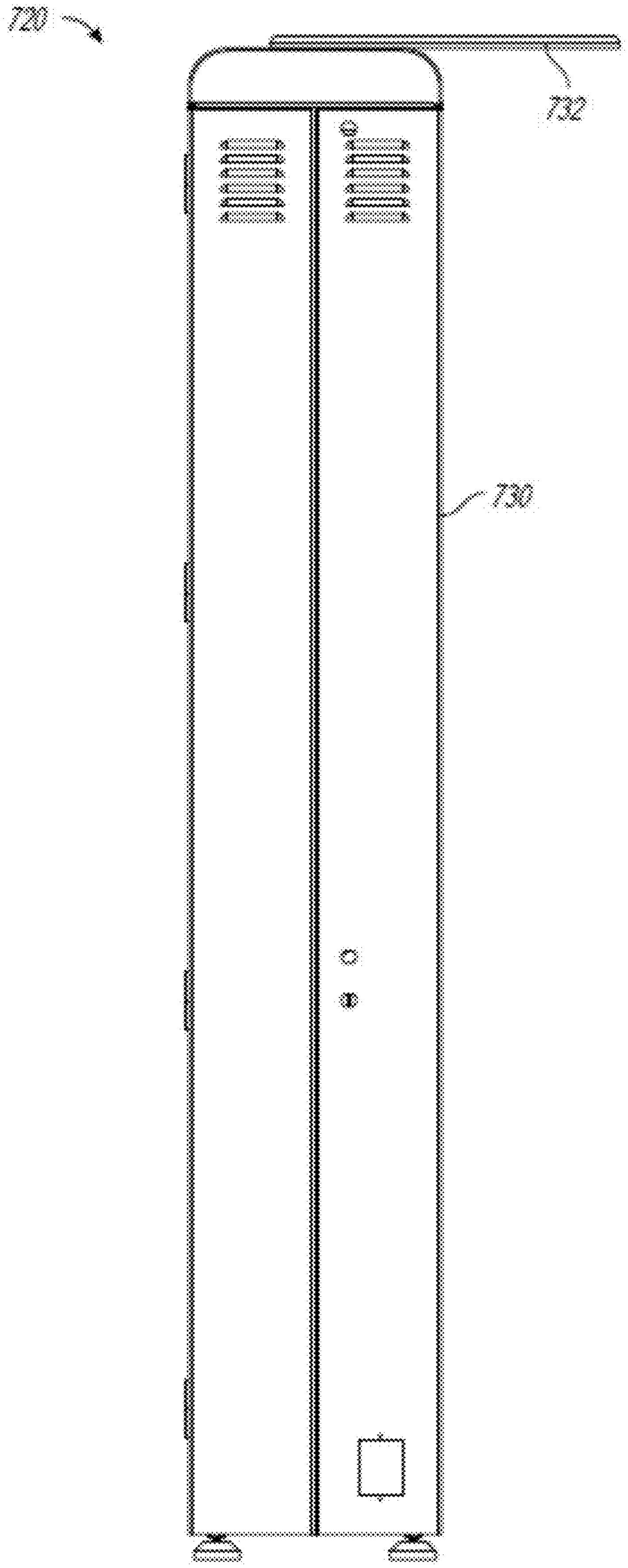
FIG. 9E is a rear view of the vending kiosk portion of FIG. 9A.

FIGS. 9B-9E are front, right-side, left-side, and rear views, respectively, of the second kiosk portion 720 configured in accordance with embodiments of the present technology. As illustrated in FIGS. 9B-9C, in some embodiments the second kiosk portion 720 can be relatively narrow when viewed from the front. For example, in some embodiments the ratio between the height H and width W (H divided by W) of the second kiosk portion 720 can be between 4-7, between 5-6.5, and/or between 5.5.-6. In some embodiments, the ratio between the height H and the width W is approximately 5.85. Having a narrow shape can allow the second kiosk portion 720 to be connected to the first kiosk portion 710 without significantly increasing the overall footprint of the kiosk 700 with respect to the footprint of the first kiosk portion 710.

Figure 9F:
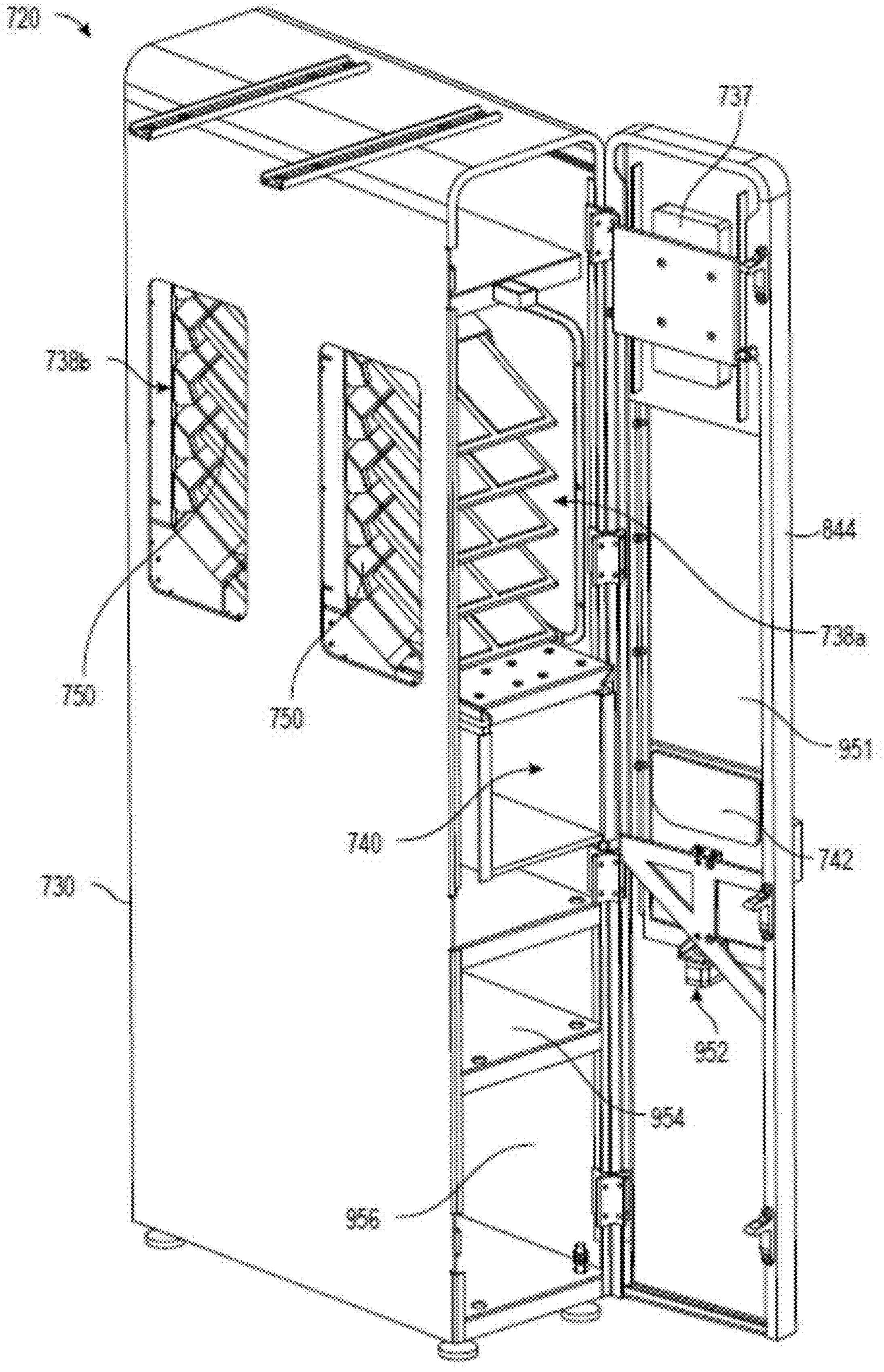
FIG. 9F is an isometric view of the vending kiosk portion of FIG. 9A with a front door in an open position.

FIG. 9F illustrates the second kiosk portion 720 with the front access door 844 in an opened position. The display 737 can be secured to the backside of the front access door 844 by a clamp or other releasable structure. The vending access door 742 can be connected to a vending access door mechanism 952 configured to translate the vending access door 742 between opened (FIG. 10D) and closed (FIGS. 10B-10D) positions.

Staying with FIG. 9F, the second kiosk portion 720 can include multiple internal compartments. For example, the storage bays 738 can occupy an upper portion of the second kiosk portion 720. Positioning the storage bays 738 in an upper portion of the housing 730 allows the kiosk portion 720 to take advantage of gravity when dispensing the purchased phones, as described in detail below. The vending bay 740 can be positioned below the storage bays 738 and at a front portion of the housing 730. In some embodiments, the second kiosk portion 720 includes one or more lower sections 954, 956 positioned beneath the storage bays 738 and/or the vending bay 740. The lower sections 954, 956 can be used, for example, to store electronic components, wiring, spare parts, or other components useful in the operation of the second kiosk portion 720. In some embodiments, one or both of the lower sections 954, 956 can be used to facilitate data transfer and/or phone cleaning in a manner similar to or the same as described above with respect to, e.g., FIGS. 4-5. In some such embodiments, the front access door 844 can include separate and/or lockable doors providing access to the lower sections 954, 956.

Figure 10A:
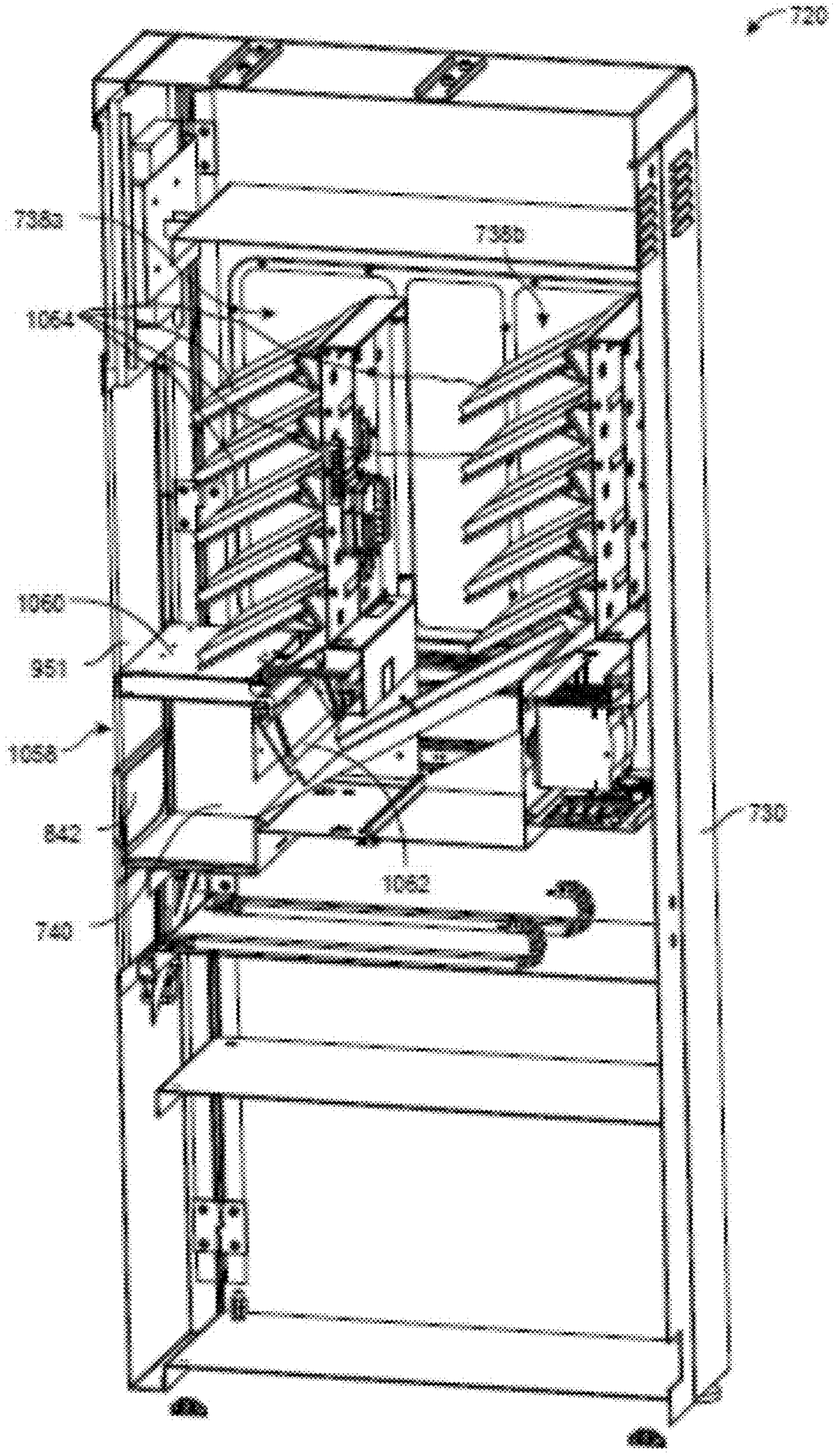
FIG. 10A is an isometric cross-sectional view of the vending kiosk portion of FIG. 9A, illustrating internal components of the vending kiosk portion.

FIG. 10A is an isometric cross-sectional view of the second kiosk portion 720 of FIG. 9A, illustrating internal components of the second kiosk portion 720 configured in accordance with embodiments of the present technology. As illustrated, the first storage bay 738*a* is positioned in front of the second storage bay 738*b*. In some embodiments, access to the vending bay 740 from the storage bays 738, and vice versa, is controlled by an access assembly 1058. The access assembly 1058 can include one or more doors or other structures and mechanisms configured to selectively block access between the exterior of the housing 730, the vending bay 740, and the storage bays 738. For example, the access assembly 1058 can include the vending access door 742, a first storage access door 1060, and/or a second storage access door 1062. The first storage access door 1060 can selectively control access between the first storage bay 738*a* and the vending bay 740, and the second storage access door 1062 can selectively control access between second storage bay 738*b* and the vending bay 740. As explained below in more detail, the access assembly 1058 can inhibit or prevent users from accessing the storage bays 738 to steal phones 1064 from the second kiosk portion 720.

Figure 10B:
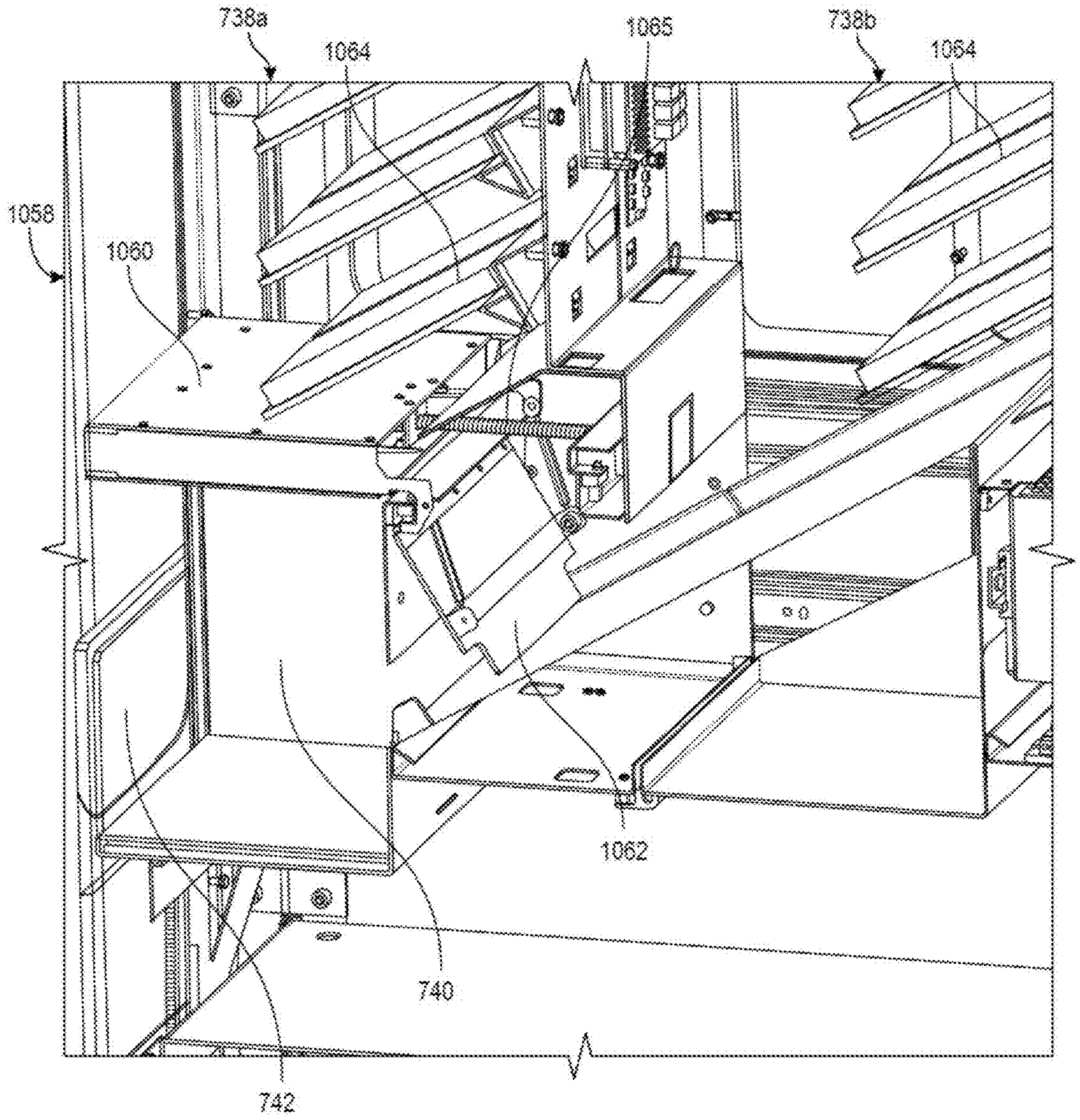
FIG. 10B is an enlarged isometric cross-sectional view of the vending kiosk portion of FIG. 9A, in which a front vending access door and a rear vending access door are in closed positions.
Figure 10C:
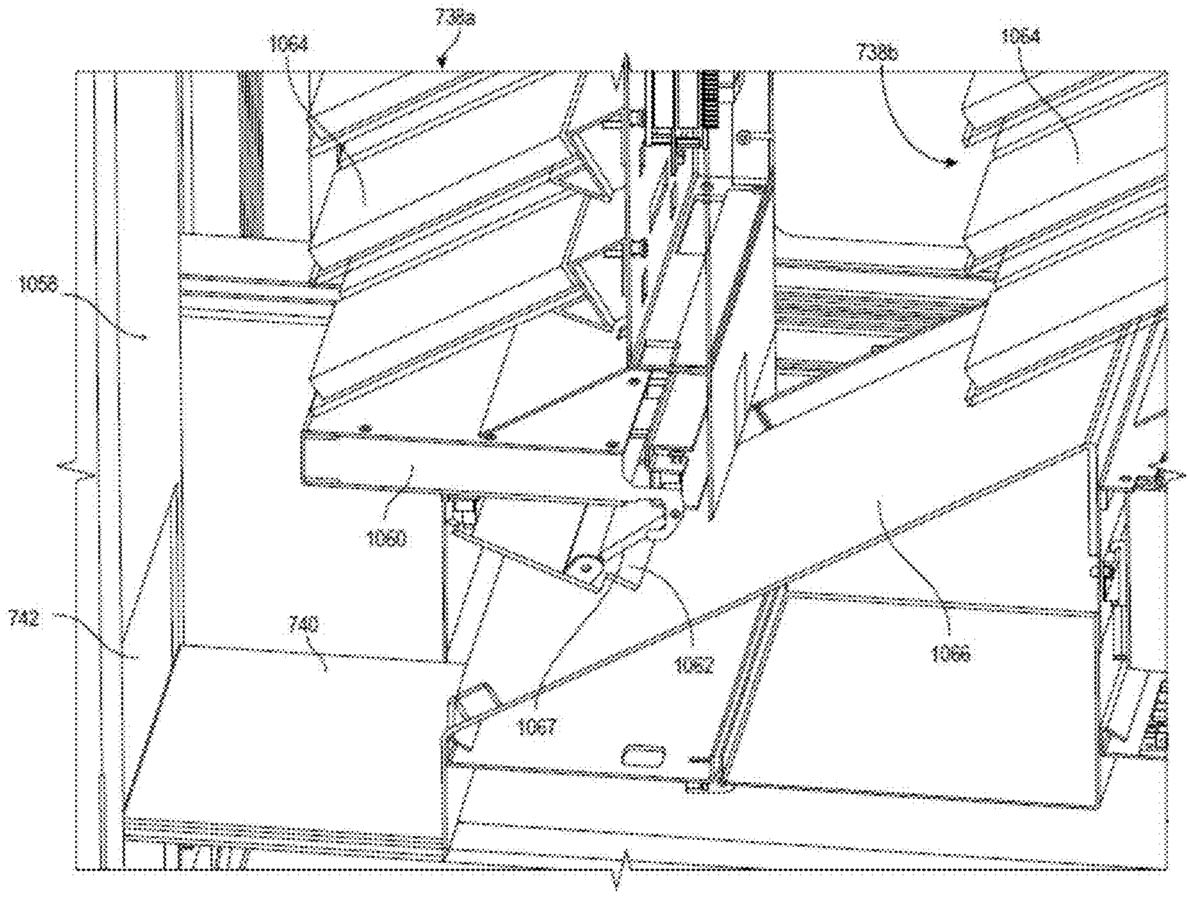
FIG. 10C is an enlarged isometric cross-sectional view of the vending kiosk portion of FIG. 9A, in which the front vending access door and the rear vending access door are in opened positions.

FIG. 10B is an enlarged isometric cross-sectional view of the access assembly 1058 wherein each of the doors 742, 1060, 1062 are in the closed position. In this position, phones 1064 in both the first storage bay 738*a* and in the second storage bay 738*b* are inaccessible from the vending bay 740. More specifically, the first storage access door 1060 is configured to move along a screw drive shaft 1065 driven by an electric motor (not shown) between a closed position (FIG. 10B) and an opened position (FIG. 10C). In some embodiments, the second storage access door 1062 is mechanically-linked to the first storage access door 1060 such that the second storage access door 1062 opens and closes as the first storage access door 1062 opens and closes. In some embodiments, the second storage access door 1062 is operated independently from the first storage access door 1060. The vending access door 742 prevents access from outside the second kiosk portion 720 into the vending bay 740.

FIG. 10C is an enlarged isometric cross-sectional view of the access assembly 1058 wherein the vending access door 742 is in the closed position and each of the storage access doors 1060, 1062 are in the opened position. As illustrated, the first storage access door 1060 is drawn away from the front window 951 to allow one or more phones 1064 to drop into the vending bay 740 from the first storage bay 738*a*, as described in more detail below. The second storage access door 1062 can also tilt away from a ramp 1066 to create an opening to allow one or more phones 1064 to slide from the second storage bay 738*b* to the vending bay 740. For example, in some embodiments movement of the first storage access door 1060 away from the front window 951 can pull the second storage access door 1062 away from the ramp 1066 (e.g., via one or more linkages 1067 connecting the first storage access door 1060 to the second storage access door 1062).

Figure 10D:
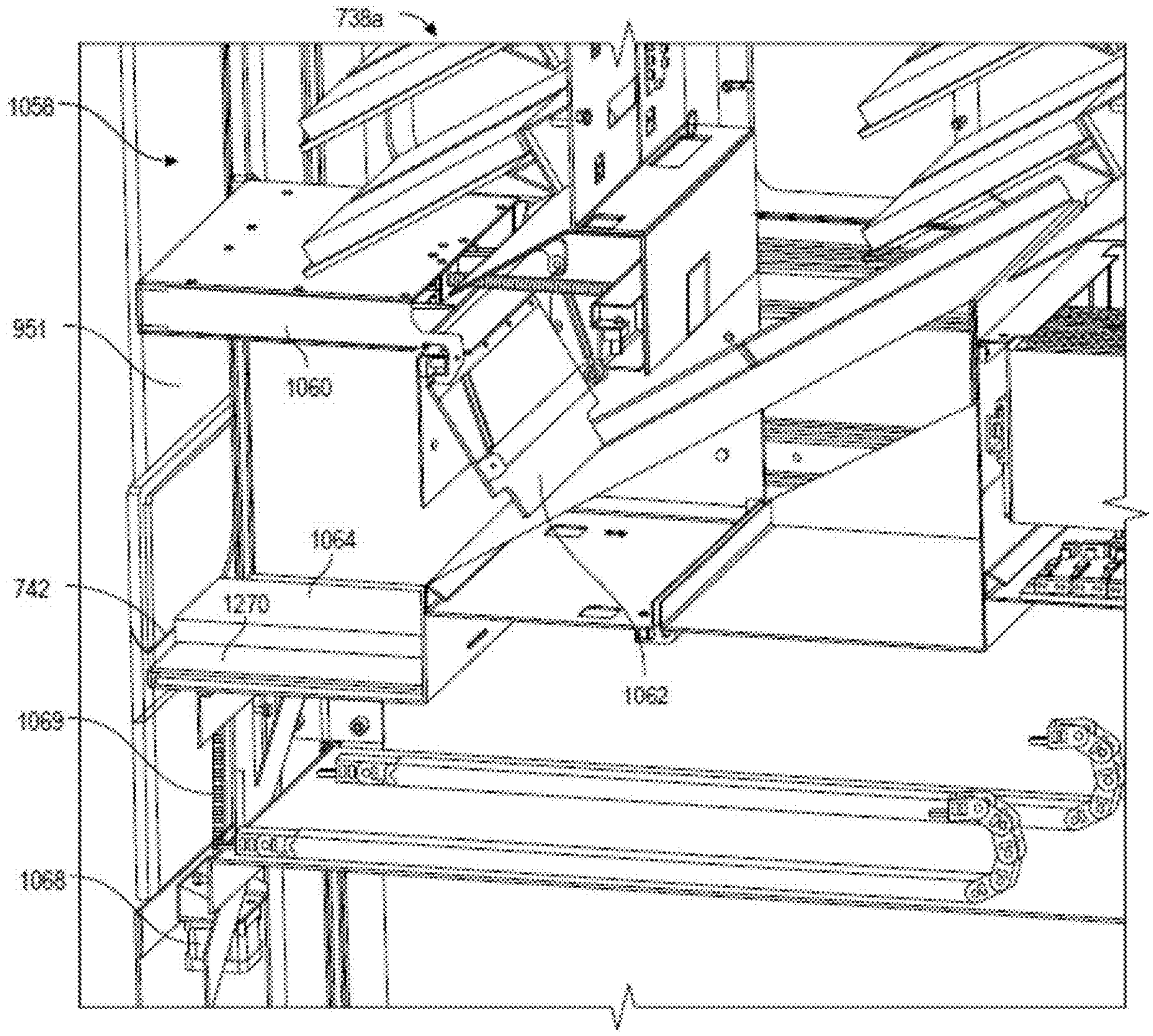
FIG. 10D is an enlarged isometric cross-sectional view of the vending kiosk portion of FIG. 9A, in which a front vending door is in an opened position.

FIG. 10D is an enlarged isometric cross-sectional view of the access assembly 1060 wherein the vending access door 742 has retracted downwardly into the opened position and the first and second storage access doors 1060, 1062 are in the closed positions. In this configuration, the user is able to reach into the vending bay 740 to retrieve a phone 1064 that previously transitioned from one of the storage bays 738*a,b* when the first and/or second storage access doors 1060, 1062 were in the opened configurations. In some embodiments, a base plate 1070 at a bottom portion of the vending bay 740 can include a weight and/or impact sensor to confirm that the phone 1064 is within the vending bay 740 (e.g., not stuck in one of the doors 1060, 1062 or completely outside the vending bay 740). Because the first and second storage access doors 1060, 1062 are in the closed configuration when the vending access door is opened, the user is unable to access the storage bays 738 when the vending access door 742 is opened.

The vending access door 742 can move between the closed (FIG. 10C) and opened (FIG. 10D) positions by moving along a screw drive shaft 1069 or other mechanical or electromechanical driving mechanism. The screw drive shaft 1069 can be operated by an electric motor 1068 or other power source. In some embodiments, the second kiosk portion 720 includes one or more position sensors configured to detect when one or more of the doors 1060, 1062 and/or 742 are in the fully-closed position, fully-opened positions, and/or positions in-between.

Figure 10E:
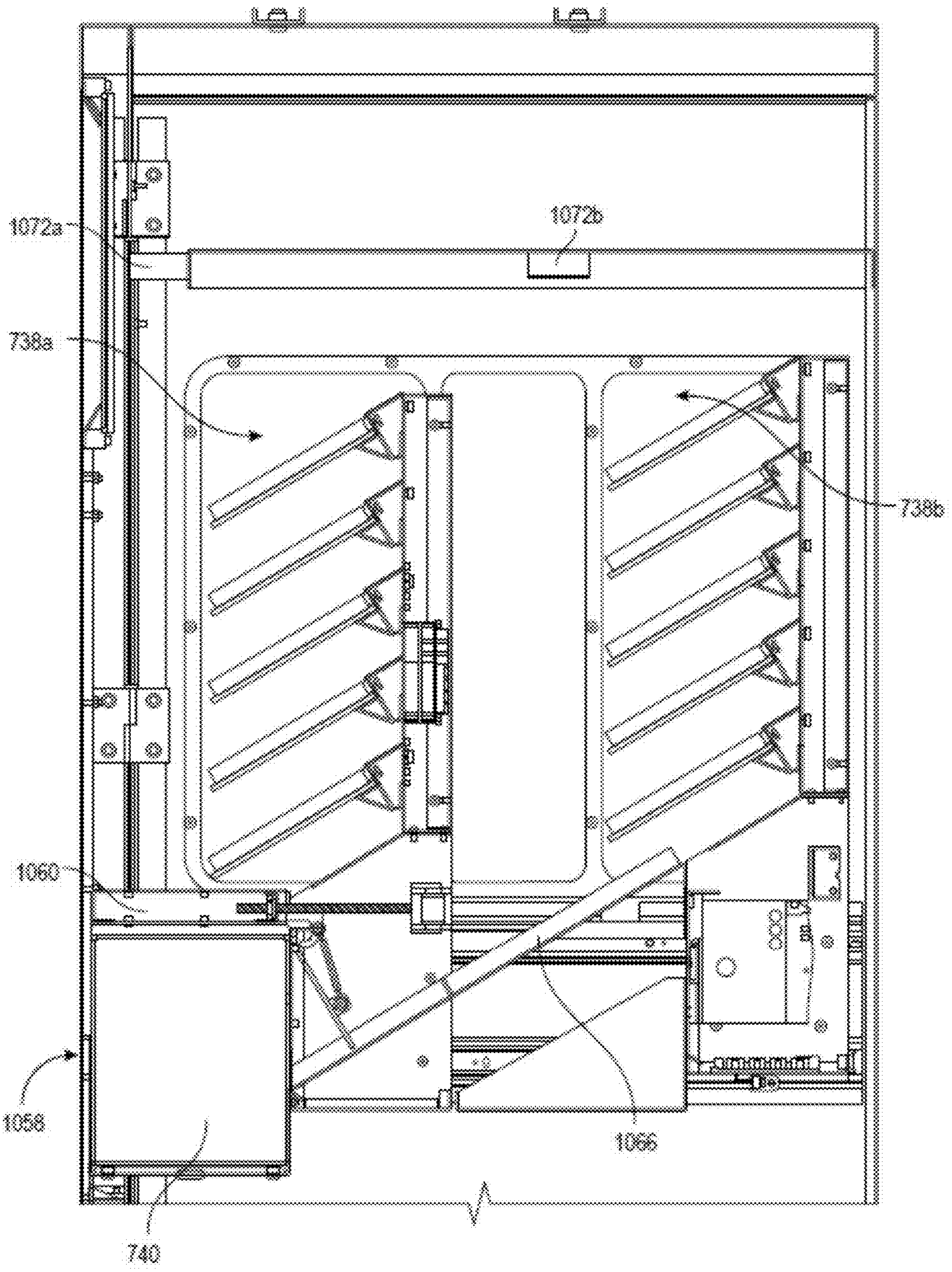
FIG. 10E is a right-side cross-sectional view of the vending kiosk portion of FIG. 9A.

FIG. 10E is a right-side partial cross-sectional view of the second kiosk portion 720 configured in accordance with embodiments of the present technology. As illustrated, the second kiosk portion 720 can include one or more internal cameras. For example, the kiosk portion 720 can include a first camera 1072*a* mounted above the vending bay 740 and/or the first storage bay 738*a*. The first camera 1072*a* can have a field of view that includes the includes both the first storage bay 738*a* and the vending bay 740. The first camera 1072*a* can be used (e.g., by a remote operator and/or automatically) to confirm that a phone vended from the first storage bay 738*a* makes it all the way into the vending bay 740 during a transaction. For example, the first camera 1072*a* can be used to observe (e.g., capture images) that a phone is stuck in the first storage bay 738*a*. The first camera 1072*a* can also be used to confirm the status of the first storage access door 1060 (e.g., whether the door 1060 is opened, closed, or partially-opened).

In some embodiments, the second kiosk portion 720 includes a second camera 1072*b* positioned above the second storage bay 738*b* and/or the ramp 1066. The second camera 1072*b* can have a field of view that includes both the ramp 1066 and the second storage bay 738*b*. In some embodiments, the second camera 1072*b* is used (e.g., by a remote operator and/or automatically) to detect whether a phone gets stuck on the ramp 1066 during operation. In some embodiments, the cameras 1072*a*, 1072*b* can be used to observe when a user attempts to tamper with the kiosk portion 720 (e.g., by inserting tools, their limbs, or other objects into the first kiosk portion 720 in an attempt to steal phones).

Figure 11A:
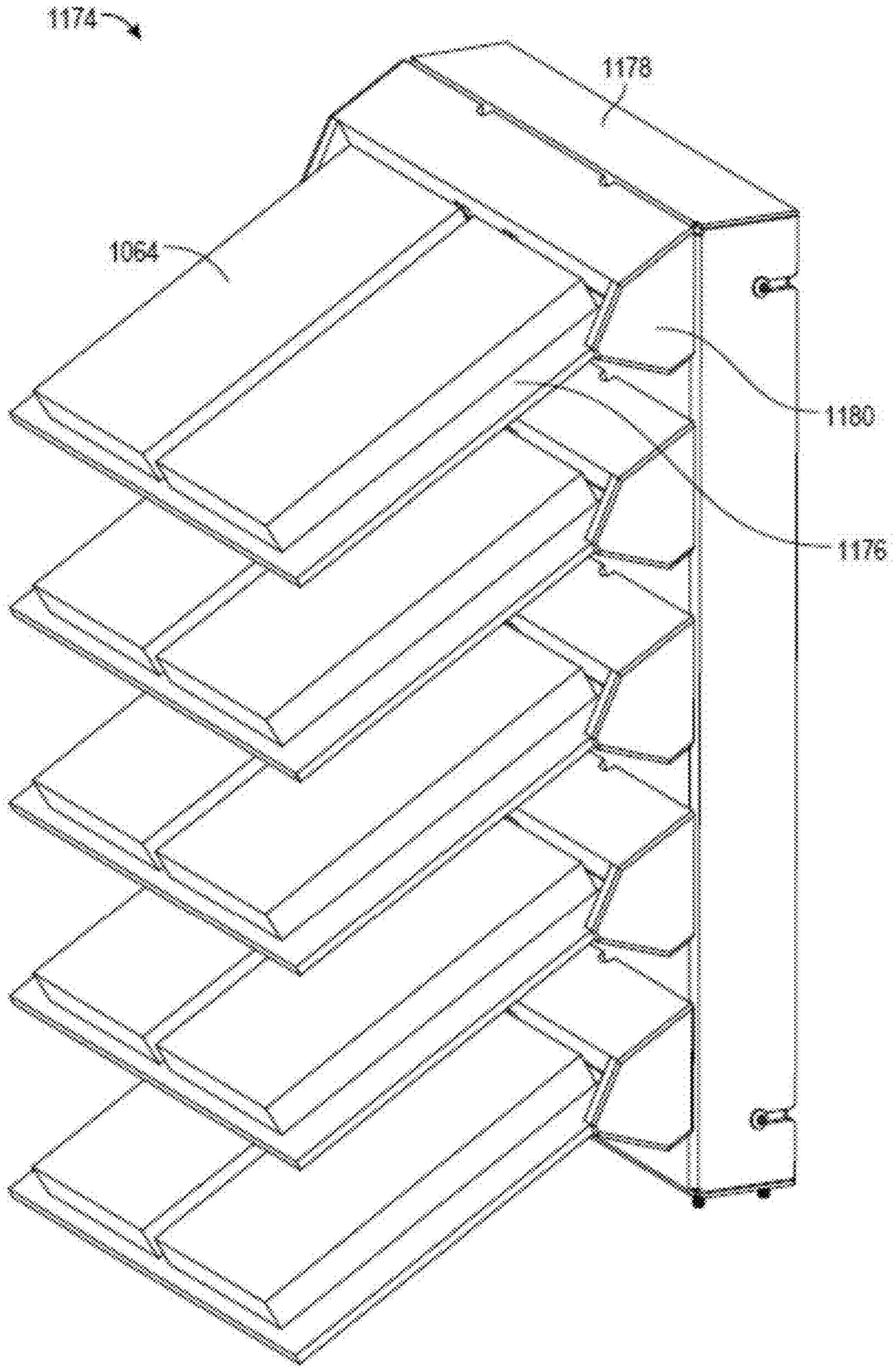
FIG. 11A is an isometric view of an electronic device vending apparatus of the vending kiosk portion of FIG. 9A, configured in accordance with embodiments of the present technology.

FIG. 11A is an isometric view of a vending apparatus 1174 for use with the second kiosk portion 720. The vending apparatus 1174 can be positioned in one or both of the first and second storage bays 738*a*, 738*b* (FIG. 10E). The vending apparatus 1174 can have one or more vending units 1175. The vending units 1175 can include one or more shelves 1176, each shelf 1176 configured to hold one or more phones 1064. The shelves 1176 can be connected to and extend from a storage system frame 1178. The frame 1178 can extend vertically or otherwise upright when positioned within a storage bay 738, while the shelves 1176 extend toward the front window 951, tilted downwardly. In some embodiments, one or more shelves 1176 extend toward one of the side windows of the kiosk portion 720.

In some embodiments, the vending units 1175 include release mechanisms 1180 configured to release phones 1064 from the vending apparatus 1174. For example, one or more of the shelves 1176 can connect to a release mechanism 1180 interposed between the shelve 1176 and the storage system frame 1178. As explained below with reference to FIG. 11B, the downward tilt of the shelves 1176 allows the phones 1064 to fall toward the vending bay 740 when released by the respective release mechanism.

Figure 11B:
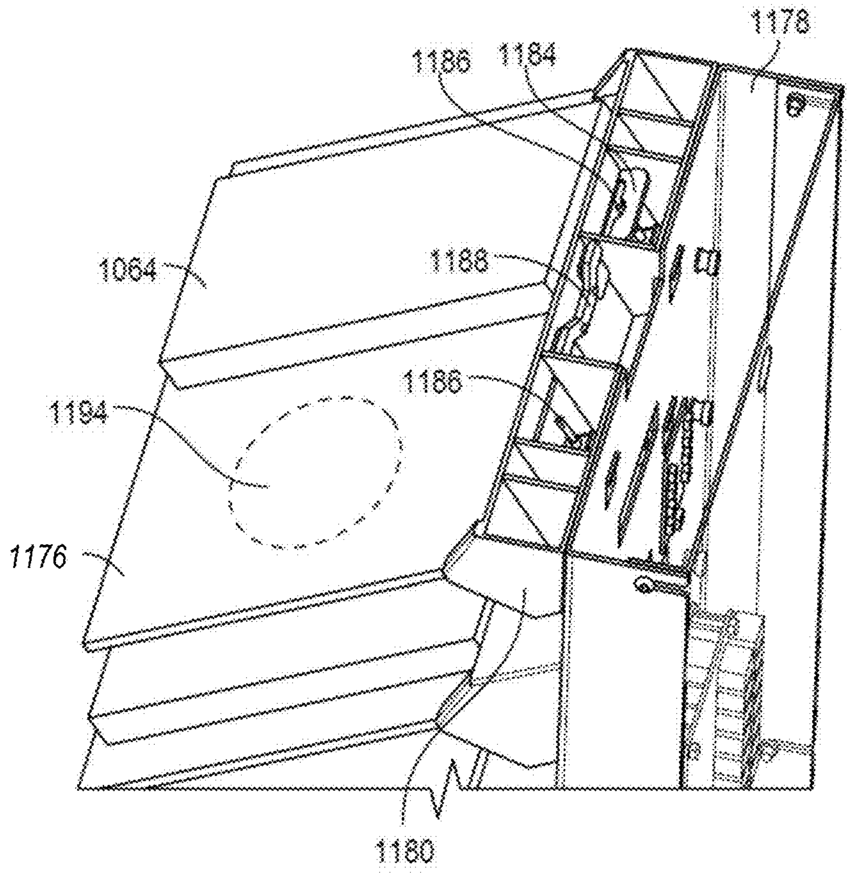
FIG. 11B is an enlarged top isometric view of the electronic device vending apparatus of FIG. 11A.

FIG. 11B is an enlarged upper isometric view of the vending apparatus 1174 with the top surface of the storage system frame 1178 removed in order to illustrate the interior of the frame 1178. The vending apparatus 1174 can include one or retention mechanisms configured to retain phones on the shelves 1176. For example, in some embodiments the frame 1178 and/or the release mechanism 1180 can include a solenoid 1282 having a pin or post 1186 configured to engage a tab 1184 on the packaging of the phone 1064 to retain the phone 1064 on the shelf 1176. In some embodiments, the post 1186 can be configured to extend through an aperture (e.g., a round hole) in the tab 1184 to engage the tab 1184. When the solenoid 1282 lowers (e.g., retracts) the post 1186, the post 1186 disengages from the tab 1184 and allows the phone 1064 to slide off of the shelf 1176 toward the vending bay 740 (FIG. 10E).

The vending apparatus 1174 can include one or more sensors configured to determine whether the phone 1064 fully releases from the vending apparatus 1174. For example, the storage system frame 1178 and/or the release mechanism 1180 can include a proximity sensor 1188 (e.g., an optical sensor and/or a motion sensor) configured to detect when the phone 1064 releases from the vending apparatus 1174 and slides off the shelf 1176.

Figure 11C:
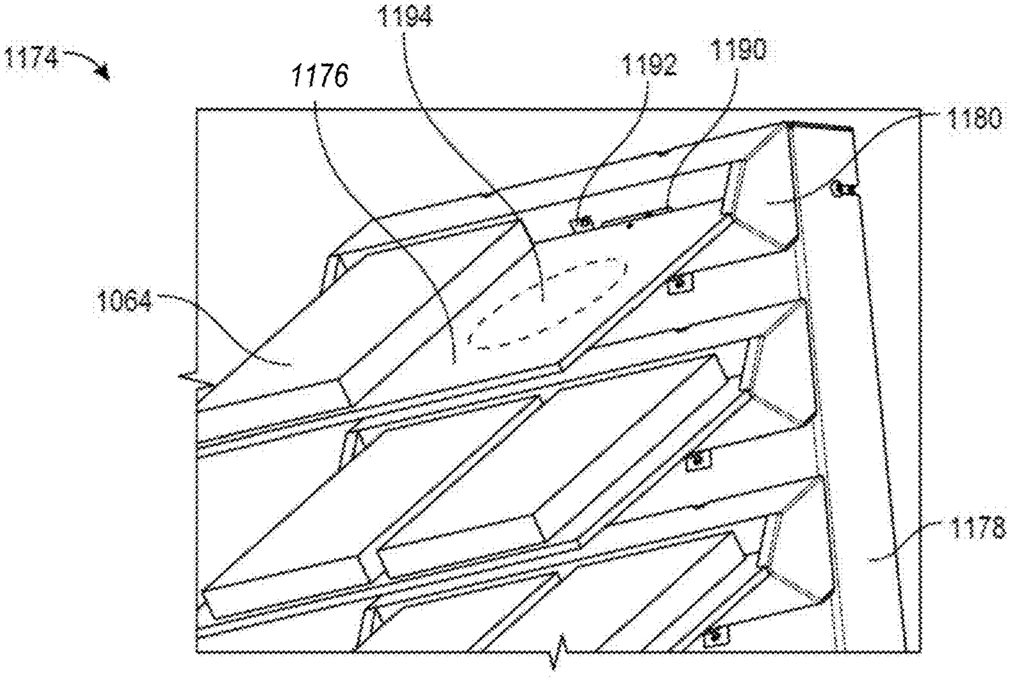
FIG. 11C is an enlarged front isometric view of the electronic device vending apparatus of FIG. 11A.

FIG. 11C is an enlarged front isometric view of the vending apparatus 1174. As illustrated, the release mechanism 1180 can include slots 1190 configured to receive the tabs 1184 of the phones 1064. The release mechanism 1180 can also include sensor apertures 1192 through which the proximity sensors 1188 can view and/or sense the phones 1064.

Referring to FIGS. 11B-11C, in some embodiments the vending apparatus 1174 can further include wireless charging points 1194 positioned in, on, or below the shelves 1176 (e.g., in close proximity to the phone 1064 positioned on the corresponding shelf 1176). The wireless charging points 1194 can be used to maintain charge on the phones 1064 positioned on the shelves 1176. In some embodiments, the wireless charging points can be used to transfer data to the phones 1064 while positioned on the shelves 1176. In some embodiments, the wireless charging points 1194 are activated to charge a phone once the phone is purchased.

In some embodiments, the wireless charging points 1194 can be, for example, "Qi wireless chargers" that function in accordance with the Qi open interface standard that defines wireless power transfer using inductive charging over distances of up to, e.g., about 1.6 inches. In operation, the wireless charging point 1194 can provide a quick charge to the phone 1064 if it is placed on the shelf 1176 without power. Additionally, as described in greater detail below, in operation the wireless charging point 1194 receives certain information about the mobile phone (e.g., make, model, a unique 32-bit identifier associated with the phone, Qi standard, etc.) as part of the charging process. This information can be transmitted to the kiosk processor and used to, for example, identify the correct electrical connector (e.g., a USB-C or Lightning connector) to present to the user on the shelf 1176. This information can also be used to determine the appropriate User Interface (UI) flow/instructions to display to the user via the display screen 716 for the phone purchase process. Additionally, by identifying the unique ID of the phone 1064 and monitoring the device ID during the kiosk transaction, the wireless charging point 1194 enables the kiosk 700 to determine if the user attempts to switch the phone 1064 with another mobile phone (e.g., another mobile phone of the same model but of lesser value) at any time during the transaction. If so, the kiosk 700 can stop the transaction, display a warning to the user, and/or take other steps to prevent the user from committing fraud by pricing one phone but actually selling the kiosk a different phone of, e.g., lesser value.

In some embodiments, the wireless charging point 1194 can be used to evaluate the charging circuit of the phone 1064. For example, in some embodiments, the kiosk 700 can measure the amount of charge current that the charging circuit draws (via, e.g., the wireless charging point 1194 and/or the electrical connector), and the kiosk 100 can use the corresponding current measurement signal to determine whether the charging circuit is functional or damaged. In some embodiments, the kiosk 700 can perform the electrical analysis using one or more of the methods and/or systems described in detail in the patents and patent applications identified herein and incorporated herein by reference in their entireties.

In some embodiments, the second kiosk portion 720 does not include any user interface structures or functions. In some such embodiments, all transaction commands, user inputs, etc. are input via the user interface of the first kiosk portion 710 and/or via a mobile application on the user's phone (e.g., as described below for routine 1600). In some embodiments, the overall sequence of events (independent of hardware) for a buy/sell transaction using the kiosk 700 can be the same as, or similar to that of the kiosks 100, 200 as described above and below.

Figure 12:
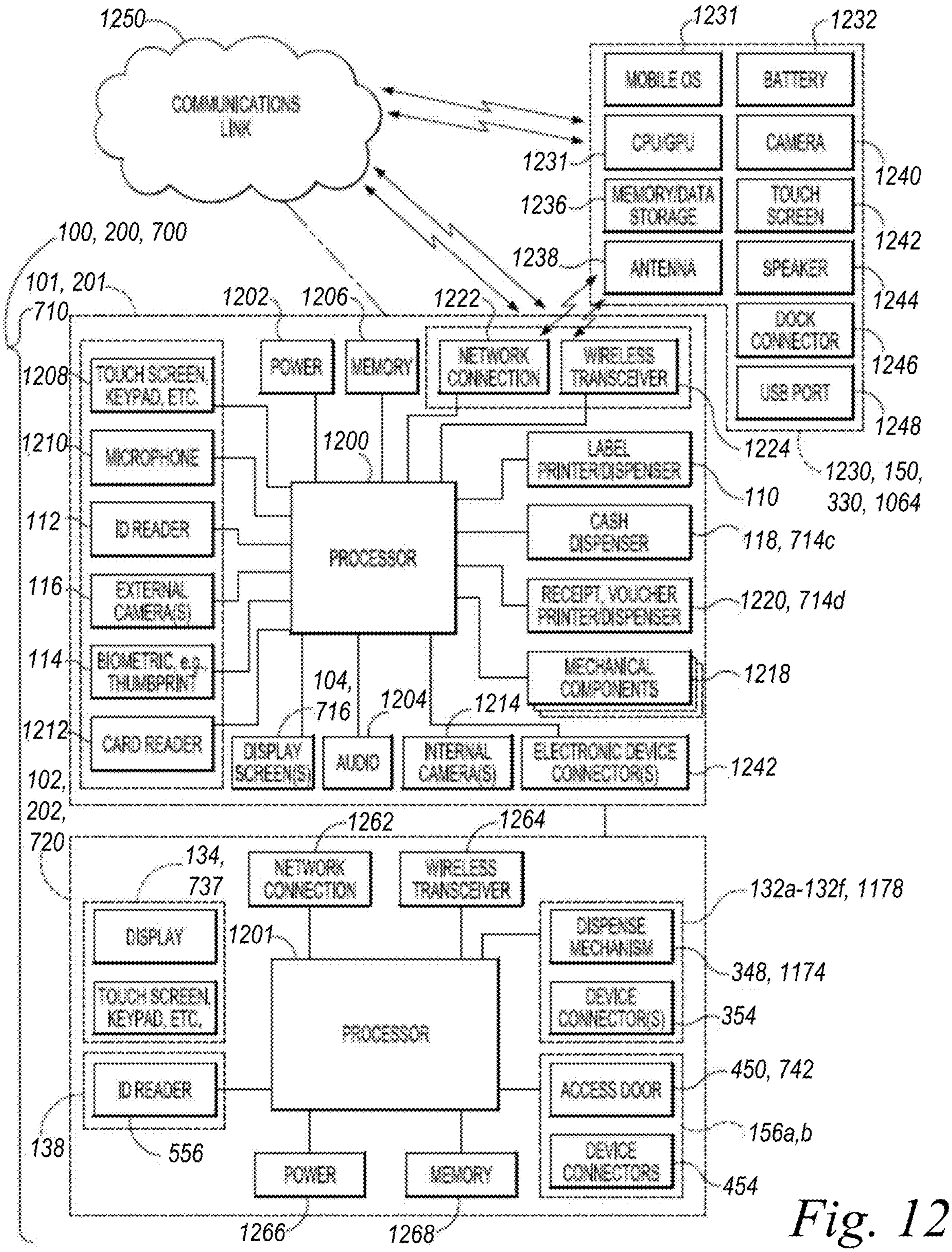
FIG. 12 is a schematic diagram illustrating various components associated with the kiosk systems of FIGS. 1A, 2 and 7 configured in accordance with embodiments of the present technology.

FIG. 12 provides a schematic representation of an architecture of the kiosks 100, 200, 700 configured in accordance with embodiments of the present technology. In the illustrated embodiment, the first kiosk portion 101, 201, 710 includes a suitable processor or central processing unit (CPU) 1200 that controls operation of the first kiosk portion 101, 201, 710 as described above and below in accordance with computer-readable instructions (e.g., non-transitory computer-readable instructions) stored on system memory 1206. The CPU 1200 may be any logic processing unit, such as one or more CPUs, digital signal processors (DSPs), application-specific integrated circuits (ASICs), etc. The CPU 1200 may be a single processing unit or multiple processing units in an electronic device or distributed across multiple devices. The CPU 1200 is connected to the memory 1206 and may be coupled to other hardware devices, for example, with the use of a bus (e.g., a PCI Express or Serial ATA bus). The CPU 1200 can include, by way of example, a standard personal computer (PC) (e.g., a DELL® OptiPlex® 7010 PC) or other type of embedded computer running any suitable operating system, such as Windows®, Linux®, Android™, iOS®, or an embedded real-time operating system. In some embodiments, the CPU 1200 can be a small form factor PC with integrated hard disk drive (HDD) or solid-state drive (SSD) and universal serial bus (USB) or other ports to communicate with the other components of the kiosk portion 101, 201, 710. In other embodiments, the CPU 1200 can include a microprocessor with a standalone motherboard that interfaces with a separate HDD. The memory 1206 can include read-only memory (ROM) and random access memory (RAM) or other storage devices, such as disk drives or SSDs, that store the executable applications, test software, databases and other software required to, for example, control kiosk components, process electronic device information and data (to, e.g., evaluate device make, model, condition, pricing, etc.), communicate and exchange data and information with remote computers and other devices, etc.

The CPU 1200 can provide information and instructions to kiosk users via the display screen 104, 716 and/or an audio system (e.g., a speaker) 1204. The CPU 1200 can also receive user inputs via, e.g., a touch screen 1208 associated with the display screen 104, 716, a keypad with physical keys, and/or a microphone 1210. Additionally, the CPU 1200 can receive personal identification and/or biometric information associated with users via the ID reader 112, 714*b*, one or more of the external cameras 116, 1017 and/or the fingerprint reader 114. In some embodiments, the CPU 1200 can also receive information (such as user identification and/or account information) via a card reader 1212 (e.g., a debit, credit, or loyalty card reader having, e.g., a suitable magnetic stripe reader, optical reader, etc.). The CPU 1200 can also control operation of the label dispenser 110 and systems for providing remuneration to users, such as the cash dispenser 118, 714*c* and/or a receipt or voucher printer and an associated dispenser 820, 714*d*.

As noted above, the first kiosk portion 101, 201, 710 additionally includes a number of electronic, optical and electromechanical devices for electrically, visually and/or physically analyzing electronic devices placed therein for recycling. Such systems can include one more internal cameras 1214, 860, 822 for visually inspecting electronic devices for, e.g., determining external dimensions and condition, and/or one or more of the electrical connectors 142 (e.g., USB connectors) and/or connectors associated with the connector carrier 885 for, e.g., powering up electronic devices and performing electronic analyses. As noted above, the cameras 1214 can be operably coupled to the upper and lower chambers 160 and 162 (and 40 and 820), and the connectors 142 can be movably and interchangeably carried by the carousel 140 (FIGS. 1B-1E) or by the connector carrier 885. The first kiosk portion 101, 201, 710 further includes a plurality of mechanical components that are electronically and/or electromechanically actuated for carrying out the various functions of the kiosk portion 101, 201, 710 during operation. The mechanical components 1218 can include, for example, the inspection area access door 106, 718 and one or more of the movable components (e.g. the inspection plate 144, the upper and lower chambers 160 and 162, etc.) operably disposed within the inspection area 108 (FIG. 1A), 50 (FIG. 8D). The kiosk portion 101, 201, 710 further includes power 1202, which can include battery power and/or facility power for operation of the various electrical components associated with kiosk operation.

In some embodiments, the first kiosk portion 101, 201, 710 further includes a network connection 1222 (e.g., a wired connection, such as an Ethernet port, cable modem, FireWire cable, Lightning connector, USB port, etc.) suitable for communication with, e.g., all manner of processing devices (including remote processing devices) via a communication link 1250, and a wireless transceiver 1224 (e.g., including a Wi-Fi access point; Bluetooth transceiver; near-field communication (NFC) device; wireless modem or cellular radio utilizing GSM, CDMA, 3G, 4G and/or 5G technologies; etc.) suitable for communication with, e.g., all manner of processing devices (including remote processing devices) via the communication link 1250 and/or directly via, e.g., a wireless peer-to-peer connection. For example, the wireless transceiver 1224 can facilitate wireless communication with electronic devices, such as an electronic device 1230 (and/or the mobile devices 150 and 330) either in the proximity of the first kiosk portion 101, 201, 710 or remote therefrom. In the illustrated embodiment, the electronic device 1230 is depicted as a handheld device, e.g., a mobile phone. In other embodiments, however, the electronic device 1230 can be other types of electronic devices including, for example, other handheld devices; PDAs; MP3 players; tablet, notebook and laptop computers; e-readers;

cameras; desktop computers; TVs; DVRs; game consoles; Google® Glass™; smartwatches; etc. By way of example only, in the illustrated embodiment the electronic device 1230 can include one or more features, applications and/or other elements commonly found in smartphones and other known mobile devices. For example, the electronic device 1230 can include a CPU and/or a graphics processing unit (GPU) 1234 for executing computer readable instructions stored on memory 1236. In addition, the electronic device 1230 can include an internal power source or battery 1232, a dock connector 1246, a USB port 1248, a camera 1240, and/or well-known input devices, including, for example, a touch screen 1242, a keypad, etc. In many embodiments, the electronic device 1230 can also include a speaker 1244 for two-way communication and audio playback. In addition to the foregoing features, the electronic device 1230 can include an operating system (OS) 1231 and/or a device wireless transceiver that may include one or more antennas 1238 for wirelessly communicating with, for example, other electronic devices, websites, and the first kiosk portion 101, 201, 710. Such communication can be performed via, e.g., the communication link 1250 (which can include the Internet, a public or private intranet, a local or extended Wi-Fi network, cell towers, the plain old telephone system (POTS), etc.), direct wireless communication, etc.

In the illustrated embodiment, the second kiosk portion 102, 202, 720 can include a suitable processor or CPU 1201 that controls operation of the second kiosk portion 102, 202, 720 as described above and below in accordance with computer readable instructions (e.g., non-transitory computer readable instructions) stored on system memory 1268. The CPU 1201 may be a single processing unit or multiple processing units in an electronic device or distributed across multiple devices. In some embodiments, the CPU 1201 and the CPU 1200 can be operably connected to each other to perform the various methods described herein, exchange data and information, share processing tasks, etc. In other embodiments, the processors 1201 and 1200 can be combined into a single processing device. The CPU 1201 can provide information and instructions to kiosk users via the display 134, 1237. The processor 1201 can also be operably connected to and control operation of the dispense mechanism 348, 1174 (e.g., the dispenser drive mechanism), the cable carriers 358, and the device connectors 354 in the vending units 132; 738, the data transfer system, device connectors 454, and the access door 450, 742, of the data transfer compartments 136; and the UV light source 556 in the cleaning compartment 138. In some embodiments, the second kiosk portion 102, 202, 720 can further include a network connection 1262 (e.g., a wired connection, such as an Ethernet port, cable modem, etc.) suitable for communication with e.g., the first kiosk portion 101, 201, 710 and all manner of other processing devices via, e.g., the communication link 1250. Additionally, the second kiosk portion 102, 202, 720 can further include a wireless transceiver 1264 (e.g., a Wi-Fi access point; Bluetooth transceiver; near-field communication (NFC) device, etc.) suitable for communication with, e.g., all manner of processing devices (including remote processing devices) via the communication link 1250 and/or directly via e.g., a wireless peer-to-peer connection.

Unless described otherwise, the construction and operation of the various components shown in FIG. 12 are of conventional design. As a result, such components need not be described in further detail herein, as they will be readily understood by those skilled in the relevant art. In other embodiments, the first kiosk portion 101, 201, 710 and/or the electronic device 1230 (150, 330, 1064) can include other components and/or features that may be different from those described above. In still further embodiments, the first kiosk portion 101, 201, 2010 and/or the electronic device 1230 (150, 330, 1064) can include more or fewer components and/or features similar to those described above.

Figure 13A:
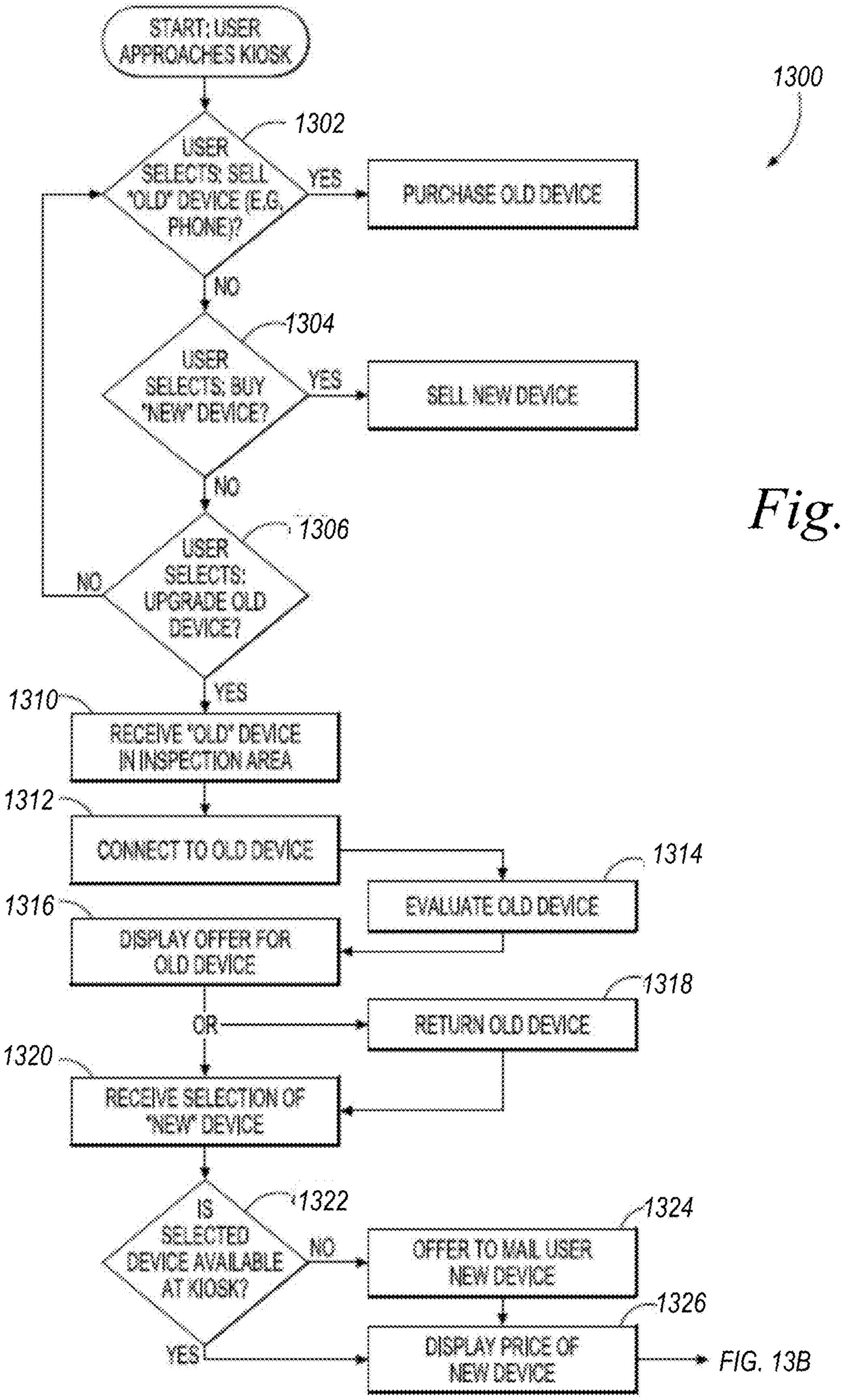
FIGS. 13A and 13B illustrate a flow routine for purchasing an electronic device from a user and selling another electronic device to the user in accordance with embodiments of the present technology.
Figure 13B:
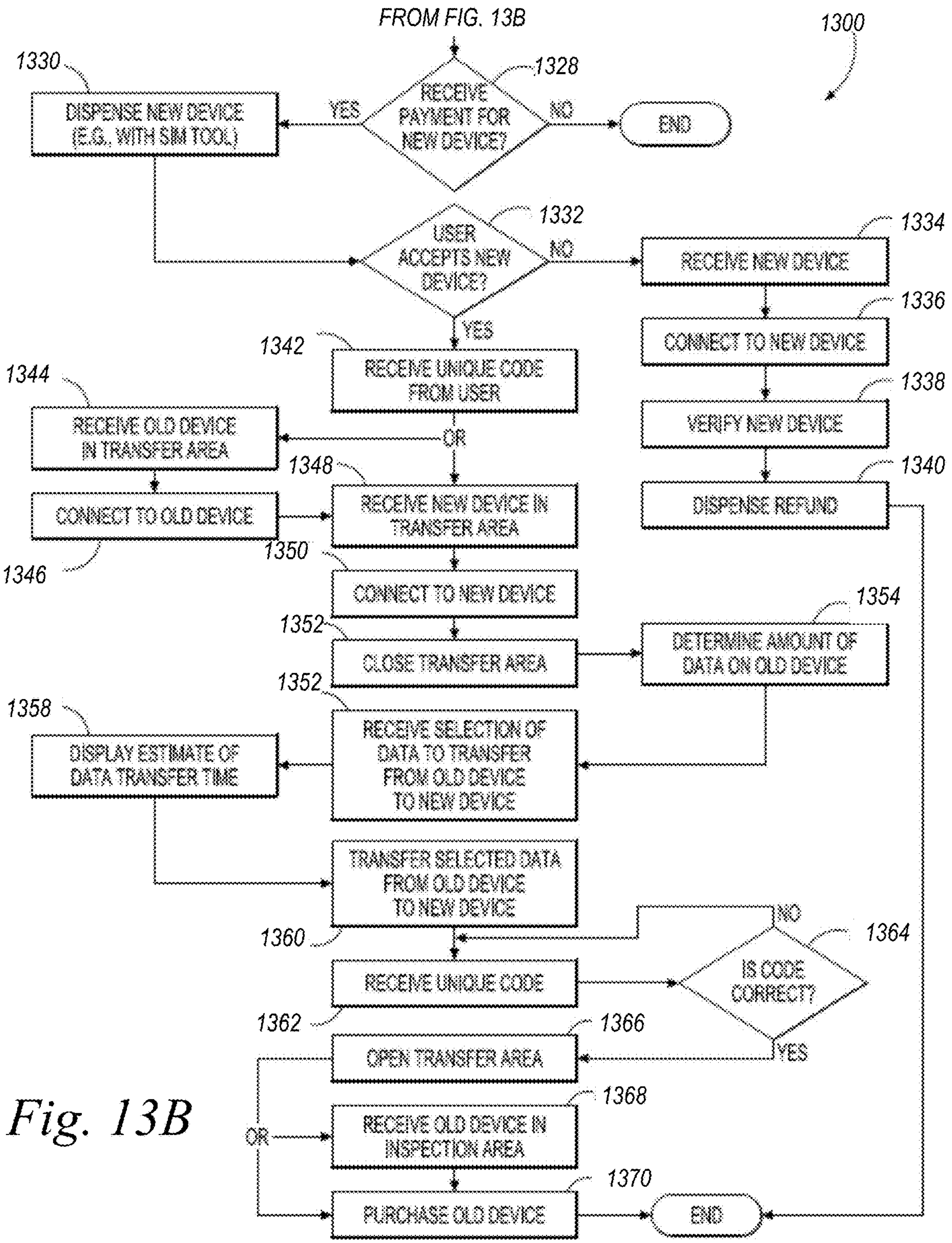

FIGS. 13A and 13B are flow diagrams of a routine 1300 for operating the kiosk 100, 200 in accordance with embodiments of the present technology. In some embodiments, all or portions of the routine 1300 can be performed by the processor 1200 and/or the processor 701 described above with reference to FIG. 12, in accordance with computer-readable instructions stored on the memory 706 and/or the memory 768. Referring first to FIG. 13A, the routine begins when a user approaches the kiosk and selects a desired transaction. For example, the user may approach the kiosk 100, 200 and indicate (via, e.g., interactions with the touch screen portion of the display screen 104) that the user wishes to sell an electronic device that the user currently owns (e.g., a mobile phone), and/or the user may indicate that they wish to purchase a new device.

In decision block 1302, the routine determines (via, e.g., user interactions with the touch screen portion of the display screen 104) if the user wishes to sell their old device. If so, then the first kiosk portion 101, 201 proceeds to receive, evaluate and purchase the old device from the user as described in detail above with reference to, e.g., FIGS. 1A-1E. If the user does not wish to just sell their old device, the routine proceeds to decision block 1304 and determines if the user wishes to just buy a new device. If so, the second kiosk portion 102, 202 can vend a selected mobile phone to the user as described in more detail below. If the user does not wish to only buy a new device, the routine proceeds to decision block 1306 to determine if the user instead wishes to upgrade an old device by selling the old device and purchasing a new device via the kiosk.

If the user does not select one of the available options, the routine returns to decision block 1302 and repeats. Conversely, if the user wishes to sell their current phone and purchase a new one, the routine proceeds to block 1310 and receives the old device from the user in the inspection area 108 of the first kiosk portion 101, 201. In block 1312, the kiosk establishes a digital connection to the old device via, e.g., a wireless connection or a wired cable connection described above, and then evaluates (e.g., electrically evaluates) the old device in block 1314. After the device has been evaluated for, e.g., make, model, functionality, and/or condition, etc., the routine proceeds to block 1316 and the kiosk displays an offer for the old device via, e.g., the display screen 104. If the user rejects the offer or otherwise indicates (via, e.g., interactions with the touch screen portion of the display screen 104) that they do not wish to continue with the transaction, the routine returns the old device to the user and the routine ends. In some embodiments, the kiosk functions associated with blocks 1310, 1312, 1314 and 1316 can be substantially equivalent to the corresponding kiosk functions described in detail above with reference to FIGS. 1A-1E.

In some embodiments, after the kiosk portion 101, 201 makes the user an offer for their old phone, the kiosk portion 101, 201 can also make a recommendation to the user as to which new phone the user should purchase. For example, if the first kiosk portion 101, 201 determines (e.g., using one or more of the internal cameras, a cable, and/or a wireless connection) that the old phone is a 32 GB black iPhone 7, the first kiosk portion 101, 201 might suggest that the use purchase a 32 GB black and gray iPhone 8 and/or an iphone 8 plus (or iPhone 10, 11, etc.) from the second kiosk portion 102, 202. Additionally, if the first kiosk portion 101, 201 determines that the user has, for example, 45 GB of photos and videos stored on their old device, the first kiosk portion 101, 201 could suggest to the user (via, e.g., the display screen 104) to purchase a new phone with 64 GB storage space, versus a phone with 512 GB. In some embodiments, after presenting a purchase offer to the user for the old device and receiving an indication (via, e.g., user interactions with the display screen 104) of acceptance or a desire to otherwise proceed with the transaction, the routine can proceed to block 1318 and return the old device to the user for further operations as described below. In other embodiments as described below, the first kiosk portion 101, 201 can retain the user's old device and proceed to block 1320.

In block 1320, the routine receives a selection from the user of a new device the user wishes to purchase from the second kiosk portion 102, 202. For example, the kiosk may present a list of available mobile phones and associated prices, specifications, etc. on the display 134, and the user can select a desired phone via the associated touch screen. Alternatively, the user may simply view the contents of the vending units 132 to determine if a desired make and model of phone is available, and if so, make an appropriate selection via the touch screen. Alternatively, in other embodiments the user can use their mobile phone or other web-enabled device to access, e.g., a website associated with the kiosks 100, 200 and check the inventory of mobile phones available at the kiosk 100, 200 and/or different kiosks in the network of kiosks. That way, the user can confirm that a particular kiosk 100, 200 has the phone they want before making a trip to the kiosk. In further embodiments, if a particular kiosk does not have a desired phone in inventory, the kiosk can refer the user (via, e.g., an appropriate message presented on the display 134) to the closest kiosk in the network that does have the desired phone.

In decision block 1322, the routine determines if the selected device is available in one of the vending units 132 (FIGS. 1A, 2 and 3). If so, the routine proceeds to block 1326. If not, the routine proceeds to block 1324 and offers (e.g., via the display 104 or 134) to mail the user the selected phone. If the user declines the offer to receive the new phone by mail, the routine ends. If not, the routine continues to block 1326. In block 1326 the routine displays the price of the new phone to the user via, e.g., the display 134 of the second kiosk portion 102, 202.

Turning next to FIG. 13B, in decision block 1328 the routine determines if the kiosk has received payment from the user for the new mobile phone. In some embodiments, for example, the user can pay for the new mobile phone via a cash acceptor and/or a credit/debit card acceptor on the first kiosk portion 101, 201 and/or the second kiosk portion 102, 202. If the kiosk is unable to confirm that payment for the new device has been received, the routine ends. Alternatively, if payment is confirmed the routine proceeds to block 1330 and the second kiosk portion 102, 202 dispenses the new mobile phone to the user via the corresponding vending unit 132. Alternatively, in some embodiments, in those instances in which the new phone was not available in one of the vending units 132 and the user elected to have the phone mailed or otherwise shipped to them, the user can input a mailing address (via, e.g., the touch screen portion of the display screen 104) in response to, e.g., prompts displayed on the display screen 134, and the new phone can be sent to the user from, e.g., a warehouse or other remote location. In such embodiments, the routine can end after implementing these steps.

After the new device has been dispensed to the user in block 1330, the user can remove it from its product package 340 (FIGS. 3 and 6) and inspect the device. By "new" device it should be understood that, in some embodiments the new device may be a brand-new device, and in other embodiments the new device may actually be a used device that was purchased from a previous owner or other source and refurbished or repaired for resale. Accordingly, the user may wish to inspect the new device to make sure that they find it acceptable. In decision block 1332, the routine determines if the user accepts the new device via, e.g., an appropriate user input via the touch screen on the display 134. If not, the routine proceeds to block 1334 and receives the new device back from the user. For example, if the user decides not to accept the new device, the user can place the new device in the inspection area 108 of the first kiosk portion 101, 201 and connect it to the first kiosk portion 101, 201 via a cable connector or suitable wireless connection, as shown in block 1336. In block 1338, once the returned device has been suitably connected, the routine verifies that the new returned device is in fact the same device that was previously dispensed to the user. If so, the routine proceeds to block 1340 and dispenses a refund to the user. It should be understood that "dispensing" a refund includes initiating a credit or other form of electronic payment and does not necessarily require that a tangible form of payment (e.g., cash or a redeemable voucher) be dispensed from the kiosk. After block 1340, the routine ends.

Returning to decision block 1332, if the user accepts the new device the routine proceeds to block 1342 and receives a unique code from the user (via, e.g., the touch screen portion of the display 134). The unique code can be, for example, a unique numerical, alphanumerical, and/or other code, e.g., a four-digit code, that the user provides the kiosk for subsequent use by the user to identify themselves to the kiosk to, for example, access the data transfer compartment 136 and retrieve their new phone. After block 1342, the routine can proceed in one of two ways. In a first embodiment, if the old phone was returned to the user in block 1318 after it was evaluated and priced by the first kiosk portion 101, 201, then the routine can proceed to block 1344 and receive the old phone from the user in one of the data transfer compartments 136 of the second kiosk portion 102, 202. In block 1346, after placing the old mobile phone in the transfer compartment 136, the user connects the old phone to the appropriate cable connector 454, as shown in FIG. 4. In block 1348, the user also places the new phone in the data transfer compartment 136, and in block 1350 the user connects the new phone to an appropriate connector 454. In a second embodiment, if the user's old phone was retained in the inspection area 108 of the first kiosk portion 101, 201 (and connected to the appropriate connector 142) after block 1316, the routine proceeds directly from block 1342 to block 1348 and receives only the new device in the data transfer compartment 136. In block 1350, the user connects the new device to the appropriate cable connector 454 as shown in FIG. 4. After block 1350, the routine proceeds to block 1352 and closes and locks the door 450 on the data transfer compartment 136.

In block 1354, the routine determines the amount of data stored on the old device. The amount of data can be determined by the first kiosk portion 101, 201 when the old device is in the inspection area 108, or by the second kiosk portion 102, 202 if the old device has been positioned in the data transfer compartment 136. The type and size of this data can be communicated to the user via the display 134, and in block 1356 the user can select which of this data (e.g., contacts, photos, mobile apps, settings, etc.) the user wishes to have transferred from their old device to their new device. Once the kiosk 100, 200 receives this information, the kiosk can determine or estimate the amount of time it will take to transfer the data and display the time estimate to the user in block 1358. For example, if it will take approximately two hours for the kiosk to complete the data transfer, the kiosk can inform the user of this and suggest that the user instead backup the desired files from their old phone at home, and then return to the kiosk when their old phone is clean to avoid having to wait. If instead the user elects to wait while the data is transferred, the kiosk can request further information from the user. For example, in some embodiments the kiosk can request that the user input via, e.g., the display 134 at least one of a phone number or an email address of a device (e.g., a mobile phone) that is accessible to the user during the data transfer. While the user waits, the routine proceeds to block 1360 and transfers the selected data from the old device to the new device via the respective kiosk connections. Once the data transfer is complete, the kiosk 100, 200 can notify the user by either displaying a message on the display 134, and/or by sending the user a text, email, and/or other electronic message via, e-mail, text, etc. to the mobile device of a friend or another processing device of the user (e.g., via the phone number or email address provided by the user) to inform the user that the data transfer is complete.

As described above, the kiosk 100, 200 can transfer data from an old device to a new device in at least two different ways. In one method the user retrieves their old device from the first kiosk portion 101, 102 after it has been evaluated and priced, and then places the old device in the data transfer compartment 136 along with the new device and connects the two devices as described above. The data transfer between the two devices then occurs via the data transfer compartment 136 as described above. In the other method described above, the first kiosk portion 101, 201 retains the old device and the data transfer occurs between the old device in the inspection area 108 of the first kiosk portion 101, 201 and the new device positioned in the data transfer compartment 136 of the second kiosk portion 102, 202. In yet other embodiments, the data transfer from the old device to the new device can occur while the new device is still held within the corresponding vending unit 132 and connected to the cable 356 (FIGS. 3 and 6) and the old phone is contained in, for example, the inspection area 108 of the first kiosk portion 101, 201 and connected to the appropriate electrical connector 142. Of course, in this embodiment the new device would not be dispensed to the user as shown in block 1330 until after the data transfer has been completed.

In some embodiments, the first kiosk portion 101, 201 can inform the user (via, e.g., the display 104) how long it will take to transfer their data from the old phone to a new phone before the user purchases a new phone from the second kiosk portion 102, 202. For example, returning to block 1314, when the old phone is in the inspection area 108 and connected to the first kiosk portion 101, 201 (via, e.g., a wireless connection or a wired connector), the first kiosk portion 101, 201 can query the old phone for the types and sizes of data stored thereon, and display the required backup times to the user via the display 104. By way of example only, in some embodiments the kiosk can display this information via, e.g., the display 104, as follows:

a. Backup Contacts: 3 min
b. Backup Photos: 1:15 hours
c. Backup Videos: 1:21 hours
d. Total Backup Time: 2:39 hours By informing the user of backup times in this manner before they buy a new phone, the user can decide what data to transfer and whether they have the time to wait at the kiosk 100, 200 for the backup to be performed. If not, the user can go home, to their office, etc. and backup the data themselves, and then return to the kiosk and purchase a new phone without having to wait to have their data backed up. This can prevent the user from being caught off guard if they were expecting to purchase a new phone and then be on their way, only to learn that they have to wait (e.g., for an hour or more) for their data to transfer after they purchased the new phone.

In another embodiment, to save time the user may opt to do a partial backup of the data on their old phone (e.g., one or more of the smaller files, such as contacts) while at the kiosk 100, 200, and then backup larger files (e.g., photos, videos, etc.) at home or at another location later. Alternatively, in those embodiments in which the user is selling their old phone at the kiosk 100, 200, the user may opt to backup larger files at home or at another location prior to visiting the kiosk, and then backup other data (e.g., one or more of the smaller files) while at the kiosk 100, 200. In these embodiments, the smaller files or file (e.g., contacts) from the old phone are pushed to a database (e.g., a remote database, such as Cloud storage, hard disk, etc.) by, e.g., the first kiosk portion 101, 201 when, e.g., the old phone is being evaluated, or by the second kiosk portion 102, 202 via one of the data transfer compartments 136. The user then purchases a new phone via the second kiosk portion 102, 202, and, in some embodiments, runs a pre-loaded application program ("app") installed on the new phone to automatically retrieve the contacts or other "small" data from the database and load it onto the new phone.

Figure 15A:
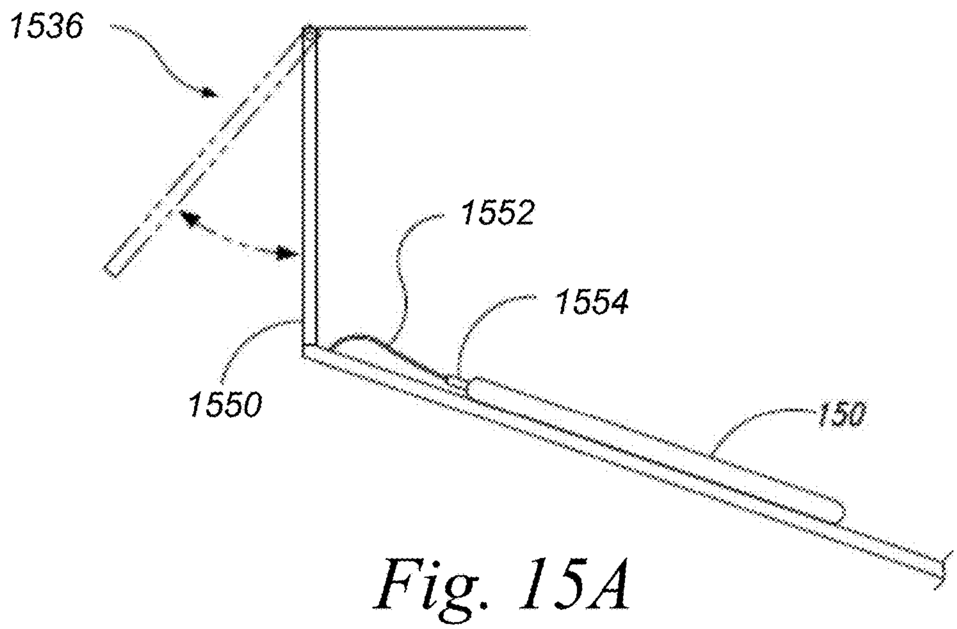
FIGS. 15A and 15B are partially schematic side views of an electronic device data transfer compartment configured in accordance with embodiments of the present technology.
Figure 15B:
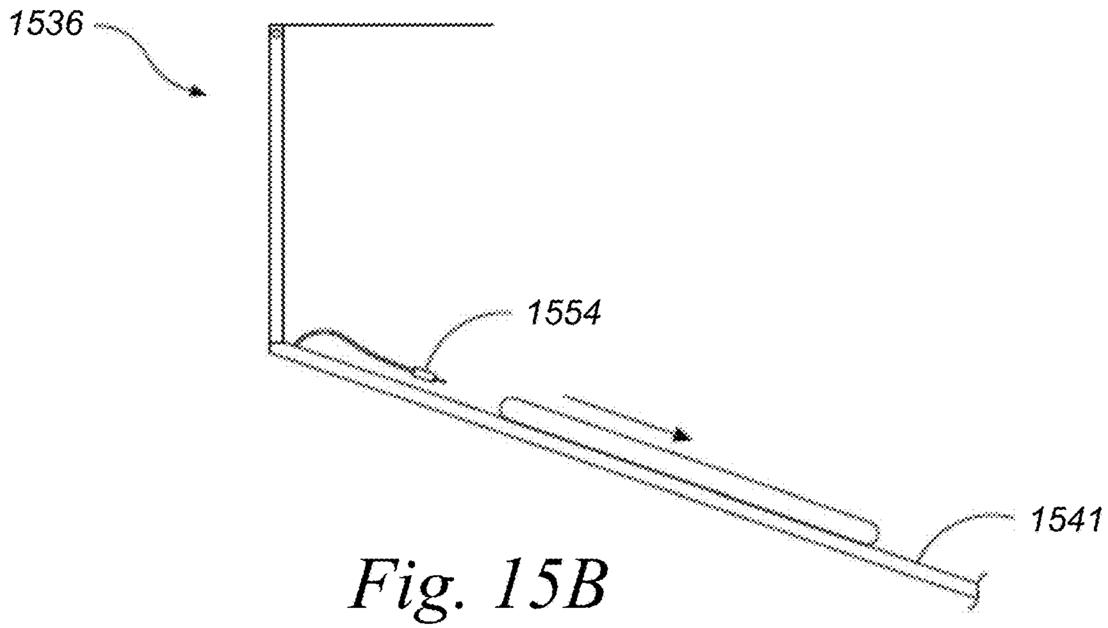
Figure 15C:
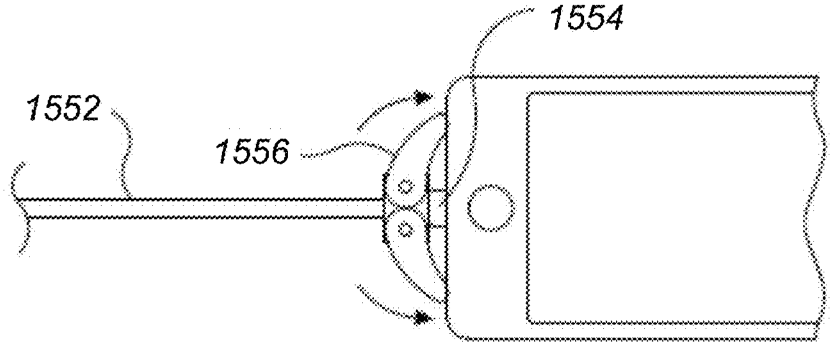
FIG. 15C is a partially schematic top view of an electrical connector disengagement device configured in accordance with embodiments of the present technology.

Turning momentarily to FIGS. 15A and 15B, these figures are partially schematic side views of a data transfer compartment (or "locker") 1536 configured in accordance with some embodiments of the present technology, and FIG. 15C is a partially schematic top view of an electrical connector disengagement device 1556 configured in accordance with a further embodiment of the present technology. In some embodiments, the kiosk 100, 200 can include the data transfer compartment 1536 for transferring large data files from an old phone (e.g., a phone that is purchased via the first kiosk portion 101, 201) to a new phone in an efficient manner. The data transfer compartment 1536 can include a plurality of cables 1552 with corresponding connectors 1554 (e.g., at least one connector for each type of phone connector receptacle) and/or wireless connection devices for connecting the old phone (e.g., the mobile phone 150) to the second kiosk portion 102, 202. (In other embodiments, there can be multiple such data transfer compartments 1536, each having a connector or connectors 1554 configured for one type of phone/connector receptacle.) The user connects the appropriate cable connector 1554 to the old phone 150, places the old phone 150 in the corresponding data transfer compartment 1536, and closes a door 1550 which is on the front side of the second kiosk portion 102, 202 and accessible to the user. The user can then leave the kiosk 100, 200, and the second kiosk portion 102, 202 will push the larger data files (e.g., the files other than contacts) to the database. When the backup to the database is complete, the old phone 150 can be left in the transfer compartment 1536 until it is retrieved by kiosk service personnel (e.g., if the user sold the phone via the first kiosk portion 101, 201) or, in some embodiments, by the user.

Alternatively, in other embodiments the data transfer compartment 1536 can be configured to automatically transfer old phones into an associated storage bin after the data transfer, so that the compartment can be used by another customer as soon as the data transfer is complete. For example, as shown in FIGS. 15B and 15C, in some embodiments a floor portion 1541 of each data transfer compartment 1536 can be sloped to form a chute, and an end portion of the cable 1552 can include a disengagement device 1556 that includes two pivotable pushing elements that are, e.g., electrically or electromechanically actuated. After the data transfer is complete, the device 1556 can be commanded to pivot the pushing elements inwardly, thereby pushing the phone 150 away from the connector 1554 and disconnecting the connector 1554 therefrom. This action also pushes the old phone 150 toward the rear of the compartment so that it can slide down the chute as shown in FIG. 15B and into a storage bin (not shown). After the larger data files have been backed up in the database, the user can then be sent a text, email, or other electronic message (to, e.g., a phone number and/or email address input by the user via a kiosk user interface) informing them that they can now, e.g., run the preloaded app again to download the larger files to their new phone.

Returning to FIG. 13B, regardless of the particular way that data is transferred from the old device to the new device, after the data transfer in block 1360 the routine proceeds to block 1362 and receives a unique code from the user (via, e.g., the display 134). The unique code can be the unique code that the user defined earlier to provide them with secure access to their new phone in the data transfer compartment 136. In decision block 1364, the routine determines if the code is correct. If not, the routine keeps the data transfer compartment 136 locked and returns to block 1362 until it receives the correct code. If the routine never receives the correct code after a preset number of tries, the kiosk can display an appropriate message to the user (via, e.g., the display 134) providing, for example, a phone number the user can call to resolve the issue (and/or an email address), and the routine ends. Alternatively, if the code is correct the routine proceeds to block 1366 and opens the door 450 to the data transfer compartment 136. The user can then retrieve the new device and, in those embodiments in which the old device was also placed in the data transfer compartment 136, the old device from the data transfer compartment 136.

If the old device was positioned in the data transfer compartment 136 for the data transfer described above, then the kiosk instructs the user to return the old device to the inspection area 108 of the first kiosk portion 101, 201 (e.g., in those embodiments in which the user desires to sell the old device). In block 1368, the routine receives the old device from the user in the inspection area 108. Conversely, if the user left the old device in the inspection area 108 of the first kiosk portion 101, 201 for the data transfer, then the routine bypasses block 1368. Either way, in block 1370 the first kiosk portion 101, 201 completes the purchase of the old device in the manner described above and provides payment to the user. In some embodiments, it should be noted that the kiosk 100, 200 can apply all or a portion of the proceeds from the sale of the user's old device as a credit toward the purchase price of the new device. After block 1370, the routine ends.

In some embodiments, the kiosk 100, 200 can activate new phones for wireless carrier service before or immediately after the second kiosk portion 102, 202 dispenses the phone to a user (e.g., a purchaser). For example, the user can optionally select a carrier and/or data plan and/or provide other necessary information (via, e.g., interactions with the display 134) when user selects a new phone for purchase from the second kiosk portion 102, 202 (see, e.g., block 1320 in FIG. 8A discussed above). The kiosk 100 can then communicate with the selected carrier and/or take other steps as needed (or, the kiosk operator may be the carrier) to activate the selected phone service.

Figure 14:
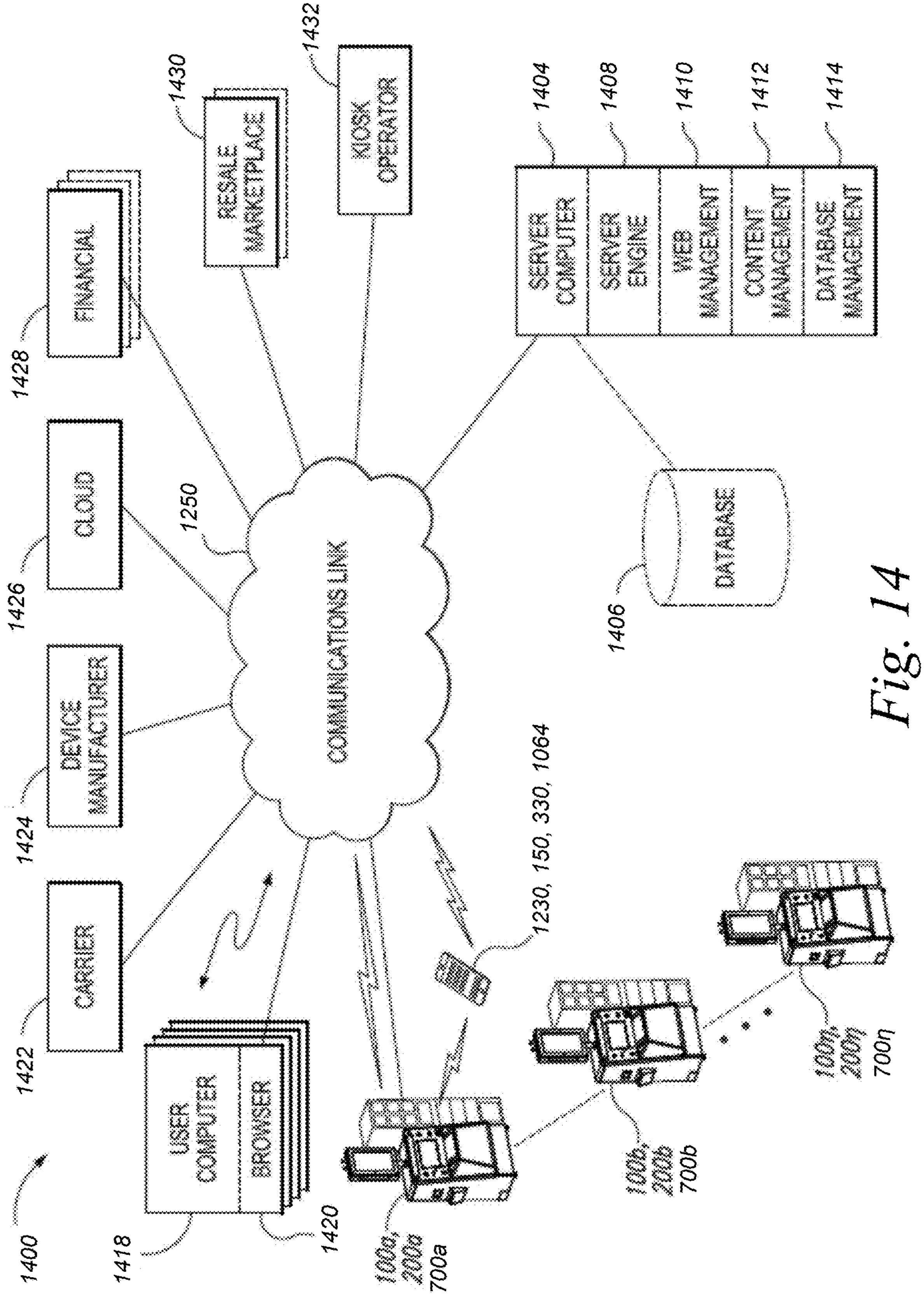
FIG. 14 is a schematic diagram of a suitable distributed computing environment for implementing various aspects of the present technology.

FIG. 14 is a schematic diagram of a suitable network environment for implementing various aspects of an electronic device recycling system 1400 configured in accordance with embodiments of the present technology. In the illustrated embodiment, a plurality of the kiosks 100, 200 and/or 700 (identified individually as kiosks 100*a*,200*a*, 700*a*-100*n*,200*n*, 700*n*) and/or kiosk portions thereof operating as independent kiosks, can exchange information with one or more remote computers (e.g., one or more server computers 1404) via the communication link 1250. Although the communication link 1250 can include a publicly available network (e.g., the Internet with a web interface), a private communication link, such as an intranet or other network can also be used. Moreover, in various embodiments the individual kiosks 100, 200, 700 can be connected to a host computer (not shown) that facilitates the exchange of information between the kiosks 100, 200, 700 and remote computers, other kiosks, mobile devices, etc.

The server computer 1404 can perform many or all of the functions for receiving, routing and storing of electronic messages, such as webpages, audio signals and electronic images necessary to implement the various electronic transactions described herein. For example, the server computer 1404 can retrieve and exchange web pages and other content with an associated database or databases 1406. In some embodiments, the database 1406 can include information related to mobile phones and/or other consumer electronic devices. Such information can include, for example, make, model, serial number, International Mobile Equipment Identity (IMEI) number, carrier plan information, pricing information, owner information, etc. In various embodiments the server computer 1404 can also include a server engine 1408, a web page management component 1410, a content management component 1412, and a database management component 1414. The server engine 1408 can perform the basic processing and operating system level tasks associated with the various technologies described herein. The webpage management component 1410 can handle creation and/or display and/or routing of web or other display pages. The content management component 1412 can handle many of the functions associated with the routines described herein. The database management component 1414 can perform various storage, retrieval and query tasks associated with the database 1406, and can store various information and data such as animation, graphics, visual and audio signals, etc.

In the illustrated embodiment, the kiosks 100, 200, 700 can also be operably connected to a plurality of other remote devices and systems via the communication link 1250. For example, the kiosks 100, 200, 700 can be operably connected to a plurality of user devices 1418 (e.g., personal computers, laptops, handheld devices, etc.) having associated browsers 1420. Similarly, as described above the kiosks 100, 200, 700 can each include wireless communication facilities for exchanging digital information with wireless-enabled electronic devices, such as the electronic device 1230. The kiosks 100, 200, 700 and/or the server computer 1404 are also operably connectable to a series of remote computers for obtaining data and/or exchanging information with necessary service providers, financial institutions, device manufactures, authorities, government agencies, etc. For example, the kiosks 100, 200, 700 and the server computer 1404 can be operably connected to one or more cell carriers 1422, one or more device manufacturers 1424 (e.g., mobile phone manufacturers), one or more electronic payment or financial institutions 1428, one or more databases (e.g., the GSMA IMEI Database, etc.), and one or more computers and/or other remotely located or shared resources associated with cloud computing 1426. The financial institutions 1428 can include all manner of entity associated with conducting financial transactions, including banks, credit/debit card facilities, online commerce facilities, online payment systems, virtual cash systems, money transfer systems, etc.

In addition to the foregoing, the kiosks 100, 200, 700 and the server computer 1404 can also be operably connected to a resale marketplace 1430 and a kiosk operator 1432. The resale marketplace 1430 represents a system of remote computers and/or services providers associated with the reselling of consumer electronic devices through both electronic and brick and mortar channels. Such entities and facilities can be associated with, for example, online auctions for reselling used electronic devices as well as for establishing market prices for such devices. The kiosk operator 1432 can be a central computer or system of computers for controlling all manner of operation of the network of kiosks 100, 200, 700. Such operations can include, for example, remote monitoring and facilitating of kiosk maintenance (e.g., remote testing of kiosk functionality, downloading operational software and updates, etc.), servicing (e.g., periodic replenishing of cash and other consumables), performance, etc. In addition, the kiosk operator 1432 can further include one or more computer systems with display screens operably connected to receive images from one or more cameras located at each of the kiosks 100, 200 (e.g., one or more of the cameras 116, 1017, and/or one or more of the cameras associated with the upper and lower chambers 160 and 162, 40 and 820 as described above with reference to FIGS. 1A-1E and FIGS. 8B-8E). This remote viewing capability enables operator personnel to verify user identification and/or make other visual observations at the systems 100, 200, 700 in real-time during transactions, as described above with reference to FIG. 1A. This remote viewing capability can also enable a remote evaluator to evaluate images of a mobile phone (e.g., images of the device display screen) obtained by the one or more cameras within the kiosk inspection area to grade the physical condition of the device and/or confirm that the results of the kiosk's visual inspection of the device condition as described above were accurate.

Although the kiosks in FIG. 14 (e.g., the kiosks 100, 700) may be depicted as having both a first kiosk portion 101, 710 (e.g., a purchasing kiosk portion) and a second kiosk portion 102, 720 (e.g., a vending kiosk portion), it will be understood that, in some embodiments, the system 1400 can include first kiosk portions 101, 710 that are separate from (e.g., not joined to or collocated with) second kiosk portions 102, 720, and/or second kiosk portions 102, 720 that are separate from (e.g., not joined to or collocated with) first kiosk portions 101, 710. Accordingly, in some embodiments, the system 1400 can include kiosks having both a purchasing kiosk portion and a vending kiosk portion, individual vending kiosk portions operating separately as standalone vending kiosks, and/or individual purchasing kiosk portions operating separately as standalone purchasing kiosks. The foregoing description of the electronic device recycling system 1400 illustrates but one possible network system suitable for implementing the various technologies described herein. Accordingly, those of ordinary skill in the art with appreciate that other systems consistent with the present technology can omit one or more of the facilities described in reference to FIG. 14, or can include one or more additional facilities not described in detail in FIG. 14.

Referring to, e.g., FIGS. 1A-2 and 7-10E, in some embodiments a user of the kiosk 100, 200, 700 can obtain a "quick quote" for a phone they currently own and may wish to sell. For example, the user can position (or "point") their current phone at, e.g., one of the external cameras 116, 1017 (e.g. the camera 116*b*, such as a webcam; FIG. 1A) and the kiosk 100, 200, 700 provides the user (via, e.g., the display 104, 716) with a rough or estimated price, or a range of prices, that the kiosk 100, 200, 700 will pay for the phone if the user wishes to sell it. More specifically, in some embodiments, the user can be instructed (via, e.g., instructions provided on the kiosk display 104, 716) to dial *#06 # on their phone to thereby cause the phone to display its IMEI number. In other embodiments, the user and/or other means (e.g., an app, the kiosk, etc.) can cause the phone to display the IMEI number (or other pertinent information about the phone and/or identifying codes) using other methods, including other methods known in the art. The kiosk 100, 200, 700 can then obtain information about the phone (e.g., make, model, etc.) by use of the IMEI number (by, e.g., accessing a remote database that associates phone information with IMEI number), and can then determine an offer price (or range of prices) based on the obtained information. In some embodiments, the kiosk 100, 200, 700 can then offer the user a price for the phone in, e.g., two forms: instant cash (e.g., $100) or credit (of potentially higher value) that the user can use to buy selected products (e.g., another phone from the kiosk 100, 200, 700; or another phone or other product from an associated carrier store) within a preset period of time (e.g., 7 days). In some embodiments, after the kiosk 100, 200, 700 has identified the user's current phone that they may wish to sell (e.g., the make, model, color, capacity, etc.), the kiosk 100, 200, 700 can also show the user (via, e.g., the display 104) what the additional cost would be (the "upgrade cost") for the user to purchase a newer and/or upgraded version of the same phone or of another phone make and model. For example, if the user held up a red, 128 GB Samsung S8 phone for the kiosk 100, 200, 700 to evaluate via the camera 116*b*, 1017 then the kiosk display 104, 716 could instantly, or at least quickly, show the user the cost for the user to upgrade to a red, 128 GB, Samsung S9, S10 or S11 phone. By way of example, if the kiosk 100, 200, 700 priced the user's current phone at $100 and the price of the new phone was $400, the user could sell their current phone to the kiosk 100, 200, 700 as described herein and provide another $300 in cash, credit, etc. and purchase the new phone from the kiosk.

An advantage of some embodiments of the present technology described herein is that a customer/user can approach the kiosk 100, 200, 700 and get a price quote for their current phone without, e.g., touching the kiosk 100, 200, 700 or inserting their phone into the kiosk 100, 200, 700. This may incentivize the user to submit their current phone to the kiosk 100, 200, 700 for full analysis and inspection (and subsequent purchase by the kiosk), and this may also incentivize the user to start the process of an "instant upgrade" transaction whereby the user sells their old phone to the kiosk and purchases a new (upgrade) phone from the kiosk 100, 200, 700. In some embodiments, the kiosk 100, 200, 700 can (e.g., via the display 104, 716) offer the user the possibility of a higher offer for purchase by the kiosk 100, 200, 700 (or lower upgrade cost) if the user submits their phone for analysis in the kiosk 100, 200, 700.

In some embodiments, user transactions with the kiosk 100, 200, 700 (e.g. a transaction in which a user sells their phone) can include one or more of the following steps:

(a) The kiosk 100, 200, 700 may advertise "instant upgrade" and "touch free price quote" via the kiosk display screen 104 and/or other signage, as described above.

(b) The user approaches the kiosk 100, 200, 700, and an external camera (e.g., the camera 116*b*; FIG. 1A or camera(s) 1017, FIG. 7) is operably connected to a processing device (e.g., a kiosk processor) that implements visual analysis software to analyze images obtained by the camera for indications that there is an interested person (e.g., customer or user) at the kiosk. For example, in some embodiments, the camera/processing device detect (e.g., via machine-learning or other processes) when a human face comes into view of the camera, and to determine when the face is close enough and becomes relatively stationary such that processing device can predict that the person may be interested in conducting a transaction with the kiosk 100, 200, 700. The kiosk 100, 200, 700 can start a phone transaction routine (e.g. a phone upgrade routine) that includes, e.g., displaying certain information, prompts and/or interactive features to the user via, e.g., the display 104. In some embodiments, the kiosk 100, 200, 700 can identify potential interested users using other mechanisms and/or methods, such as by use of a remote human operator. For example, the remote human operator can view the person in front of the kiosk 100, 200, 700 via the camera 116*b*, 1017. In some embodiments, the remote human operator may be alerted to the presence of a person in front of the kiosk 100, 200, 700 via one or more motion sensors to determine that someone is assuming the position of a potentially-interested customer. This approach can allow the kiosk external cameras to be selectively toggled ON/OFF to reduce power consumption, while detecting the presence of customers.

(c) Once the kiosk 100, 200, 700 (or remote human operator) estimates that an interested user is at the kiosk, 100, 200, 700, the kiosk 100, 200, 700 can provide the user with transaction instructions via the display 104, 716.

(d) The displayed instructions can include asking the user to hold up the phone that they would like to trade in in the field of view of the camera 116*b*, 1017 (or other external imaging device). The camera 116*b*, 1017 can scan for the phone (via, e.g., implementation of visual analysis software). For example, in some embodiments the camera 116*b*, 1017 can scan for the phone in the form of a black (or dark) rectangle to the left or the right of the user's face, since people can be left or right-handed.

(e) Based on position of the rectangle, the kiosk display 104, 716 can advise the user to move the phone so that the camera 116*b*, 1017 can analyze it. For example, in some embodiments, the kiosk 100, 200, 700 can show the user and/or the field of view of the camera 116*b*, 1017 on the display 104, 716, with a rectangle box or other graphic to indicate where the user should position the phone with the face of the phone facing the camera 116*b*, 1017. In some embodiments, the kiosk 100, 200, 700 can show a graphical matrix system and/or textual prompts on the display 104, 716 to illustrate to the user roughly where they should position the phone relative to the camera 116*b*, 1017, (e.g. "hold the phone up at the center of your chest," or "at eye level," etc.).

(f) In some embodiments, the kiosk 100, 200, 700 may instruct the user to display the IMEI number of the phone to the camera 116*b*, 1017 by, for example:

(i) Entering *#06 # on the phone for non-Verizon devices.

(ii) Bringing up the phone's Settings>General>About pages for other devices.

(iii) At this step, the external camera on the kiosk 100, 200, 700 can continuously scan for, e.g., a barcode on the face of the phone (e.g., if the *#06 #method was used), or use OCR to detect, e.g., the IMEI number (if an alternate method was used).

(g) Once the IMEI number or other unique identifying number is known, the kiosk 100, 200, 700 can confirm the make and model of the phone, and can also determine, e.g., the device's storage capacity by accessing various third party services via, e.g., an API (e.g., a real-time API).

(h) In other embodiments, instead of obtaining the IMEI at the beginning of the process as described above, the kiosk 100, 200, 700 can utilize the functionality of the external camera or cameras 116, 1017 (in conjunction with, e.g., an associated processing device executing visual analysis routines) to detect features of the user's phone, such as curvature, size, shape, etc., to thereby determine the make and model and generate, e.g., a "quick quote" price.

(i) In some embodiments, the kiosk 100, 200, 700 may also instruct the customer to hold up the front of the phone to the camera 116*b*, 1017 first, and to also display the back of the phone to the camera. Viewing the back of the phone can enable the camera 116*b*, 1017 to facilitate visual grading of phone condition and can also be used for device identification purposes. For example, the camera images can be used to determine if the phone includes a manufacture name on the back, such as Samsung, Apple, etc., to determine the placement of a camera on the back of the phone, and/or to determine if there is a visible model number on the back. Thus, in some embodiments the kiosk 100, 200, 700 will image the front of a phone offered by a user, but if there is not enough information for the kiosk to make a decision about, e.g., phone make, model, etc., the user may also be instructed to display the back of the device.

(j) As the foregoing steps illustrate, in some embodiments the initial portion of a user phone transaction at the kiosk (e.g., a phone sale) can require two steps or two "segmentations." 1) the kiosk 100, 200, 700 finds the phone within the field of view of the camera 116*b*, 1017 (or the camera 116*a* or 116*c*), and then 2) identifies the phone once it is confirmed to be in view.

(k) An advantage of some of the foregoing mechanisms and methods is that they can simplify providing a user with a quote for a phone because, e.g., the user need only initially hold up their phone in front of the kiosk 100, 200, 700 to obtain a quote.

In some embodiments, the kiosk 100, 200, 700 can use data associated with a phone the user wants to sell to determine which phones (e.g., new or refurbished phones) the second kiosk portion 102, 202, 720 (which can also be referred to as a "vending sidecar") will offer to the user as an upgrade. For example, after the customer positions their old phone in the field of view of the camera 116*b*, 1017, the kiosk 100, 200, 700 can identify the make and model (via, e.g., the IMEI number) and recognize, e.g., the color of the phone as described above. In some embodiments, the kiosk 100, 200, 700 can also estimate the phone storage capacity through various third-party services (e.g., via a real-time API). As noted above, in some embodiments the second kiosk portion 102, 202, 720 can stock a plurality of phones, and the kiosk 100, 200, 700 may identify (e.g., via the display 104, 716, suitable lighting, etc.) two, three, or more phones to the user that the user may wish to purchase based on the characteristics of the old phone the user is selling. For example, if the user's old phone was a red phone with minimal levels of GB storage (indicating, e.g., that the user may cloud-storage for most storage function), then the kiosk display 104, 716 can identify new red phones to the user having similar storage capacity that are available for purchase via the second kiosk portion 102, 202, 720. The foregoing approach uses information about the user's phone purchase patterns, based on what is learned about the user's current phone, to streamline what is offered to the user as a "new" phone. More specifically, this approach enables the kiosk 100, 200, 700 to make specific suggestions and recommendations of new phones for the user to purchase from the kiosk that are tailored to the particular user.

In some embodiments, the kiosk 100, 200, 700 (via, e.g., the display 104, 716) can also ask the user to turn on the screen of a phone they wish to sell, unlock the screen if needed, and then position the home page of their phone in front of the camera 116*b*, 1017. With the phone turned on, the kiosk 100, 200, 700 can detect the phone by detecting the illuminated display screen, rather than having to detect a black or dark rectangle if the phone is turned off. Additionally, the home page of the phone will typically include user icons, which the kiosk 100, 200, 700 can identify (via, e.g., the camera 116*b*, 1017 and an associated processing device executing suitable visual recognition software) as mobile applications (apps). Identification of the apps on the phone can enable the kiosk 100, 200, 700 to determine at least if the phone has, e.g., iPhone apps or Android apps, which can further help the kiosk 100, 200, 700 identify the device. Additionally, the kiosk 100, 200, 700 may also ask user to hold their phone edgewise in front of the camera so that the camera can see how thick or thin the phone is, as the thickness of the device can also be used to help determine make and model of phone. In some embodiments, the kiosk 100, 200, 700 can also include a suitable microphone and voice recognition software to interpret voice input from users. In such embodiments, the kiosk 100, 200, 700 can ask the user to say what type of phone they wish to sell, e.g., "iphone XR", and the kiosk 100, 200, 700 can interpret the spoken response to further facilitate phone identification.

In some embodiments, the kiosk 100, 200, 700 (via, e.g., the display 104, 716) can ask the user to turn on the screen of a phone they wish to sell, and then position the display screen of the phone in front of the camera 116*b*, 1017 (or other suitable external camera (e.g., a webcam) on the kiosk 100, 200, 700). The kiosk 100, 200, 700 can then ask the user to press the volume up or volume down button on the phone, whereby the camera 116, 1017 of kiosk 100, 200, 700 will detect if the UI of the phone shows the volume bar going up and down, to thereby confirm proper operation of this phone function. The kiosk 100, 200, 700 may also ask the person to turn on the camera of the phone they wish to sell and slowly roll their wrist, whereby the kiosk 100, 200, 700 will look to see if the image on the phone's screen changes due to the camera being on. The kiosk 100, 200, 700 may also send an electronic message to the phone instructing it to connect to WIFI or Bluetooth of the kiosk 100, 200, 700, whereby the kiosk 100, 200, 700 can grade the antenna of the phone. The kiosk 100, 200, 700 may also display a QR code or other code on the display 104, which the user can point the camera on their phone at and which accesses a website which plays a sound (or sound track) on the phone, whereby the kiosk 100, 200, 700 will listen for the known sound track to verify, e.g., phone speaker operation.

Figure 16:
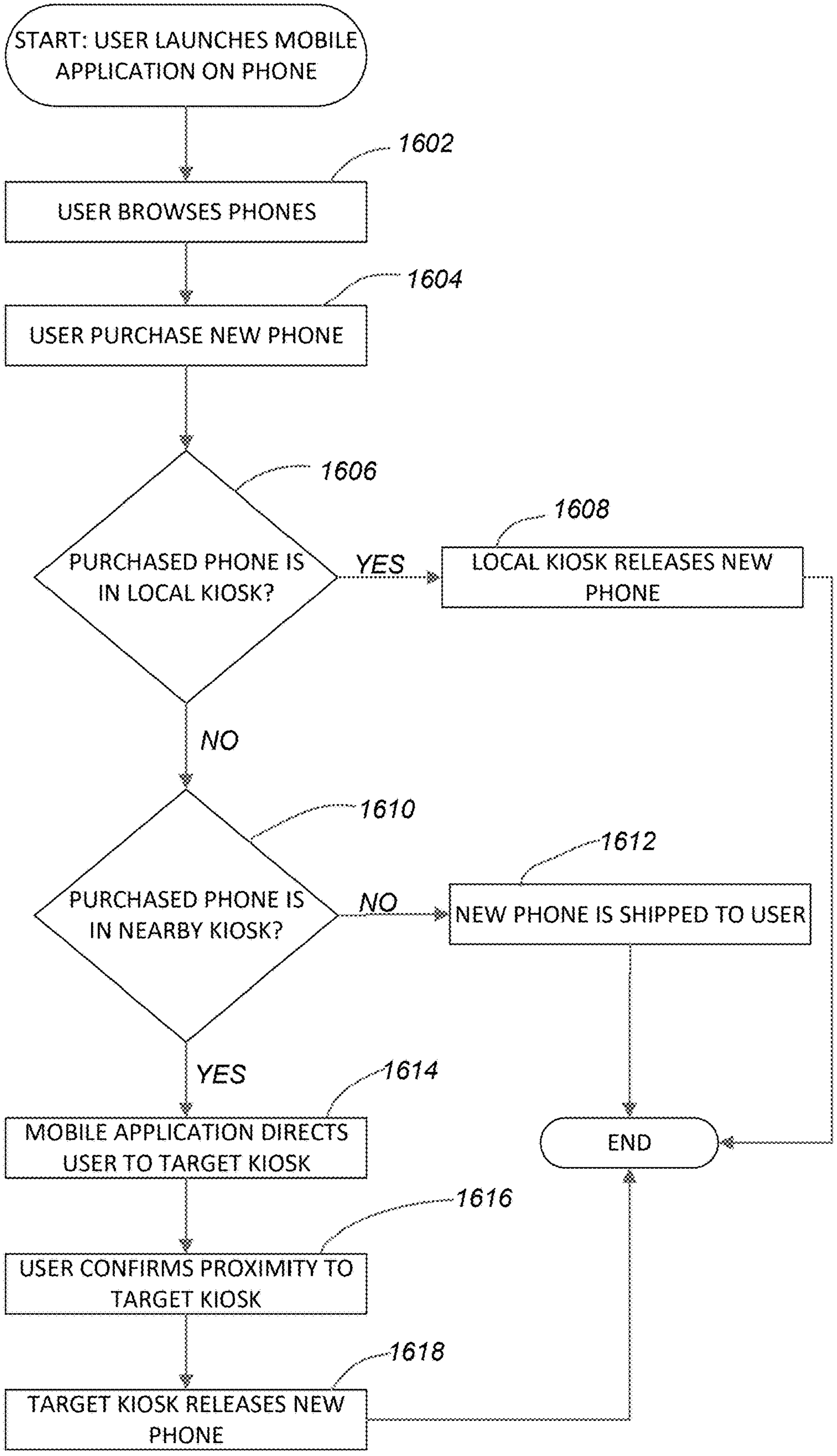
FIG. 16 illustrates a flow routine for selling an electronic device to a user in accordance with embodiments of the present technology.

FIG. 16 is a flow diagram of a routine 1600 for operating the kiosk 100, 200, 700 in accordance with embodiments of the present technology. In some embodiments, all or portions of the routine 1600 can be performed by the processor 1200 and/or the processor 701 described above with reference to FIG. 12, in accordance with computer-readable instructions stored on the memory 706 and/or the memory 768. The routine begins when a user launches a mobile application on their current phone. In some cases, the user downloads the mobile application via the Apple® App StoreSM, Google Play™ store, Amazon® Appstore™, or some other vender. In some embodiments, the user scans a machine-readable code (e.g., barcode or QR code) on a kiosk 100, 200, 700 and the phone automatically launches the mobile application. Prior to, or after launching the app, the user can browse phones (e.g., see the makes and models) within the kiosk 700 via the windows 950, 951 (FIG. 9A). In some embodiments, the phone packaging can be transparent or translucent to allow users to see the phones themselves. In some such embodiments, images or videos may be displayed on the phones and may be viewable by the user from outside of the kiosk portion 720. Such videos and images may include color tests and other diagnostics to allow the user to directly observe the condition of the phone screen. In some embodiments, the phones display promotional videos to incentivize the user to purchase the phones and/or sell another phone via the kiosk portion 710.

Figure 17:
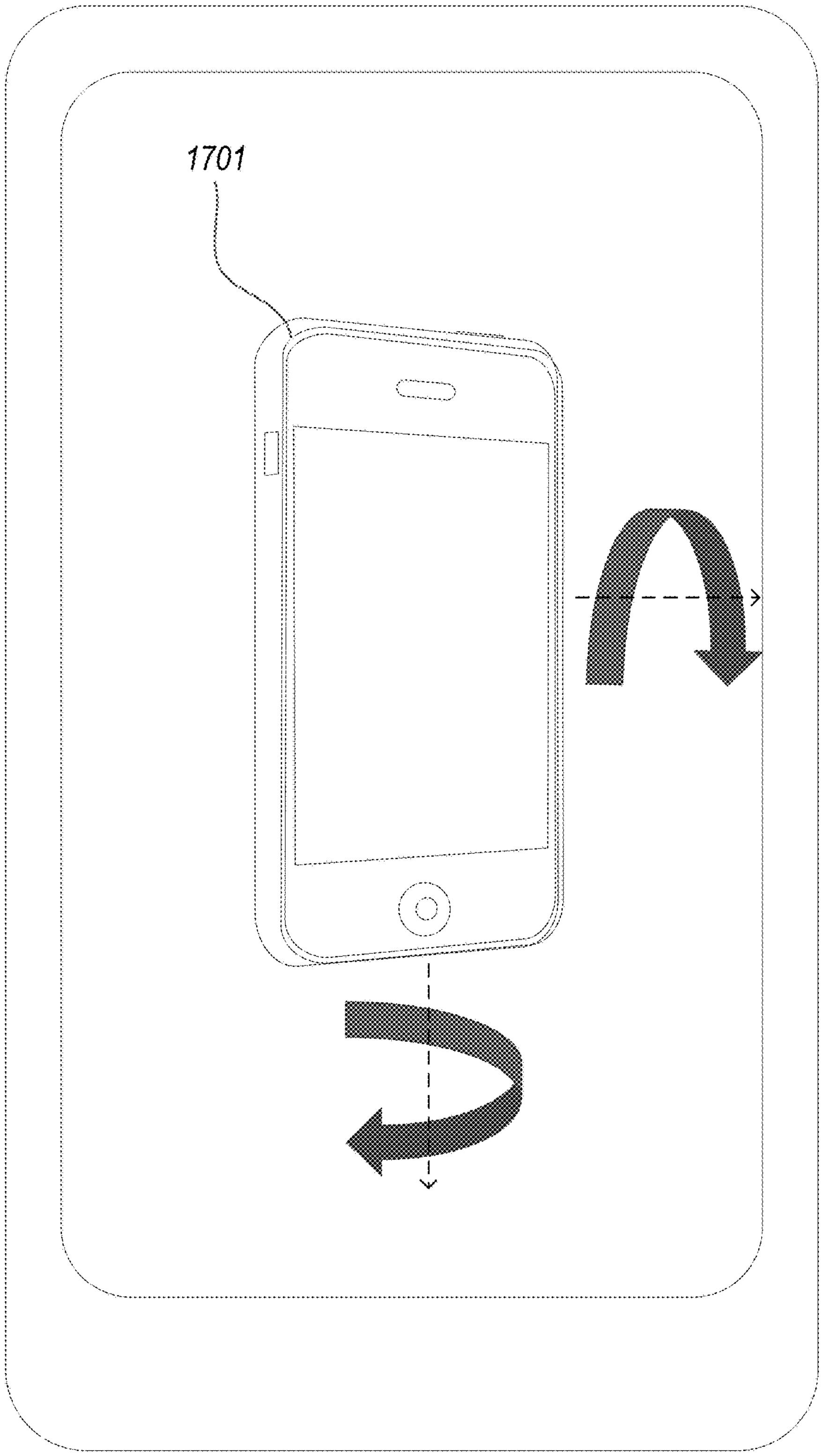
FIG. 17 illustrates a user interface screen of a mobile electronic device running a mobile application configured in accordance with embodiments of the present technology.

Moving to block 1602, the user, via the mobile application and/or a separate website, browses available new and used phones for purchase from the kiosk 700. While the user is deciding between phone makes and models, the mobile app can display generic images of the various makes and models on, e.g., the display screen of their current phone. The mobile app and/or the website can include 3D manipulable renderings of the actual phones available for purchase at the kiosk 700 and/or at a warehouse, which the app/website can display to the user via the display screen of their current phone when the user selects the specific phone for potential purchase. As illustrated in FIG. 17, the user can rotate (e.g., by use of touch) a rendering 1701 of a phone available for purchase about one or more axes to view the various sides and surfaces of the phone for purchase. These renderings 1701 can be generated by taking photographs of the phone from various angles and perspectives prior to stocking the phone in a kiosk. The specific phone, with its associate renderings, can be associated with a specific position in a vending apparatus 1174 of the kiosk. Allowing the user to view all or most sides of the phone prior to purchase can increase the user's confidence purchasing a used phone. For example, seeing a small scratch or crack in a surface of the phone may cause a user to feel more confident in their purchase, as they understand the extent of the damage, rather than relying solely on a numerical or qualitative description of the phone's condition. In some embodiments, the mobile app and/or the website allow the user to select their preferred carrier and/or determine whether to transfer data to the new phone before arriving at the kiosk or taking the new phone from the kiosk. This data transfer can occur via the wireless charging point 1194 or other wireless communication device of the kiosk 700, as described below.

Returning to FIG. 16, once the user selects a phone for purchase, the purchase transaction can be completed (e.g., via credit card, PayPal®, or some other electronic financial transaction) on the mobile application or on a separate vendor website (block 1604). Moving to decision block 1606, the user may be asked to confirm their proximity the kiosk 100,200,700 from which they are purchasing the new phone.

If the user is local to the kiosk (e.g., standing adjacent), the kiosk (using the kiosk 700 as an example) may release the phone (block 1608). In such a scenario, the kiosk 700 can begin in a locked-down configuration wherein the vending access door 742, first storage access door 1060, and second storage access door 1062 are each in a closed position (FIG. 10B). The processor 701 may cause one or both of the storage access doors to open. The processor 701 may further cause the corresponding vending apparatus 1174 to release the appropriate phone into the vending bay 740. For example, the processor 701 may cause the solenoid 1282 corresponding to the target phone to retract the post 1186 to release the phone from the vending apparatus 1174 to the vending bay 740.

In some embodiments, prior to releasing the purchased phone from the vending apparatus 1174, the vending apparatus 1174 (e.g., a wireless charging point 1194 or other wireless communication device thereof) can transfer data to the purchased phone. This data can include data from a Cloud server unique to a user's profile and/or to a specific mobile device carrier. In some embodiments, the phone has a preinstalled (e.g., installed by an operator) software application that allows the phone to connect to a Wi-Fi signal for transmitting data from a user's current phone to the purchased phone.

In some embodiments, a separate package is also released from the vending apparatus 1174, the separate packaging can include a SIM card for use in activating the new phone. In some embodiments, the packaging for the phone and/or for the SIM card includes printed instructions for transferring date from one phone to another. In some embodiments, the packaging includes one or more coupons or other incentives for the user to sell an old phone at a kiosk portion 101, 201,710.

As explained above with respect to FIG. 10D, the vending bay 740 can include a base plate 1070 (e.g., a scale, a weight sensor, and/or an impact sensor) configured to confirm receipt of the phone in the vending bay 740. Upon confirmation that the phone is positioned within the vending bay 740, the processor 701 can cause the storage access doors 1060, 1062 to close. The vending access door 742 can then be unlocked and/or opened to allow the user to retrieve their new phone (FIG. 10D).

If, however, the user is not located near the kiosk that houses the purchased phone, the routine 1600 moves to decision block 1610, wherein the mobile application confirms whether the target phone for purchase is in a nearby kiosk, as determined by a pre-set distance (e.g., 20 miles) from the user's location. If it is determined that the user is not near a kiosk containing the desired phone, the mobile application can direct the user to purchase the phone from a warehouse or other non-local venue, for shipment to the user's preferred shipment address (block 1612). If the phone is located in a nearby kiosk, the mobile application can provide the user with an address and/or map to direct the user to the nearby kiosk (block 1614). Once the user arrives at the nearby kiosk, they can confirm their location via the application, by scanning a code on the kiosk, or via some other confirmation mechanism (block 1616). The designated kiosk can then dispense the purchased phone in a manner similar to or the same as that described above for block 1612 (block 1618). Notably, the entire routine 1600 may, in some instances, be performed without physically touching or otherwise physically interacting with the kiosk 700.

In some embodiments, rather than the routine 1600 starting with the user launching an application, the routine may start with the user accessing a vendor's website for purchasing new and/or used phones. The website can, in some embodiments, recommend purchases at nearby kiosks. In such instances, the routine could continue as previously-described.

In some embodiments, a user can purchase a new phone at the second kiosk portion 102, 202, 720, without selling an old phone via the first kiosk portion 101, 201, 710. In some embodiments, a user can sell an old phone via first kiosk portion 101, 201,710, without purchasing a new phone via the second kiosk portion 102, 202, 720. Additionally, in some embodiments the user can purchase a new phone via the second kiosk portion 102, 202, 720 and then use the kiosks 100, 200 as described above to transfer data from another phone to the new phone without requiring the user to sell the other phone via the first kiosk portion 101, 201, 710.

While processes or blocks of the routines 1300, 1600 and/or other routines described herein may be presented in a given order, alternative implementations in accordance with embodiments of the present technology may perform steps, subroutines, blocks, etc. in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times.

The kiosks 100,200, 700 mobile devices 150, 330, 1230 and 1064, server computers 1404, user computers or devices 1418, etc. can include one or more central processing units or other logic-processing circuitry, memory, input devices (e.g., keyboards and pointing devices), output devices (e.g., display devices and printers), and storage devices (e.g., magnetic, solid state, fixed and floppy disk drives, optical disk drives, etc.). Such computers can include other program modules such as an operating system, one or more application programs (e.g., word processing or spreadsheet applications), and the like. The computers can include wireless computers, such as mobile phones, personal digital assistants (PDAs), palm-top computers, tablet computers, notebook and laptop computers desktop computers, e-readers, music players, GPS devices, wearable computers such as smartwatches and Google® Glass™, etc., that communicate with the Internet via a wireless link. The computers may be general-purpose devices that can be programmed to run various types of applications, or they may be single-purpose devices optimized or limited to a particular function or class of functions. Aspects of the invention may be practiced in a variety of other computing environments.

While the Internet is shown in some embodiments, a private network, such as an intranet can likewise be used herein. The network can have a client-server architecture, in which a computer is dedicated to serving other client computers, or it can have other architectures such as peer-to-peer, in which one or more computers serve simultaneously as servers and clients. A database or databases, coupled to the server computer(s), stores much of the web pages and content exchanged between the user computers. The server computer(s), including the database(s), can employ security measures to inhibit malicious attacks on the system, and to preserve integrity of the messages and data stored therein (e.g., firewall systems, message encryption and/or authentication (e.g., using transport layer security (TLS) or secure sockets layer (SSL)), password protection schemes, encryption of stored data (e.g., using trusted computing hardware), and the like).

One skilled in the relevant art will appreciate that the concepts of the invention can be used in various environments other than location based or the Internet. In general, a display description can be in HTML, XML or WAP format, email format or any other format suitable for displaying information (including character/code-based formats, algorithm-based formats (e.g., vector generated), and bitmapped formats). Also, various communication channels, such as local area networks, wide area networks, or point-to-point dial-up connections, can be used instead of the Internet. The system can be conducted within a single computer environment, rather than a client/server environment. Also, the user computers can comprise any combination of hardware or software that interacts with the server computer, such as television-based systems and various other consumer products through which commercial or noncommercial transactions can be conducted. The various aspects of the invention described herein can be implemented in or for any e-mail environment.

Although not required, aspects of the invention are described in the general context of computer-executable instructions, such as routines executed by a data processing device, e.g., a server computer, wireless device or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones (including Voice over IP (VOIP) phones), dumb terminals, media players, gaming devices, multi-processor systems, microprocessor-based or programmable consumer electronics, set-top boxes, network PCs, mini-computers, mainframe computers, and the like. Indeed, the terms "computer," "server," "host," "host system," and the like are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. While aspects of the invention, such as certain functions, are described as being performed exclusively on a single device, the invention can also be practiced in distributed environments where functions or modules are shared among disparate processing devices, which are linked through a communications network, such as a Local Area Network (LAN), Wide Area Network (WAN), or the Internet. In a distributed computing environment, program modules can be located in both local and remote memory storage devices.

Those of ordinary skill in the art will appreciate that the routines and other functions and methods described herein can be implemented as an application specific integrated circuit (ASIC), by a digital signal processing (DSP) integrated circuit, through conventional programmed logic arrays and/or circuit elements. While many of the embodiments are shown and described as being implemented in hardware (e.g., one or more integrated circuits designed specifically for a task), such embodiments could equally be implemented in software and be performed by one or more processors. Such software can be stored on any suitable computer-readable medium, such as microcode stored in a semiconductor chip, on a computer-readable disk, or downloaded from a server and stored locally at a client.

Aspects of the invention can be stored or distributed on tangible computer-readable media, including magnetically or optically readable computer discs, hard-wired or preprogrammed chips (e.g., EEPROM semiconductor chips), nanotechnology memory, biological memory, or other data storage media. The data storage devices can include any type of computer-readable media that can store data accessible by a computer, such as magnetic hard and floppy disk drives, optical disk drives, magnetic cassettes, tape drives, flash memory cards, DVDs, Bernoulli cartridges, RAM, ROMs, smart cards, etc. Indeed, any medium for storing or transmitting computer-readable instructions and data may be employed, including a connection port to a network such as a LAN, WAN, or the Internet. Alternatively, computer implemented instructions, data structures, screen displays, and other data under aspects of the invention can be distributed over the Internet or over other networks (including wireless networks), on a propagated signal on a propagation medium (e.g., an electromagnetic wave(s), a sound wave, etc.) over a period of time, or they can be provided on any analog or digital network (packet switched, circuit switched, or other scheme). The terms "memory" and "computer-readable storage medium" include any combination of temporary, persistent, and/or permanent storage, e.g., ROM, writable memory such as RAM, writable non-volatile memory such as flash memory, hard drives, solid state drives, removable media, and so forth, but do not include a transitory propagating signal per se.

The present technology allows devices of various types that can run or be evaluated by a software application, such as mobile phones (smartphones and feature phones, for example), tablet computers, wearable computers, game devices, media players, laptop and desktop computers, etc. (e.g., the device 150) to be evaluated to facilitate purchasing by an automated kiosk portion 101. The present technology enables the user to submit information about the electronic device and/or the user, obtain a price quote for the electronic device, prepare the electronic device for recycling, assist the user with bringing the electronic device to the kiosk portion 101, and facilitate the transaction so that the user can sell the electronic device at the kiosk portion 101 with greater certainty and speed.

The present technology includes various other types and embodiments of recycling machines. For example, the present technology includes embodiments such as a countertop recycling station and/or a retail store-based interface operated by or with the assistance of a retail employee (such as a partially automated system). As another example, the present technology includes embodiments such as a recycling machine configured to accept all kinds of devices, including larger items (e.g., desktop and laptop computers, televisions, gaming consoles, DVRs, etc.).

The above Detailed Description of examples and embodiments of the invention is not intended to be exhaustive or to limit the invention to the precise form disclosed above. Although specific examples for the invention are described above for illustrative purposes, various equivalent modifications are possible within the scope of the invention, as those skilled in the relevant art will recognize.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment.

Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples: alternative implementations may employ differing values or ranges.

Although the above description describes various embodiments of the invention and the best mode contemplated, regardless how detailed the above text, the invention can be practiced in many ways. Details of the system may vary considerably in its specific implementation, while still being encompassed by the present technology. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

EXAMPLES

Several aspects of the present technology are set forth in the following examples.

1. A consumer-operated kiosk comprising:
- a housing;
- a vending bay within the housing;
- a vending access door configured to transition between an opened configuration and a closed configuration, wherein:
  - the vending access door allows access into the vending bay from outside of the housing when in the opened configuration; and
  - the vending access door prevents access into the vending bay from outside of the housing when in the closed configuration;
- a vending apparatus positioned above the vending bay, the vending apparatus including:
  - one or more shelves configured to retain a plurality of mobile phones for sale; and
  - one or more release mechanisms configured to selectively release the mobile phones from the vending apparatus;
- a storage access door positioned between the vending apparatus and the vending bay and configured to transition between an opened configuration and a closed configuration;
- one or more processors operably connected to the vending access door and the vending apparatus, wherein the one or more processors are configured to:
  - receive a request to vend a selected phone from among the phones in the vending apparatus;
  - cause the storage access door to transition from the closed configuration to the opened configuration after receiving the request to vend the selected phone;

cause the release mechanism to release the selected phone to the vending bay when the storage access door is in the opened configuration;

cause the storage access door to transition from the opened configuration to the closed configuration after the selected phone is released into the vending bay; and cause the vending access door to transition from the closed configuration to the opened configuration after the storage access door transitions to the closed configuration.

2. The kiosk of example 1 wherein the housing comprises:

a first sidewall;

at least a first side window in the first sidewall;

a front wall connected to the first sidewalls; and a front window in the front wall;

wherein the vending apparatus and the plurality of mobile phones are visible through each of the front window and the first side window.

3. The kiosk of example 2 wherein the kiosk further comprises:

a second sidewall connected to the front wall opposite the first sidewall; and at least a second side window in the second sidewall;

wherein the vending apparatus and the plurality of plurality of mobile phones are visible through the second side window.

4. The kiosk of example 2 wherein:

the vending apparatus is a first vending apparatus, the kiosk further comprises a second vending apparatus positioned within the housing behind the first vending apparatus, the first sidewall includes a second side window, and the second vending apparatus is visible through the second side window.

5. The kiosk of example 1 wherein the vending apparatus is a first vending apparatus and the storage access door is a first storage access door, and wherein the kiosk further comprises:

a second vending apparatus positioned within the housing and behind the first vending apparatus, the second vending apparatus having:

one or more shelves configured to retain a plurality of mobile phones for sale; and one or more release mechanisms configured to selectively release the mobile phones from the second vending apparatus; and a second storage access door positioned between the second vending apparatus and the vending bay and configured to transition between an opened configuration and a closed configuration.

6. The kiosk of example 5, further comprising a ramp between the second vending apparatus, wherein:

the release mechanism of the second vending apparatus is configured to selectively release the mobile phones from the second vending apparatus onto the ramp;

the ramp is configured to direct the released mobile phones to the vending bay; and the second storage access door is configured to block movement of phones along the ramp into the vending bay when the second storage access door is in the closed configuration.

7. The kiosk of example 5 wherein the one or more processors are configured to:

receive a request to vend a second selected phone from among the mobile phones in the second vending apparatus;

cause the second storage access door to transition from the closed configuration to the opened configuration after receiving the request to vend the second selected phone;

cause a release mechanism of the second vending apparatus to release the second selected phone to the vending bay when the second storage access door is in the opened configuration;

cause the second storage access door to transition from the opened configuration to the closed configuration after the second selected phone is released into the vending bay; and cause the vending access door to open after the second storage access door transitions to the closed configuration.

8. The kiosk of example 5 wherein the second storage access door is mechanically-linked to the first storage access door such that the second storage door transition to the opened configuration when the first storage access door transitions to the opened configuration.

9. The kiosk of example 5 wherein the second storage access door is configured to open and close independent of the configuration of the first storage access door.

10. The kiosk of example 1 wherein the vending access door is transparent.

11. The kiosk of example 1, further comprising a camera positioned within the housing and having a field of view that includes both the vending apparatus and the vending bay.

12. The kiosk of example 11, wherein the camera is a first camera and the vending apparatus is a first vending mechanism, and wherein the kiosk further comprises:

a second vending apparatus positioned within the housing and behind the first vending apparatus; and a second camera having a field of view that includes the second vending apparatus.

13. The kiosk of example 1 wherein the plurality of mobile phones are contained in individual packages.

14. A consumer-operated kiosk comprising:

an inspection area configured to receive a first device from a user;

an imaging device configured to image the first device when the first device is positioned within the inspection area;

a vending apparatus configured to store a plurality of second electronic devices for purchase;

a vending bay;

one or more release mechanisms configured to directly release any one of the second electronic devices from the vending apparatus; and one or more processors operably connected to the inspection area, the imaging device, the vending apparatus, and the one or more release mechanisms, wherein the one or more processors are configured to:

cause the imaging device to capture one or more images of the first electronic device;

facilitate purchase of the first electronic device based at least in part on the one or more captured images of the first electronic device;

receive a request to vend a selected one of the plurality of second electronic devices in the vending apparatus; and cause the one or more release mechanisms to release the selected second electronic device directly from the vending apparatus into the vending bay.

15. The kiosk of example 14, further comprising one or more wireless and/or wired connectivity devices operably connected to the one or more processors and configured to electrically connect to the first device, wherein the one or more processors are configured to:

receive characteristic information about the first electronic device via the wireless and/or wired connectivity device; and facilitate purchase of the first electronic device based at least in part on the characteristic information.

16. The kiosk of example 14 wherein the vending apparatus is configured to store a first number of the second electronic devices, wherein the kiosk includes a same number of release mechanisms as the first number of second electronic devices, and wherein each release mechanism is configured or release a single second electronic device from the vending apparatus.

17. The kiosk of example 14 wherein each of the one or more release mechanisms comprises a solenoid having a pin configured to engage with a tab on a package of a second electronic device, wherein the solenoid is configured to disengage the pin from the tab to release the second electronic device.

18. The kiosk of example 14 wherein the vending apparatus is a first vending apparatus, wherein the kiosk further comprises a second vending apparatus positioned behind the first vending apparatus within the kiosk and configured to store additional second electronic devices, wherein the one or more release mechanisms are configured to directly release any one of the additional second electronic devices from the second vending apparatus.

19. The kiosk of example 18, further comprising:

a first storage access door configured to selectively block access between the vending bay and the first vending apparatus; and a second storage access door configured to selectively block access between the vending bay and the second vending apparatus.

20. The kiosk of example 19 wherein the first storage access door is mechanically linked to the second storage access door, such that the second storage access door opens and closes in unison with the first storage access door.

21. The kiosk of example 19 wherein the first storage access door is configured to open and close independently of the second storage access door.

22. The kiosk of example 14, further comprising a user interface on the kiosk, wherein the user interface is configured to receive a user request to vend the selected second electronic device from among the second electronic devices.

23. A consumer-operated kiosk comprising:

an inspection area configured to receive a first electronic device from a user;

an imaging device configured to image the first device when the first electronic device is positioned within the inspection area;

a vending apparatus configured to store a plurality of second electronic devices for purchase;

one or more cables operably associated with the vending apparatus and individually connected to the second electronic devices through packaging of the second electronic devices;

one or more processors operably connected to the inspection area, the imaging device, the vending apparatus, and the one or more release mechanisms, wherein the one or more processors are configured to:

cause the imaging device to capture one or more images of the first electronic device;

facilitate purchase of the first electronic device based at least in part on the one or more captured images of the first electronic device;

receive a request to vend a selected second electronic device from among the plurality of second electronic devices in the vending apparatus; and release the selected second electronic device directly from the vending apparatus into a vending bay of the kiosk, wherein releasing the second selected electronic device disconnects the cable that was connected to the selected second electronic device from the second selected electronic device.

24. The kiosk of example 23 wherein the one or more processors are configured to transfer data via the cable to the second selected electronic device prior to releasing the second selected electronic device into the vending bay.

25. The kiosk of example 24 wherein the data is from the first device.

26. The kiosk of example 25 wherein the one or more processors are configured to receive the data from the first electronic device over a wireless connection.

27. The kiosk of example 25 wherein the one or more processors are configured to receive the data from the first electronic device via a second cable operably associated with the kiosk.

28. The kiosk of example 23 wherein the one or more processors are configured to activate the second selected electronic device via the cable prior to releasing the second selected electronic device into the vending bay.

29. The kiosk of example 23 wherein the one or more processors are configured to transfer data from Cloud storage to the second selected electronic device.

30. A method of purchasing a mobile electronic device from a kiosk, the method comprising:

accessing, via one or more processors associated with a first electronic device, a database of one or more second electronic devices for purchase;

selecting, via a user interface of the first electronic device, one of the second electronic devices;

rotating, via the user interface, a 3D rendering of the actual selected second electronic device;

purchasing, via the user interface, the selected second electronic device; and retrieving the selected second electronic device from a vending bay of a kiosk.

31. The method of example 30, further comprising scanning, using the first electronic device, a machine-readable code on a consumer-operated kiosk, wherein scanning the machine-readable code directs the first electronic device to download a mobile application onto the first electronic device.

32. The method of example 30, further comprising downloading the mobile application onto the first electronic device, wherein accessing the database of second electronic devices is facilitated by the mobile application.

33. The method of example 29, wherein accessing the database of second electronic devices is performed by accessing a website using the first electronic device.

34. The method of example 29, further comprising receiving, via the user interface of the first electronic device, a location of the kiosk in which the selected second electronic device is located.

35. The method of example 33, further comprising scanning a machine-readable code on the kiosk in which the selected second electronic device is located, wherein the scanning the machine-readable code confirms the presence of a user of the first electronic device at the kiosk before the kiosk facilitates retrieving the selected second electronic device form the kiosk.

36. The method of example 29 wherein the second electronic devices are mobile phones.

37. A method of selling a mobile electronic device to a user, the method comprising: capturing a plurality of images of a first electronic device;

rendering a 3D image of the first electronic device using the plurality of images;

stocking the first electronic device in a vending kiosk;

receiving, via a user interface of a second electronic device of a user, a request to access the 3D image;

receiving, via the user interface of a second electronic device of a user, a request to manipulate the 3D image;

receiving, via the user interface, a request to purchase the first electronic device;

confirming payment for the first electronic device;

receiving confirmation that the user is at the vending kiosk; and dispensing the first electronic to the user at the vending kiosk.

38. The method of example 35, further comprising providing the user with a location of the vending kiosk in which the first electronic device is stocked.

39. The method of example 35 wherein the request to manipulate the 3D image is performed by the user touching the user interface of the second electronic device.

40. The method of example 35, further comprising positioning the first electronic device in at a known location in a vending apparatus of the vending kiosk.

41. The method of example 38, further comprising associating the first electronic device with the known location.

40. The method of example 39, further comprising activating, via one or more processors of the vending kiosk, a release mechanism to release the first electronic device to a vending bay of the vending kiosk.

41. The method of example 35, further comprising displaying generic images of electronic device makes and models before the user requests access to the 3D image.

42. The method of example 35 wherein dispensing the first electronic device to the user includes opening a vending access door of the vending kiosk.

43. The method of example 35 wherein receiving, via the user interface of a second electronic device of a user, a request to manipulate the 3D image includes receiving a request to rotate the 3D image.

We claim:

1. A system for evaluating and purchasing electronic devices, the system comprising:

a kiosk comprising:

one or more first cameras, each having a respective first field of view that includes an environment external to the kiosk;

an internal inspection area configured to receive an electronic device from a user for electrical and/or visual evaluation; and one or more second cameras having a second field of view including at least a portion of the internal inspection area; and one or more processors operably associated with the kiosk and configured to— obtain, via the one or more first cameras, a first image of an ID of a user;

obtain, via the one or more first cameras, a second image of the user;

provide verification of an identity of the user based at least partially on a comparison of the first image and the second image;

obtain, via the one or more second cameras, one or more third images of the electronic device while the electronic device is positioned within the internal inspection area;

determine a compensation value for the electronic device based at least partially on an evaluation of the one or more third images; and offer to purchase the electronic device for the compensation value.

2. The system of claim 1, further comprising a display screen operably coupled to the one or more processors, wherein the one or more processors are further configured to cause the display screen to display the first image and/or the second image to a remote evaluator for manual comparison.

3. The system of claim 1 wherein:

the one or more processors are one or more first processors located remotely from the kiosk, the kiosk further comprises one or more second processors operably coupled to the one or more first cameras and the one or more second cameras, and the one or more first processors are configured to— obtain the first image and the second image from the one or more second processors, and provide the verification of the identity to the one or more second processors.

4. The system of claim 1 wherein the first image of the ID of the user includes an image of a driver's license of the user.

5. The system of claim 1 wherein the first image of the ID includes an image of a picture of the user, and wherein the verification of the identity of the user is based at least partially on a comparison of the picture and the second image.

6. The system of claim 1 wherein the kiosk further includes a housing, and wherein the one or more first cameras and the one or more second cameras are positioned within the housing.

7. The system of claim 1 wherein the one or more processors include:

one or more first processors positioned remotely from the kiosk and configured to obtain the first image and the second image and verify the identity of the user;

one or more second processors positioned remotely from the kiosk and configured to obtain the one or more third images and determine the compensation value; and one or more third processors of the kiosk configured to cause a display screen of the kiosk to display the offer to purchase the electronic device.

8. The system of claim 1 wherein the evaluation of the one or more third images is performed by the one or more processors.

9. The system of claim 1 wherein the evaluation of the one or more third images is performed by a remote human operator.

10. The system of claim 1 wherein the electronic device is a mobile phone.

11. The system of claim 1 wherein:

the one or more first cameras include a primary first camera and a secondary first camera, the one or more processors are configured to obtain the first image via the primary first camera, and the one or more processors are configured to obtain the second image via the secondary first camera.

12. A method of evaluating and purchasing electronic devices, the method comprising:

obtaining, via one or more first cameras of a kiosk, a first image of an ID of a user, wherein the one or more first cameras have a field of view including an environment external to the kiosk, and wherein obtaining the first image includes obtaining the first image while the ID is external to the kiosk;

obtaining, via the one or more first cameras, a second image of the user;

verifying, via one or more processors operably associated with the kiosk, an identity of the user based at least partially on a comparison of the first image and the second image;

obtaining, via one or more second cameras of the kiosk, one or more third images of an electronic device while the electronic device is positioned within an internal inspection area of the kiosk;

determining, via the one or more processors, a compensation value for the electronic device based at least partially on an evaluation of the one or more third images; and offering, via the one or more processors, to purchase the electronic device for the compensation value.

13. The method of claim 12 wherein verifying the identity of the user includes displaying, via a display screen positioned remotely from the kiosk, the first image and/or the second image to a remote evaluator for the comparison.

14. The method of claim 12 wherein:

the one or more processors are one or more first processors located remotely from the kiosk, the kiosk further comprises one or more second processors operably coupled to the one or more first cameras and/or the one or more second cameras, obtaining the first image and the second image includes obtaining the first image and the second image from the one or more second processors, and verifying the identity of the user includes providing verification of the identity to the one or more second processors.

15. The method of claim 12 wherein obtaining the first image of the ID of the user includes obtaining an image of a driver's license of the user.

16. The method of claim 12 wherein obtaining the first image of the ID includes obtaining an image of a picture of the user, and wherein verifying the identity of the user includes comparing the picture in the obtained image and the second image.

17. The method of claim 12 wherein:

the one or more processors include:

one or more first processors positioned remotely from the kiosk and configured to facilitate verifying the user's identity, one or more second processors positioned remotely from the kiosk and configured to determine the compensation value of the electronic device, and one or more third processors of the kiosk;

obtaining the first image and the second image includes transmitting the first image and the second image from the one or more third processors to the one or more first processors for verification;

obtaining the one or more third images includes transmitting the one or more third images from the one or more third processors to the one or more second processors for the evaluation; and offering to purchase the electronic device includes transmitting the compensation value from the one or more second processors to the one or more third processors and causing, via the one or more third processors, a display screen of the kiosk to display a purchase offer to the user.

18. The method of claim 12, further comprising evaluating the one or more third images via the one or more processors to determine a physical condition of the electronic device, wherein the compensation value is based at least partially on the physical condition.

19. The method of claim 12, further comprising evaluating the one or more third images via the one or more processors to determine a make and/or a model of the electronic device, wherein the compensation value is based at least partially on the make and/or the model.

20. The method of claim 12 wherein the electronic device is a mobile phone.

* * * * *